(12) United States Patent
Miyamoto et al.

(10) Patent No.: US 7,938,721 B2
(45) Date of Patent: May 10, 2011

(54) GAME APPARATUS, GAME PROGRAM, STORAGE MEDIUM STORING GAME PROGRAM AND GAME CONTROL METHOD

(75) Inventors: Shigeru Miyamoto, Kyoto (JP); Kiyoshi Mizuki, Kyoto (JP); Keizo Ota, Kyoto (JP); Tsuyoshi Kiyuna, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1265 days.

(21) Appl. No.: 10/593,981

(22) PCT Filed: Feb. 24, 2005

(86) PCT No.: PCT/JP2005/003561
§ 371 (c)(1),
(2), (4) Date: Sep. 22, 2006

(87) PCT Pub. No.: WO2005/089895
PCT Pub. Date: Sep. 29, 2005

(65) Prior Publication Data
US 2008/0113793 A1 May 15, 2008

(30) Foreign Application Priority Data
Mar. 22, 2004 (JP) .................................. 2004-083248

(51) Int. Cl.
*A63F 9/24* (2006.01)

(52) U.S. Cl. ........................................................ 463/29
(58) Field of Classification Search ................ 463/29
See application file for complete search history.

(56) References Cited

U.S. PATENT DOCUMENTS

| 4,542,903 | A | 9/1985 | Yokoi et al. |
| 2008/0276196 | A1* | 11/2008 | Tang .............................. 715/800 |
| 2009/0280879 | A1* | 11/2009 | Takahashi ......................... 463/3 |
| 2010/0124967 | A1* | 5/2010 | Lutnick et al. .................. 463/17 |

(Continued)

FOREIGN PATENT DOCUMENTS

JP 58-116377 7/1983

(Continued)

OTHER PUBLICATIONS

"UltraMon Smart Taskbar", Aug. 3, 2003, 2 pages, http://web.archive.org/web/20020803185317/http://realtimesoft.com/ultramon/tour/smar_taksbar.asp.

(Continued)

*Primary Examiner* — Pierre E Elisca
(74) *Attorney, Agent, or Firm* — Nixon & Vanderhye, P.C.

(57) ABSTRACT

A game apparatus (10) includes an LCD (12) and an LCD (14), for example, and the LCD (14) is provided with a touch panel (22). On the LCD (12), a first game image is displayed, and on the LCD (14), a second game image is displayed. It is determined whether or not the first game image becomes an object to be operated on the basis of coordinates data detected in response to an operation of the touch panel (22) by a player, input data obtained from an operating switch (20), a microphone (34), or the like. When it is determined that the first game image becomes an object to be operated, the first game image and the second game image are switched and displayed, for example. Then, when it is determined that the first game image displayed on the LCD (14) does not become an object to be operated, the first game image is displayed on the LCD (12).

26 Claims, 31 Drawing Sheets

U.S. PATENT DOCUMENTS

| | | | |
|---|---|---|---|
| 2010/0222144 A1* | 9/2010 | Ohba et al. | 463/35 |
| 2010/0255907 A1* | 10/2010 | Yoro | 463/31 |
| 2011/0025614 A1* | 2/2011 | Ohta | 345/173 |

FOREIGN PATENT DOCUMENTS

| | | |
|---|---|---|
| JP | 4-369027 | 12/1992 |
| JP | 5-204581 | 8/1993 |
| JP | 6-285259 | 10/1994 |
| JP | 7-51467 | 2/1995 |
| JP | 8-83160 | 3/1996 |
| JP | 2000-35847 | 2/2000 |
| JP | 2000-134503 | 5/2000 |
| JP | 2000-137555 | 5/2000 |
| JP | 2001-70647 | 3/2001 |
| JP | 2001-321571 | 11/2001 |
| JP | 2002-182893 | 6/2002 |
| JP | 2003-47774 | 2/2003 |
| JP | 2003-157066 | 5/2003 |

OTHER PUBLICATIONS

International Search Report for PCT/JP2005/003561, mailed Jul. 12, 2005.

* cited by examiner

FIG. 21
(A)
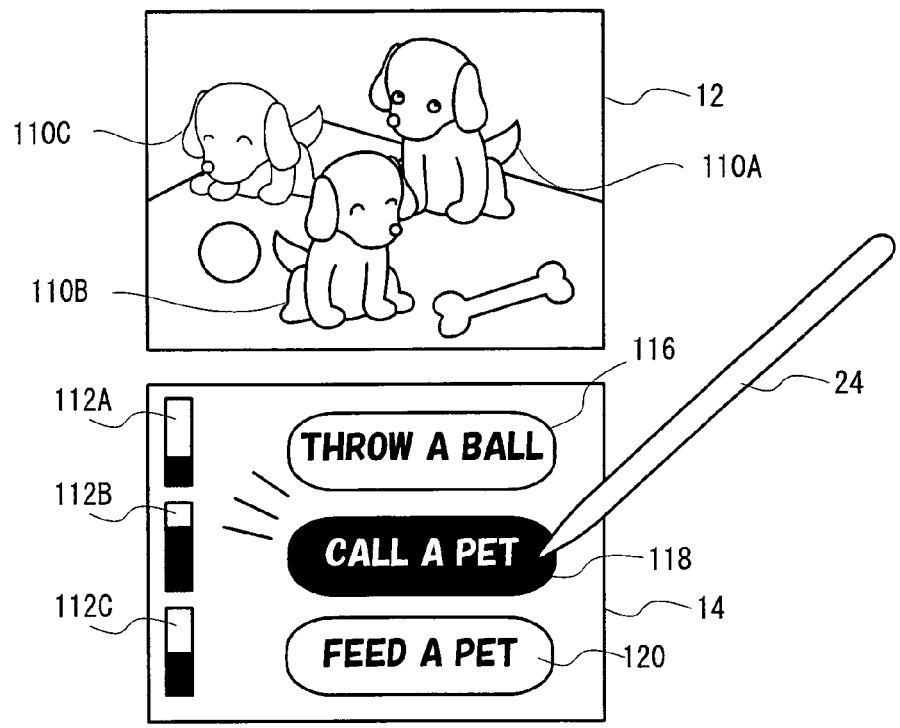
(B)
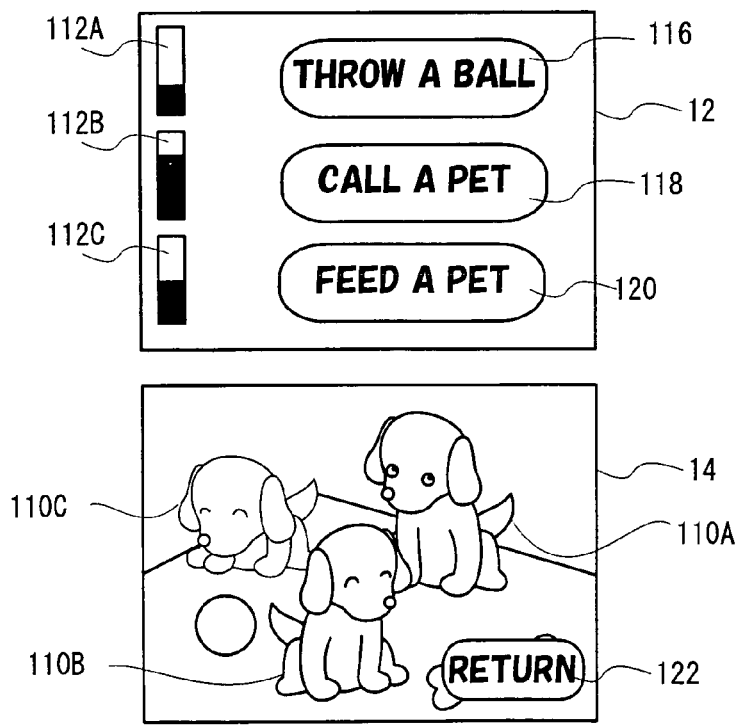

FIG. 22
(A)
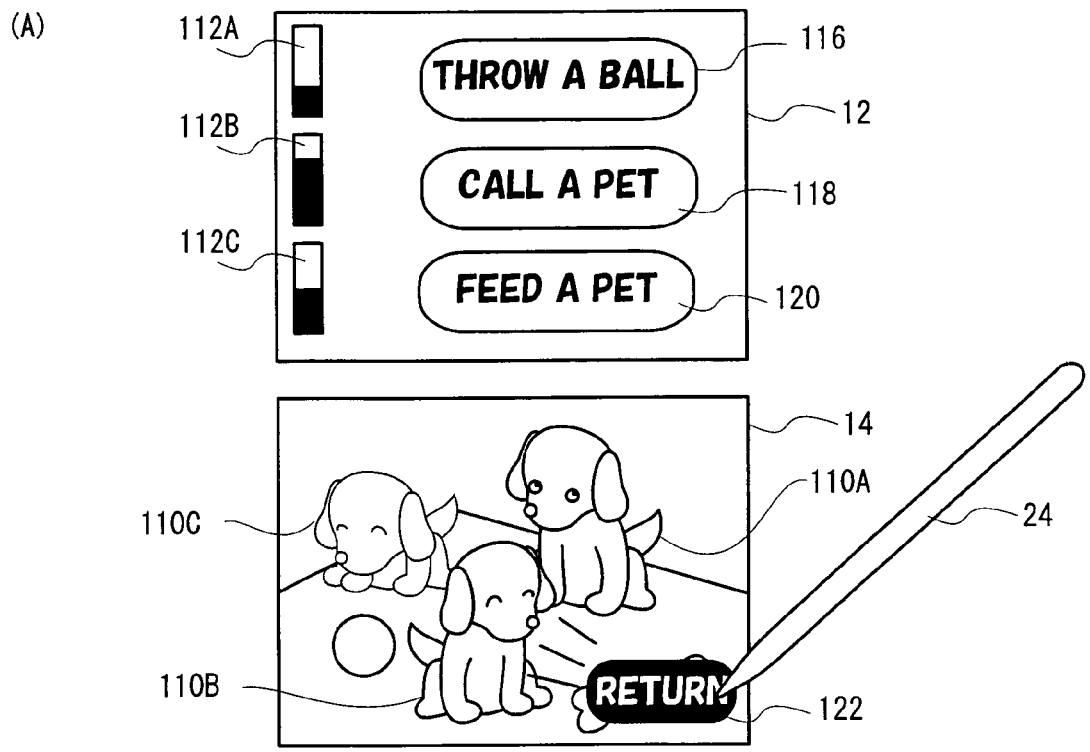
(B)
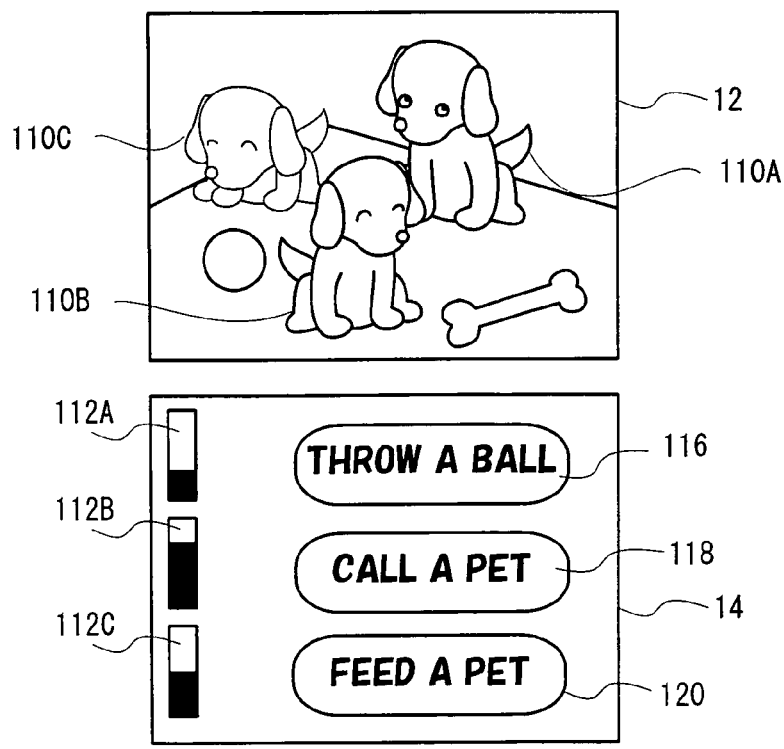

FIG. 26
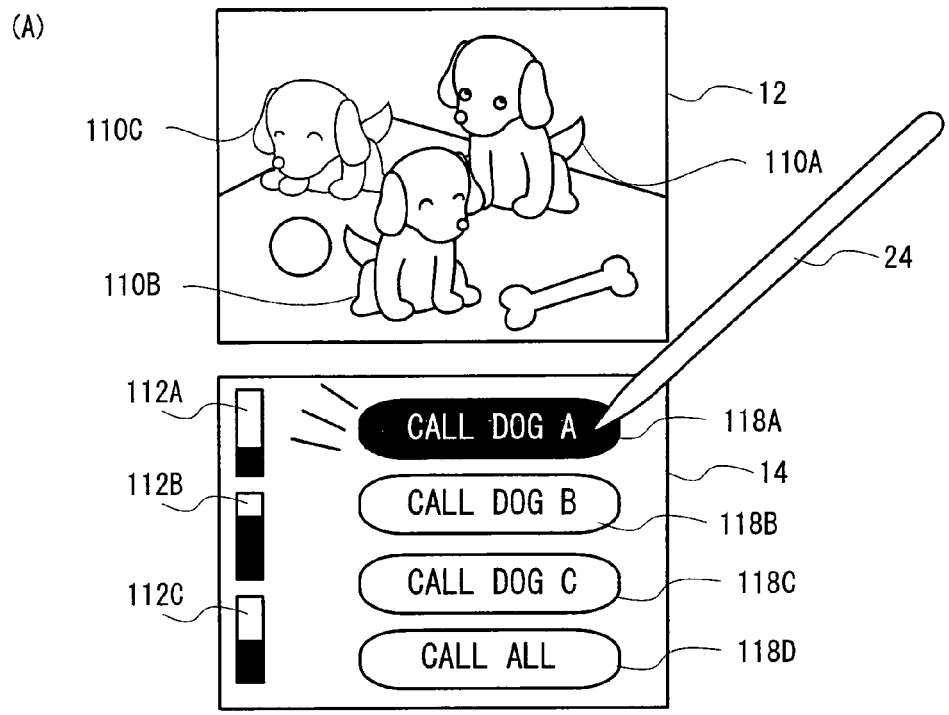
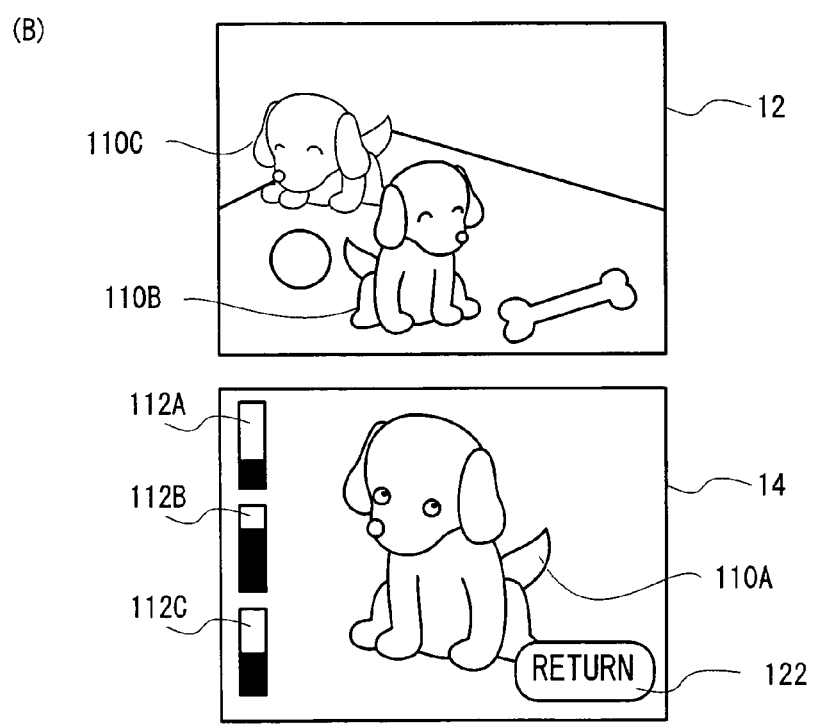

FIG. 27
(A)
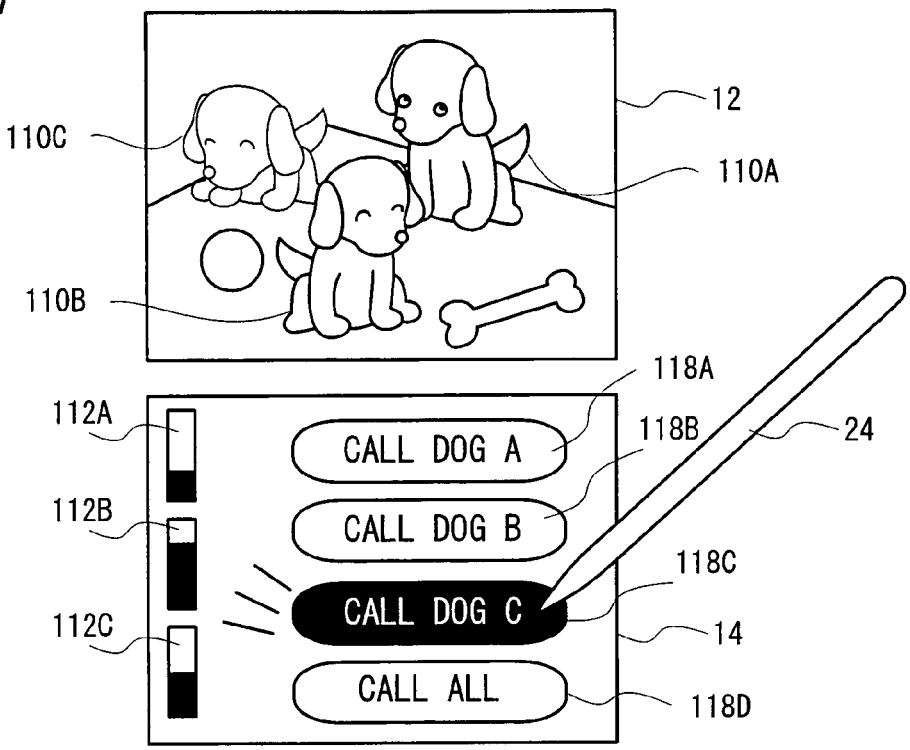
(B)
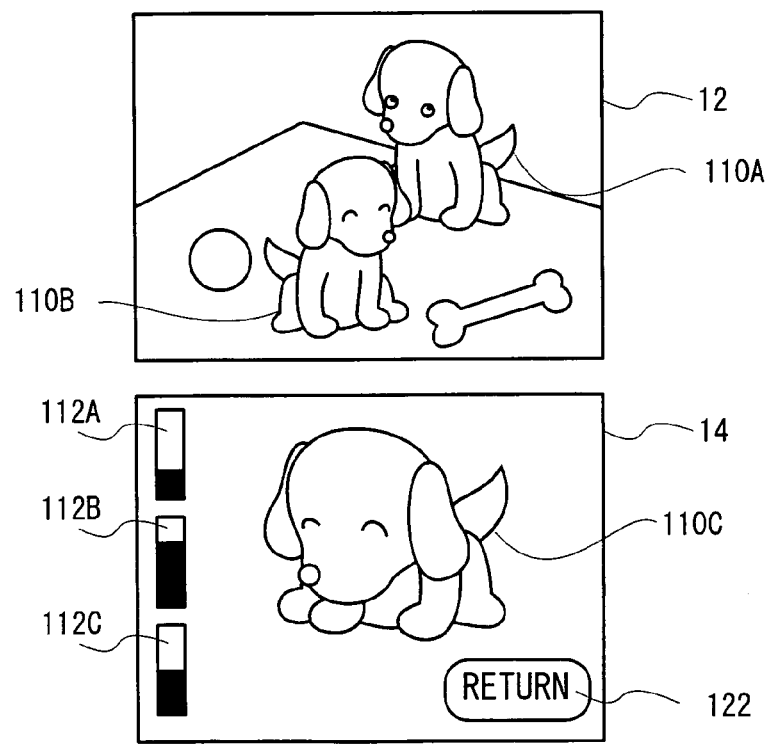

FIG. 28
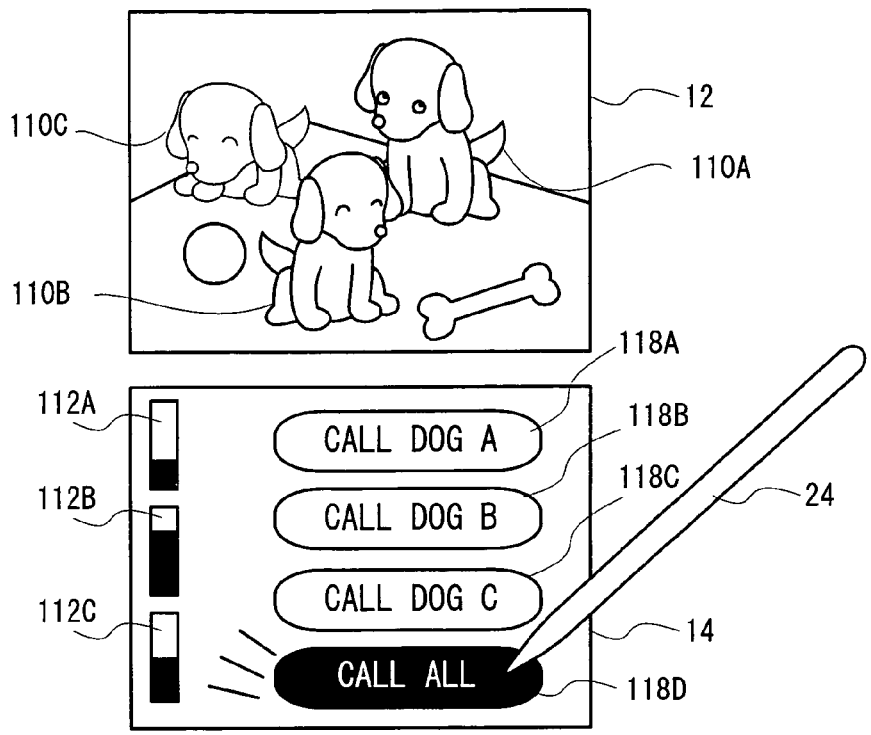
(A)
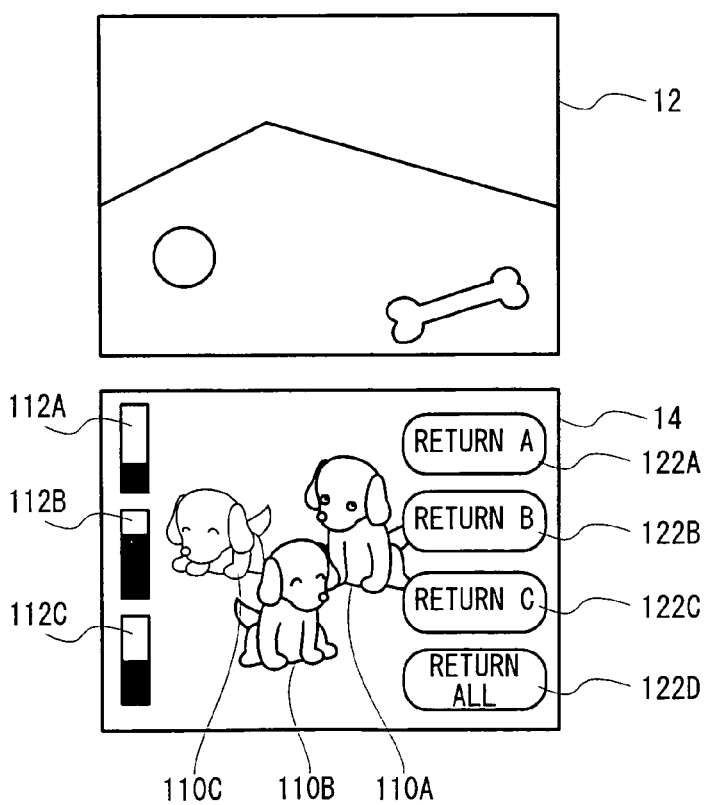
(B)

FIG. 29
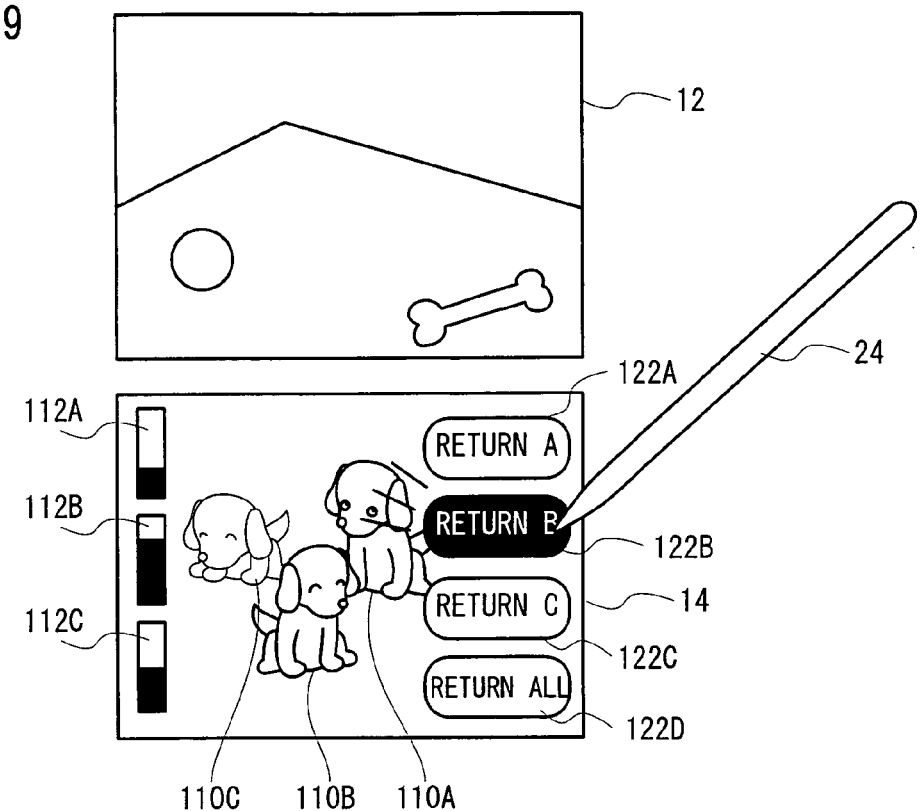
(A)
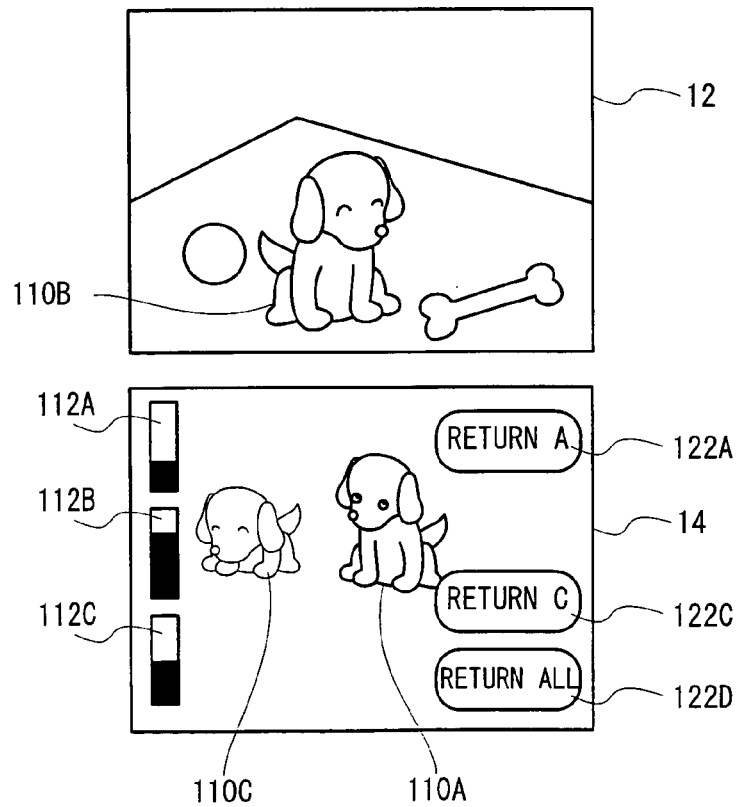
(B)

FIG. 30
(A)
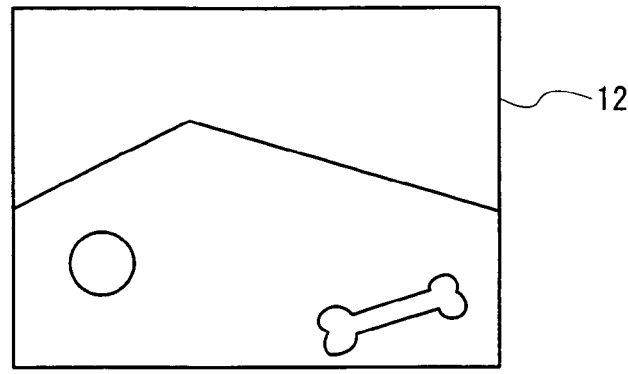
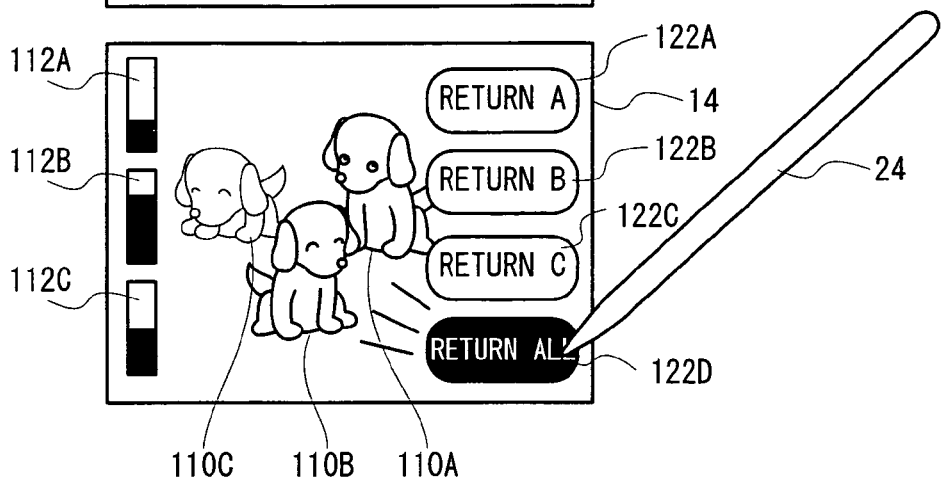
(B)
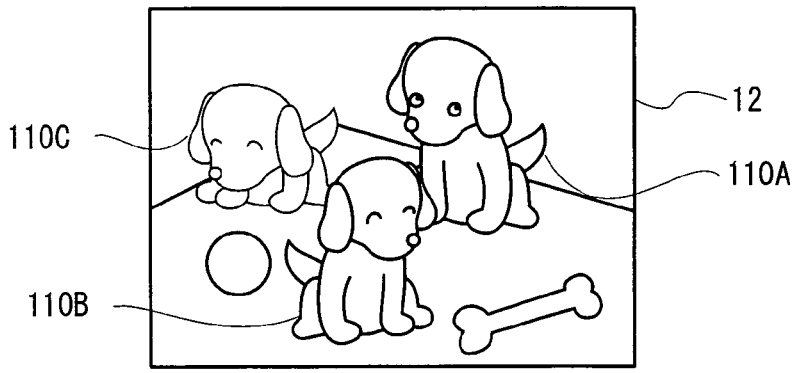
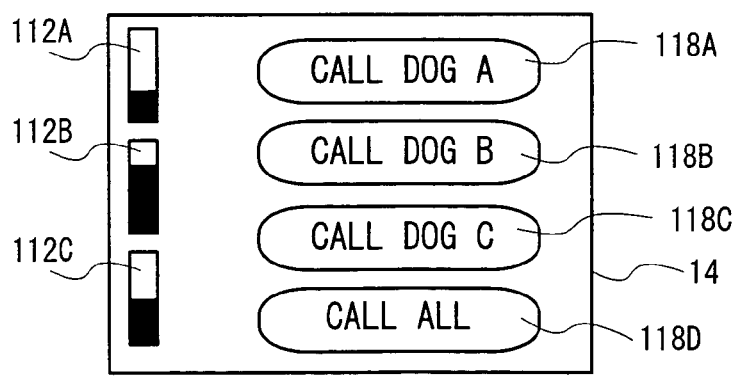

GAME APPARATUS, GAME PROGRAM, STORAGE MEDIUM STORING GAME PROGRAM AND GAME CONTROL METHOD

CROSS-REFERENCE TO RELATED APPLICATIONS

This application is the US national phase of international application PCT/JP2005/003561, filed 24 Feb. 2005, which designated the U.S. and claims priority of JP 2004-083248, filed 22 Mar. 2004, the entire contents of each of which are hereby incorporated by reference.

TECHNICAL FIELD

The technology herein relates to a game apparatus, a game program, a storage medium storing a game program, and a game control method. More specifically, the technology relates to a game apparatus, a game program, a storage medium storing game program, and a game control method which control the display of game images between a first display portion and a second display portion according to a user input.

BACKGROUND AND SUMMARY

A handheld terminal with touch panel, for example, is disclosed in the document 1 (Japanese Patent Laying-open No. 4-369027). In the handheld terminal of the document 1, two screens are vertically arranged. One screen is provided with a touch panel, and on the screen, a keyboard image is fixedly displayed for an operation input.

Also, one example of a hand-held game apparatus utilizing two screens without a touch panel is disclosed in the document 2 (Japanese Patent Laying-open No. 58-116377). In the hand-held game apparatus of the document 2, two screens are vertically arranged, on the upper screen, an image of appearance of a building is fixedly displayed, and on the lower screen, an image of the interior is fixedly displayed, and a character and a manner in which oil falls are displayed by segments.

In addition, one example of a playing apparatus utilizing two screens without a touch panel is disclosed in the document 3 (Japanese Patent Laying-open No. 2001-70647). In the playing apparatus of the document 3, one display screen is vertically divided into two, and a battle-type shooting game is played in which characters battled with each other are arranged in each of the divided areas. Then, the areas displaying the respective characters are switched according to a predetermined condition such as a lapse of a predetermined time period or success of a specific attack, for example.

Furthermore, one example of an operation device of an image display apparatus utilizing a touch panel is disclosed in the document 4 (Japanese Patent Laying-open No. 2000-134503). In the operation device of the image display apparatus in the document 4, images are switched according to a touch position on the touch panel. For example, on the image display apparatus, an image of a swimming fish is displayed, and if the touch panel is touched with a finger, the touch position and a position of the fish are compared with each other, and when the both are within a range of a constant distance, the image is switched to an image where the fish swims away from the touch position.

In the handheld terminal of the document 1, the keyboard image for an operation input is only displayed on the screen with touch panel. This is suitable for a text input and an input of still image information, but fails to disclose display of an operation input screen for a movie display, such as a video game, etc. and a displayed content corresponding to the operation input, and fails to clearly show usage (displayed content of software), that is, how the two screens are specifically utilized in the video game.

Also, in the hand-held game apparatus of the document 2, as to the images displayed on the upper and lower screens, the background is fixedly displayed, and the moving character and the oil are displayed by segments. Then, by operating the operating means, display positions of the characters on the two screens are controlled. On the upper and lower screens, the images of the appearance of the building and the interior are merely fixedly displayed, and it fails to disclose a control of the usage of the two screens relating to an operation by an input means with touch panel, for example.

In addition, in the playing apparatus in the document 3, the display areas of the respective characters are switched according to the predetermined condition, such as a lapse of a fixed time period, success of the specific attack, etc., but this merely intends to cancel inequality of a playing condition between the players due to the positional difference, and it fails to disclose a control of the usage of the two screens relating to an operation by the input means with touch panel, for example.

Furthermore, in the operation device in the document 4, depending on the touch position of the finger on the touch panel, output image data is simply switched, and it fails to disclose a control of the usage of the two screens relating to an operation by the touch panel, for example.

Therefore, non-limiting illustrative embodiments may provide a novel game apparatus, game program, game program storing medium, and a game control method.

Further, non-limiting illustrative embodiments may provide a game apparatus, a game program, a storage medium storing a game program, and a game control method which are able to display a game image required to be input on an imputable display portion with an input means capable of operating any one of the game images on two display portions.

Non-limiting illustrative embodiments may provide a game apparatus, a game program, a storage medium storing a game program, and a game control method which have two screens of display portions and a touch panel set on any one of the screens, and are able to display a game image required to be operated with a touch panel on the screen with a touch panel.

Non-limiting illustrative embodiments may include a first display portion, a second display portion, a storage means, an input means, a coordinates detecting means, an operational object determining means, and an image display controlling means. The storage means stores data to display a game image. The input means is for instructing an arbitrary position in the second display portion. The coordinates detecting means detects coordinates data corresponding to a position instructed by the input means. The operational object determining means determines whether or not a first game image displayed on the first display portion becomes an object to be operated on the basis of the coordinates data detected by the coordinates detecting means. The image display controlling means displays the first game image displayed on the first display portion on the second display portion when it is determined that the first game image becomes an object to be operated by the operational object determining means.

More specifically, the game apparatus (10: reference numeral designating a portion corresponding in the non-limiting illustrative embodiments) includes a first display portion (12) and a second display portion (14). A storage means (28a,

48, 88, 96, 98) stores data to display a game image. The input means (22) is for instructing an arbitrary position in the second display portion. In the non-limiting illustrative embodiment a pointing device to be operated by a user or a player, such as a touch panel, for example, is utilized. A coordinates detecting means (42, 72, S33, S41, S61, S97, S115, S153) detects coordinates data corresponding to a position instructed by the input means. The operational object determining means (42, 76, S45, S47, S101, S103, S223) determines whether or not a first game image (110) displayed on the first display portion becomes an object to be operated on the basis of the coordinates data detected by the coordinates detecting means. An image display controlling means (42, 50, 52, 60, 74, S3, S13, S105, S113, S181, S225, S229) displays the first game image displayed on the first display portion on the second display portion when it is determined that the first game image becomes an object to be operated by the operational object determining means.

Accordingly, on the basis of the coordinates input by the input means, it is possible to determine whether or not the first game image displayed on the first display portion which is not instructed by the input means becomes an object to be operated. For example, an icon is displayed on the screen with an input means, and in response to a selection of the icon by the input means, it can be determined that it becomes an object to be operated, or in response to a specific operation (double-click operation, sliding movement operation, or the like) by the input means, it can be determined that it becomes an object to be operated. Then, if the first game image displayed on the first display portion which is not instructed by the input means becomes an object to be operated, the first game image can be displayed on the second display portion. Thus, the game image required to be input with the input means can be displayed on the imputable display portion.

In one aspect, the game apparatus further comprises a game processing means (42, S19, S119, S123) for performing a game process on the game image displayed on the second display portion on the basis of the coordinates data detected by the coordinates detecting means. Accordingly, by performing an input operation on a game image displayed on the imputable second display portion, the player can play a game.

Non-limiting illustrative embodiments may include a first display portion, a second display portion, a storage means, an input means, a coordinates detecting means, a movement instructing means, a movement instruction detecting means, an operational object determining means, an image display controlling means, and a game processing means. The storage means stores data to display a game image. The input means is for instructing an arbitrary position in the second display portion. The coordinates detecting means detects coordinates data corresponding to a position instructed by the input means. The movement instructing means is for instructing a movement of the game image between the first display portion and the second display portion. The movement instruction detecting means detects movement instructing data from the movement instructing means. The operational object determining means determines whether or not a first game image displayed on the first display portion becomes an object to be operated on the basis of the movement instructing data detected by the movement instruction detecting means. The image display controlling means displays the first game image displayed on the first display portion on the second display portion when it is determined that the first game image becomes an object to be operated by the operational object determining means. The game processing means performs a game process on the game image displayed on the second display portion on the basis of the coordinates data detected by the coordinates detecting means.

More specifically, the game apparatus (10) may determine an object to be operated image on the basis of movement instructing data by the movement instructing means. That is, the game apparatus includes a first display portion (12) and a second display portion (14). A storage means (28a, 48, 88, 96, 98) stores data to display a game image. The input means (22) is for instructing an arbitrary position in the second display portion. In the non-limiting illustrative embodiment, a pointing device to be operated by a user or a player, such as a touch panel, for example, is utilized. A coordinates detecting means (42, 72, S33, S41, S61, S97, S115, S153) detects coordinates data corresponding to a position instructed by the input means. A movement instructing means (20, 34) is for instructing a movement of the game image between the first display portion and the second display portion. In the non-limiting illustrative embodiment, the operating switch (20) to be operated by the player or the user or a microphone (34) obtained by a voice of the user are applied, that is, a movement instruction is performed by an input from the operating switch or a voice input by the user. A movement instruction detecting means (42, S321, S323) detects movement instructing data from the movement instructing means. In the non-limiting illustrative embodiment, operation input data from the operating switch or sound input data from the microphone is detected. An operational object determining means (42, 76, 5103, 5321, S323) determines whether or not a first game image displayed on the first display portion becomes an object to be operated on the basis of the movement instructing data detected by the movement instruction detecting means. An image display controlling means (42, 50, 52, 60, 74, S105, S181) displays the first game image displayed on the first display portion on the second display portion when it is determined that the first game image (110) becomes an object to be operated by the operational object determining means. A game processing means (42, S119, S123) performs a game process on the game image displayed on the second display portion on the basis of the coordinates data detected by the coordinates detecting means.

Accordingly in a non-limiting illustrative embodiment, in response to an instruction from the movement instructing means, it is possible to determine that a game image displayed on the first display portion with no input means becomes an object to be operated. For example, in response to a predetermined operation button separately provided from the input means being operated, it is possible to determine that it becomes an object to be operated. Or, in response to a voice input from the microphone being detected, it is possible to determine that it becomes an object to be operated. Then, if the first game image displayed on the first display portion which is not instructed by the input means becomes an object to be operated, the first game image can be displayed on the second display portion. Thus, a game image required to be input by the input means is displayed on the imputable display portion, and the player plays a game by performing an input operation to the game image.

In a non-limiting illustrative embodiment, an image display controlling means (S15, S183) displays a second game image (116, 118, 120) displayed on the second display portion on the first display portion when it is determined that the first game image becomes an object to be operated by the operational object determining means. Therefore, in an input required state by the input means, the first game image displayed on the first display portion and the second game image displayed on the second display portion can be switched to allow the player to perform an input operation on the switched first game image to play a game.

In another non-limiting illustrative embodiment, an operational object determining means (S65, S71, S77, S127, S129, S191, S241, S331, S333) further determines whether or not the first game image displayed on the second display portion by the image display controlling means does not become an object to be operated. The image display controlling means (S3, S9, S131, S135, S193, S243, S247) displays the first game image on the first display portion when it is determined that the first game image displayed on the second display portion does not become an object to be operated by the operational object determining means. Accordingly, after a game image required to be input by the input means is moved to the second display portion, when the game image does not become an object to be operated, it is displayed on the first display portion with no input means, and therefore, it is possible to change a display destination of the game image depending on whether or not an input by the input means is required.

In the other non-limiting illustrative embodiment, the game processing means changes the first game image displayed on the second display portion by the image display controlling means on the basis of the coordinates data detected by the coordinates detecting means. The image display controlling means displays the first game image changed by the game processing means on the first display portion when it is determined that the first game image does not become an object to be operated by the operational object determining means. Accordingly, after the game image required to be input with the input means is moved to the second display portion to change the display on the basis of an input from the input means, when the game image does not become an object to be operated, the changed game image can be displayed on the first display portion, and therefore, it is possible to clearly show the image required to be input to the player, capable of increasing playability.

In a further non-limiting illustrative embodiment, the operational object determining means includes a condition determining means (42, 82, S127, S129, S191, S241, S331, S333) for determining whether or not a predetermined condition is satisfied in a state that the first game image is being displayed on the second display portion, and by determining that the predetermined condition is satisfied by the condition determining means, determines that the first game image does not become an object to be operated. The image display controlling means displays the first game image displayed on the second display portion on the first display portion and displays the second game image displayed on the first display portion on the second display portion when it is determined that the first game image does not become an object to be operated by the operational object determining means. Thus, after the game images are switched with each other, when the predetermined condition is satisfied, it is determined that the game image displayed on the second display portion with an input means does not become an object to be operated, the game images can be switched with each other again.

In another non-limiting illustrative embodiment, the storage means stores data to display a game image including a plurality of figures. In the embodiment, the figure is a card, a character (pets 110 A-C), an icon (116, 118, 120), etc. The operational object determining means includes a selected figure determining means (78, S45, S101) for determining whether or not any one of a figure out of the plurality of figures of the second game image displayed on the second display portion is selected on the basis of the coordinates data detected by the coordinates detecting means, and by determining that the figure is selected by the selected figure determining means, determines that the first game image displayed on the first display portion becomes an object to be operated. The image display controlling means (S13, S15, S181, S183) displays the first game image displayed on the first display portion on the second display portion and displays the second game image displayed on the second display portion on the first display portion when it is determined that the first game image becomes an object to be operated by the operational object determining means. Thus, when any one of the plurality of figures of the second game image displayed on the second display portion with an input means is selected, it is determined that the first game image displayed on the first display portion with no input means becomes an object to be operated, and the game images are switched with each other. For example, in a card game in which the game image indicative of a hand and the game image indicative of the cards on the board each including a plurality of cards as the plurality of figures are displayed, the hand is displayed on the second display portion with input means, and the cards on the board are displayed on the first display portion with no input means. When the player selects any one of the cards out of the hand by designating a position on the second display portion with the input means, the selected card has to be placed on the cards on the board. Therefore, by determining that the game image of the cards on the board becomes an object to be operated, the hand and the cards on the board can be switched with each other. Thus, in the input required state by the input means, the hand and the cards on the board can be switched, capable of operating both of the hand and the cards on the board with the input means as necessary. Also, in a pet-raising simulation game, for example, in which a game image including a plurality of game characters and a game image including an operation icon are displayed, in an input required state by the input means, the game screen including a character and the screen including an operation icon can be switched, capable of operating the both with the input means as necessary.

Furthermore, in the other embodiment, the image display controlling means (S13,S15,S19) displays on the first display portion a third game image obtained by changing the second game image in such a manner as to exclude the selected FIG. 102) from the second game image displayed on second display portion and displays the first game image displayed on the first display portion and the selected figure on the second display portion when it is determined that the first game image becomes an object to be operated by the operational object determining means. In this case, the first game image and the second game image can be switched, keeping the selected figure on the second display portion. For example, in the card game described above, keeping the selected card on the screen with an input means as it is, the hand except for the selected card and the cards on the board can be switched.

In addition, in a further non-limiting illustrative embodiment, the operational object determining means includes a figure arrangement position determining means (80, S65) for determining whether or not the selected figure is arranged in a predetermined position in the first game image on the basis of the coordinates data detected by the coordinates detecting means after the first game image is displayed on the second display portion by the image display controlling means, and by determining that the selected figure is arranged in the predetermined position by the figure arrangement position determining means, determines that the first game image does not become an object to be operated. An image display controlling means (S67, S7, S9) displays on the first display portion a fourth game image changed in such a manner as to arrange the selected figure in the predetermined position of the first game image, and displays the third game image displayed on the first display portion on the second display portion when it is determined that the first game image does not become an object to be operated by the operational object determining means. Thus, after the game images are switched with each other, when the selected figure is arranged in a predetermined position, it is determined that the game image displayed on the screen with an input means does not become an object to be operated, and the game images can be switched with each other again.

In another non-limiting illustrative embodiment, a storage means stores data to display a first game image including a plurality of game characters (110 A-C) and data to display a second game image including a plurality of selected FIGS. 118A-D) to select each of the plurality of game characters. An operational object determining means includes a selected figure determining means (S223) for determining whether or not any of the plurality of selected figures displayed on the second display portion is selected on the basis of the coordinates data detected by the coordinates detecting means, and by determining that any of the plurality of selected figures is selected by the selected figure determining means, determines that the game character corresponding to the selected figure out of the plurality of game characters displayed on the first display portion becomes an object to be operated. An image display controlling means (S225, S227, S229) displays the game character which is determined to become an object to be operated by the operational object determining means in such manner as to move to the second display portion. In this case, a plurality of game characters are displayed on the screen with no input means, and a plurality of selected figures for respectively selecting the plurality of game characters are displayed on the screen with an input means, and when any of the selected figure is selected on the screen with an input means, a game character corresponding to the selected figure can be displayed in such a manner as to move to the screen with an input means. Therefore, it is possible to select a game character desired to be operated out of the plurality of game characters and move it to the screen with an input means.

In the other non-limiting illustrative embodiment, the operational object determining means includes a condition determining means (82, S127, S241) for determining whether or not a predetermined condition is satisfied in a state that the game character is being displayed on the second display portion by the image display controlling means, and by determining that the predetermined condition is satisfied by the condition determining means, determines that the game character displayed on the second display portion does not become an object to be operated. The image display controlling means (S133, S135, S243, S245, S247) displays the game character in such a manner as to move to the first display portion when the game character displayed on the second display portion does not become an object to be operated by the operational object determining means. In this case, after the game character is moved to the second display portion, when the predetermined condition is satisfied, it is determined that the game character displayed on the second display portion with input means does not become an object to be operated, and it is moved to the first display portion.

A game apparatus may further include a parameter storing means, a parameter display means, and a parameter changing means. A parameter storing means (92) stores parameter data indicative of a parameter of each of the plurality of game characters. A parameter display means (42, 50, 52, 60, 84, S95, S159, S163) displays the parameter on any one of the first display portion and the second display portion on the basis of the parameter data stored in the parameter storing means. A parameter changing means (42, 86, S159, S163, S205, S209) changes the parameter displayed by the parameter display means on the basis of the coordinates data detected by the coordinates detecting means. An image display controlling means (S155, S157, S161, S133, S135, S193, S203, S207, S245, S247) displays the game character changed on the basis of the coordinates data detected by the coordinates detecting means in such a manner as to move to the first display portion when it is determined that the game character displayed on the second display portion does not become an object to be operated by the operational object determining means. In this case, by displaying a parameter of the character on any one of the two screens, it is possible to change a game character displayed on the screen with an input means in response to an input from the input means, and change the parameter. When it is determined that the game character does not become an object to be operated on the basis of satisfaction of the predetermined condition, etc., it is possible to display the game character changed in response to an input operation in such a manner as to move to the game screen with no input means. Thus, for example, it is possible to realize a game in which the parameter such as feelings and a degree of domestication of the character can be changed in response to the input.

In one non-limiting illustrative embodiment, the predetermined condition of the determination by the condition determining means includes absence of detection of the coordinates data for a fixed period of time. In this case, if an instruction by the input means is absent for a fixed period of time, it is considered that the player has no intention for a further input operation, the game image or game character displayed on the screen with an input means can be moved to the screen with no input means, or the game image or the game character and the game image displayed on the screen with no input means can be switched with each other.

A game apparatus may include a selected area storing means (88) for storing data to display a selected area (122) to instruct returning the first game image displayed on the second display portion to the first display portion. The image display controlling means (S185, S231) displays the selected area on the second display portion when the first game image is displayed on the second display portion. The predetermined condition of the determination by the condition determining means includes a fact that the coordinates data detected by the coordinates detecting means indicates a display position of the selected area. In this case, if the selected area is selected by the player, the game image or game character displayed on the screen with an input means can be returned to the screen with no input means, or the game image or game character and the game image displayed on the screen with no input means can be switched with each other. Thus, it is possible to move the game image and switch the game images with clear player's intention.

In one non-limiting illustrative embodiment, the image display controlling means (S197, S249) erases the selected area displayed on the second display portion when it is determined that the first game image does not become an object to be operated by the operational object determining means. In this case, the selected area can be displayed only when needed, and the selected area cannot be displayed when not needed.

Furthermore, in another non-limiting illustrative embodiment, the figure included in the game image may include a game character or an icon. In this case, the game character and the icon are displayed as a game image, and therefore, it is possible to realize a game in which the game character becomes an object to be operated and move between the screens in response to a selection of an icon, for example.

In addition, in the other non-limiting illustrative embodiment, the input means is a touch panel set on the second display portion. In this case, the input means is a touch panel, and therefore, a direct touch operation to the game image is possible to realize an intuitive operation. If the game image displayed on the screen with no touch panel becomes an object to be operated, the game image is displayed on the screen with a touch panel, and therefore, the game image required for a touch panel operation can be moved to the screen with a touch panel so as to be displayed, and the player can play a game by operating the game image.

A non-limiting illustrative game program may be a game program of a game apparatus having a first display portion, a second display portion, a storage means for storing data to display a game image, and an input means for instructing an arbitrary position in the second display portion. The game program causes a processor of the game apparatus to execute a coordinates detecting step, an operational object determining step, and an image display controlling step. The coordinates detecting step detects coordinates data corresponding to a position instructed by the input means. The operational object determining step determines whether or not a first game image displayed on the first display portion becomes an object to be operated on the basis of the coordinates data detected by the coordinates detecting step. The image display controlling step displays the first game image displayed on the first display portion on the second display portion when it is determined that the first game image becomes an object to be operated by the operational object determining step.

A non-limiting illustrative storage medium storing game program may be a storage medium storing a game program of a game apparatus having a first display portion, a second display portion, a storage means for storing data to display a game image, and an input means for instructing an arbitrary position in the second display portion. The game program of the storage medium causes a processor of the game apparatus to execute a coordinates detecting step, an operational object determining step, and an image display controlling step. The coordinates detecting step detects coordinates data corresponding to a position instructed by the input means. The operational object determining step determines whether or not a first game image displayed on the first display portion becomes an object to be operated on the basis of the coordinates data detected by the coordinates detecting step. The image display controlling step displays the first game image displayed on the first display portion on the second display portion when it is determined that the first game image becomes an object to be operated by the operational object determining step.

A non-limiting illustrative game control method may be a game control method of a game apparatus having a first display portion, a second display portion, a storage means for storing data to display a game image, and an input means for instructing an arbitrary position in the second display portion. The game control method includes a coordinates detecting step, an operational object determining step, and an image display controlling step. The coordinates detecting step detects coordinates data corresponding to a position instructed by the input means. The operational object determining step determines whether or not a first game image displayed on the first display portion becomes an object to be operated on the basis of the coordinates data detected by the coordinates detecting step. The image display controlling step displays the first game image displayed on the first display portion on the second display portion when it is determined that the first game image becomes an object to be operated by the operational object determining step.

A non-limiting illustrative game program may be a game program of a game apparatus having a first display portion, a second display portion, a storage means for storing data to display a game image, and an input means for instructing an arbitrary position in the second display portion, and a movement instructing means for instructing a movement of the game image between the first display portion and the second display portion. The game program causes a processor of the game apparatus to execute a movement instruction detecting step, an operational object determining step, an image display controlling step, a coordinates detecting step, and a game processing step. The movement instruction detecting step detects movement instructing data from the movement instructing means. The operational object determining step determines whether or not a first game image displayed on the first display portion becomes an object to be operated on the basis of the movement instructing data detected by the movement instruction detecting step. The image display controlling step displays the first game image displayed on the first display portion on the second display portion when it is determined that the first game image becomes an object to be operated by the operational object determining step. The coordinates detecting step detects coordinates data corresponding to the position instructed by the input means. The game processing step performs a game process on the game image displayed on the second display portion on the basis of the coordinates data detected by the coordinates detecting step.

A non-limiting illustrative storage medium storing a game program may be a storage medium storing game program of a game apparatus having a first display portion, a second display portion, a storage means for storing data to display a game image, an input means for instructing an arbitrary position in the second display portion, and a movement instructing means for instructing a movement of the game image between the first display portion and the second display portion. The game program of the storage medium causes a processor of the game apparatus to execute a movement instruction detecting step, an operational object determining step, an image display controlling step, a coordinates detecting step, and a game processing step. The movement instruction detecting step detects movement instructing data from the movement instructing means. The operational object determining step determines whether or not a first game image displayed on the first display portion becomes an object to be operated on the basis of the movement instructing data detected by the movement instruction detecting step. The image display controlling step displays the first game image displayed on the first display portion on the second display portion when it is determined that the first game image becomes an object to be operated by the operational object determining step. The coordinates detecting step detects coordinates data corresponding to the position instructed by the input means. The game processing step performs a game process on the game image displayed on the second display portion on the basis of the coordinates data detected by the coordinates detecting step.

A non-limiting illustrative game control method may be a game control method of a game apparatus having a first display portion, a second display portion, a storage means for storing data to display a game image, an input means for instructing an arbitrary position in the second display portion, and a movement instructing means for instructing a movement of the game image between the first display portion and the second display portion. The game control method includes a movement instruction detecting step, an operational object determining step, an image display controlling step, a coordinates detecting step, and a game processing step. The movement instruction detecting step detects movement instructing data from the movement instructing means. The operational object determining step determines whether or not a first game image displayed on the first display portion becomes an object to be operated on the basis of the movement instructing data detected by the movement instruction detecting step. The image display controlling step displays the first game image displayed on the first display portion on the second display portion when it is determined that the first game image becomes an object to be operated by the operational object determining step. The coordinates detecting step detects coordinates data corresponding to the position instructed by the input means. The game processing step performs a game process on the game image displayed on the second display portion on the basis of the coordinates data detected by the coordinates detecting step.

Accordingly, when the game image displayed on the display portion with no input means becomes an object to be operated, the game image can be displayed on the display with an input means. Then, by operating the game image displayed on the display potion with the input means, the game can be played. Therefore, the game image required for an input operation can be displayed on the screen with an input means, and the player can perform an input operation on the game image. Since the game image required for an input operation is displayed on the screen with an input means, it is possible for the player to easily grasp which game image is an object to be operated, allowing an easy game play. Also, if the input means is a touch panel set on the second display portion, the game image required for a touch panel operation can be moved to the screen with a touch panel so as to be displayed, and this makes it possible for the player to play a game with an intuitive operation on the game image.

The above described features and aspects will become more apparent from the following detailed description of the non-limiting illustrative embodiments when taken in conjunction with the accompanying drawings.

BRIEF DESCRIPTION OF THE DRAWINGS

FIG. 21 is an illustrative view showing one example of a display control of the game image in a modified example 1 of the pet-raising simulation game, FIG. 21A shows a scene in which the "Calling a pet" icon on the LCD 14 is instructed with the touch panel, and FIG. 21B shows game screens switched between the LCD 12 and the LCD 14 according to the instruction.

FIG. 22 is an illustrative view showing one example of a display control of the game image in a modified example 1 of the pet-raising simulation game, FIG. 22A shows a scene in which the "Return" icon on the LCD 14 is instructed with the touch panel, and FIG. 22B shows game screens switched between the LCD 12 and the LCD 14 according to the instruction.

FIG. 26 is an illustrative view showing one example of a display control of the game image in a modified example 2 of the pet-raising simulation game, FIG. 26A shows a scene in which the "Call a dog A" icon on the LCD 14 is instructed with the touch panel, and FIG. 26B shows a scene in which the pet (dog A) is displayed on the LCD 14 according to the instruction.

FIG. 27 is an illustrative view showing one example of a display control of the game image in a modified example 2 of the pet-raising simulation game, FIG. 27A shows a scene in which the "Call a dog C" icon on the LCD 14 is instructed with the touch panel, and FIG. 27B shows a scene in which the pet (dog C) is displayed on the LCD 14 according to the instruction.

FIG. 28 is an illustrative view showing one example of a display control of the game image in a modified example 2 of the pet-raising simulation game, FIG. 28A shows a scene in which the "Call all dogs" icon on the LCD 14 is instructed with the touch panel, and FIG. 28B shows a scene in which the all the pets are displayed on the LCD 14 according to the instruction.

FIG. 29 is an illustrative view showing one example of a display control of the game image in a modified example 2 of the pet-raising simulation game, FIG. 29A shows a scene in which the "Return a dog B" icon on the LCD 14 is instructed with the touch panel, and FIG. 29B shows a scene in which the pet (dog B) is displayed on the LCD 12 according to the instruction.

FIG. 30 is an illustrative view showing one example of a display control of the game image in a modified example 2 of the pet-raising simulation game, FIG. 30A shows a scene in which the "Return all dogs" icon on the LCD 14 is instructed with the touch panel, and FIG. 30B shows a scene in which the all the pets are displayed on the LCD 12 according to the instruction.

DETAILED DESCRIPTION

Figure 1:
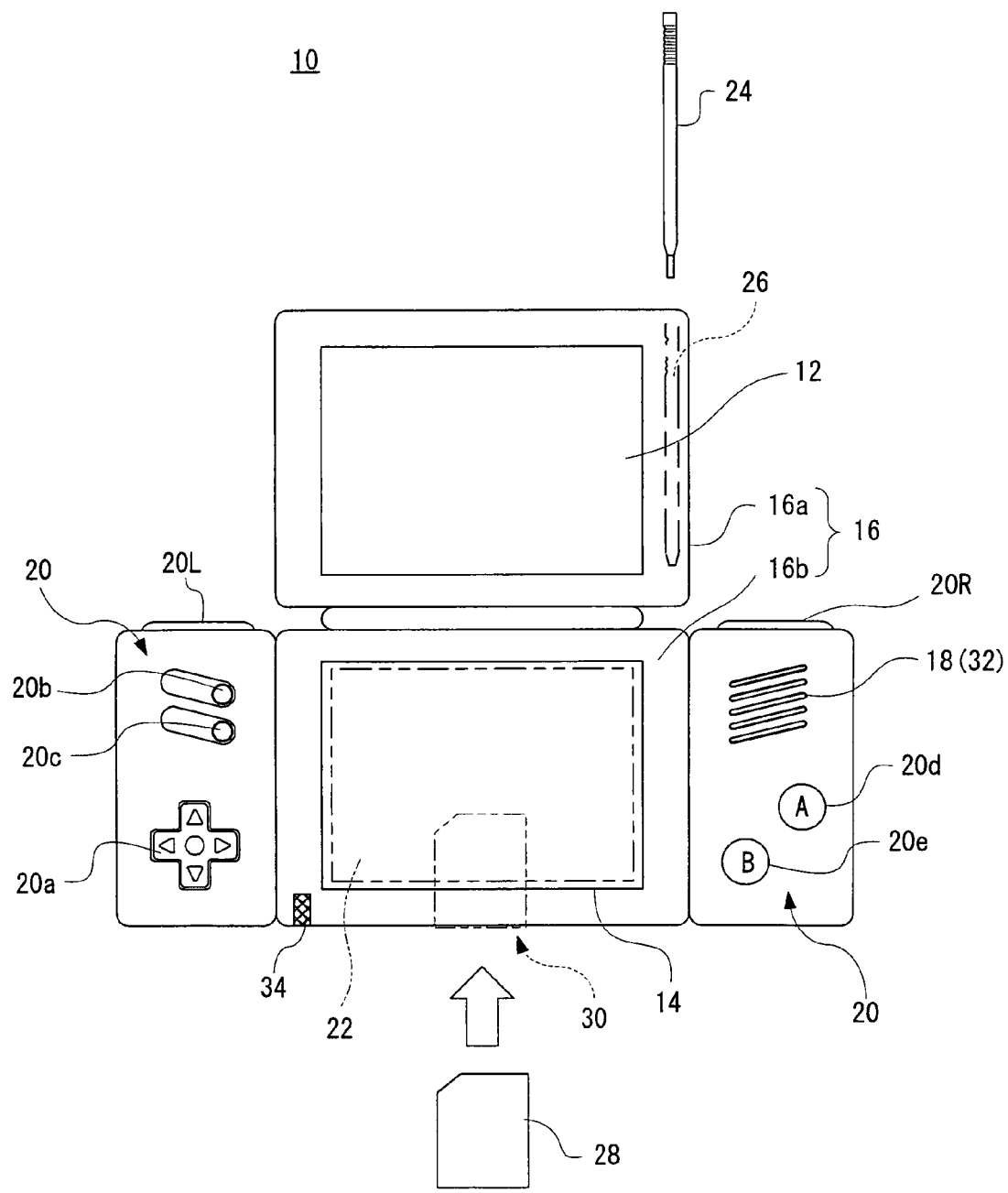
FIG. 1 is an appearance view showing one example of a game apparatus of a non-limiting illustrative embodiment.

Referring to FIG. 1, a non-limiting illustrative embodiment with a game apparatus 10 includes a first liquid crystal display (LCD) 12 and a second LCD 14. The LCD 12 and the LCD 14 are provided on a housing 16 so as to be arranged in a predetermined position. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound emission hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotated to be folded such that the display surface of the LCD 12 and the display surface of the LCD 14 are face to face with each other, it is possible to prevent the display surface of the LCD 12 and the display surface of the LCD 14 from being damaged, such as a surface flaw. It is should be noted that the upper housing 16a and the lower housing 16b may not be rotatably connected with each other, but these may be provided in an integrated (fixed) fashion to form the housing 16.

The operating switch 20 includes a direction instructing switch (cross key) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switch 20L and the switch 20R are placed in a part of an upper edge (top surface) of the lower housing 16b, and lie of each side of the connected portion with the upper housing 16a, that is, besides the connected portion.

A role of each operating switch or button of the operating switch 20 is generally as follows: It should be noted that in this embodiment, the operating switch 20 is utilized for a movement instruction of a game image between the LCD 12 and the LCD 14 as described later, and is not utilized for a game processing of a game image such as a game character, etc. The direction instructing switch 20a, for example, functions as a digital joystick, and is utilized for instructing a moving direction of a player character (or player object) to be operated by a player, instructing a moving direction of a cursor, and so forth by operating at least any one of the four depression portions. The start switch 20b is formed of a push button, and is utilized for starting (restarting), temporarily stopping (pausing) a game, and so forth. The select switch 20c is formed of the push button, and utilized for a game mode selection, etc.

The action switch 20d, that is, the A button 20d is formed of the push button, and allows the player character to perform an arbitrary action except for instructing the direction such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button 20e is formed of the push button, and is utilized for changing a game mode selected by the select switch 20c, canceling an action determined by the A button 20d, and so forth.

The action switch 20L (left depression button) and the action switch 20R (right depression button) are formed of the push button, and the left depression button (L button) 20L and the right depression button (R button) 20R can be utilized for the same operation as the A button 20d and the B button 20e, or can also be utilized for the subsidiary operation of the A button 20d and the B button 20e.

The game apparatus 10 is a game apparatus utilizing a touch panel, and the touch panel 22 is set on the top surface of the LCD 14. As the touch panel 22, any one of a resistance film system, an optical system (infrared rays system), and an electrostatic capacitive coupling system, for example, can be utilized. Also, when being operated by depressing, stroking (touching), and so forth with a stick 24, a pen (stylus pen), or a finger (hereinafter referred to as "stick or the like 24") on a top surface thereof, the touch panel 22 detects a coordinates (e.g., coordinate) position pointed by the stick or the like 24, and outputs coordinates data (e.g., coordinate data) corresponding to the detected coordinates. That is, the touch panel 22 functions as an input means in the embodiment, and is for allowing a user (player) to input the input data to indicate an arbitrary position on the screen of the LCD 14 (or LCD 12).

It should be noted that in this embodiment, a resolution of the display surface of the LCD 14 is 256 dots×192 dots (this is true for the LCD 12), and a detection accuracy of the touch panel 22 is also rendered 256 dots×192 dots in correspondence to the resolution of the display surface. However, the detection accuracy of the touch panel 22 may be lower than the resolution of the display surface, or higher than it.

In this embodiment, for example, a game screen to be viewed by the player is displayed on the LCD 12, and a game screen to be viewed and operated by the player in association with the game screen of the LCD 12 is displayed on the LCD 14 setting the touch panel 22 thereon. The game screen displayed on the LCD 14 includes an object, an icon, textual information, etc. to be operated (touched) with the stick or the like 24. The player directly touches the object displayed on the LCD 14 by operating the touch panel 22 with the stick or the like 24, for example to thereby select or operate the object, perform a coordinate input instruction, and so forth. Also, it is possible to instruct other various input instructions depending on the kind of the game. For example, it is possible to select a command according to texture information, an icon, etc. to be displayed on the display screen of the LCD 14, and instruct a scrolling (gradual movement display) direction of the game screen (map) displayed on the LCD 12.

Thus, the game apparatus 10 has the LCD 12 and the LCD 14 as a display portion of two screens, the touch panel 22 is provided on either of the display screens (LCD 14 in this embodiment), and therefore, the game apparatus 10 has the two screens (LCD 12, 14) and the two systems of the operating portions (20, 22).

Furthermore, in this embodiment, the stick 24 can be inserted into a housing portion (housing slot) 26 provided on a side surface (right side surface) of the upper housing 16a, for example, and taken out therefrom as necessary. It should be noted that in a case of preparing no stick 24, the housing portion 26 need not to be provided.

Also, the game apparatus 10 includes a memory card (or game cartridge) 28. The memory card 28 is detachable, and inserted into a loading slot 30 provided on a rear surface or a lower edge (bottom surface) of the lower housing 16b. Although illustration is omitted in FIG. 1, a connector 46 (see FIG. 2) is provided at a depth portion of the loading slot 30 for connecting a connector (not shown) provided at an end portion of the memory card 28 in the loading direction. Therefore, when the memory card 28 is loaded into the loading slot 30, the connectors are connected with each other, and the memory card 28 is accessible by a CPU core 42 (see FIG. 2) of the game apparatus 10.

In addition, the game apparatus 10 includes a microphone 34, and the microphone 34 is provided in a left obliquely downward direction of the LCD 14 of the lower housing 16b, for example. Accordingly, when a voice (voice of the player or the user) is input from the microphone 34, for example, the game apparatus 10 can operate in response thereto.

It should be noted that although it is not illustrated in FIG. 1, a speaker 32 (see FIG. 2) is provided at a position corresponding to the sound emission hole 18 inside the lower housing 16b.

Furthermore although omitted in FIG. 1, a battery accommodating box is provided on a rear surface of the lower housing 16b, for example. A power switch, a volume adjustment switch, an external expansion connector, an earphone jack, etc. are provided on a bottom surface of the lower housing 16b.

Figure 2:
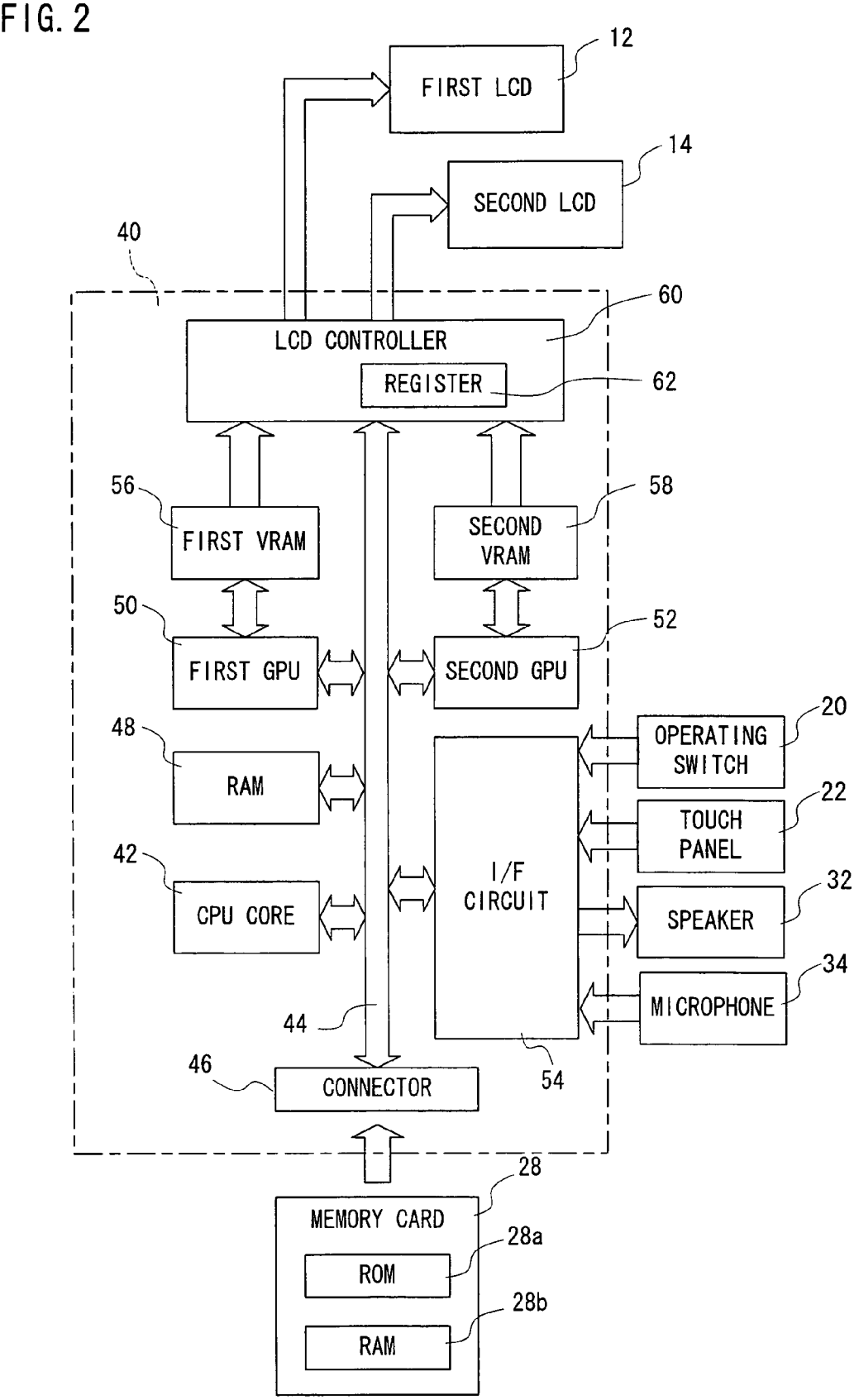
FIG. 2 is a block diagram showing an electric configuration of the game apparatus of FIG. 1 embodiment.

FIG. 2 is a block diagram showing an electric configuration of the game apparatus 10. Referring to FIG. 2, the game apparatus 10 includes an electronic circuit board 40, and on the electronic circuit board 40, a circuit component such as the CPU core 42, etc. is mounted. The CPU core 42 is connected to the connector 46 via a bus 44, and is also connected with a RAM 48, a first Graphics Processing Unit (GPU) 50, a second GPU 52, an input/output interface circuit (hereinafter, referred to as "I/F circuit") 54, and an LCD controller 60.

The connector 46 is detachably connected with the memory card 28 as described above. The memory card 28 includes a ROM 28a and a RAM 28b. Although illustration is omitted, the ROM 28a and the RAM 28b are connected with each other via a bus, and also connected with a connector (not shown) to be connected with the connector 46. Accordingly, as described above, the CPU core 42 gains access to the ROM 28a and the RAM 28b.

The ROM 28a stores in advance a game program for a game (virtual game) to be executed in the game apparatus 10, image data (game character image, background image, item image, message image, operation icon, etc.), and sound or music data (audio data) necessary for the game. The RAM (backup RAM) 28b saves proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. Furthermore, the CPU core 42 executes the game process while storing in a work area and a predetermined area of the RAM 48 data (game data, flag data, etc.) temporarily produced (generated) in correspondence with progress of the process according to the game program.

It should be noted that such the game program, the image data, the sound data, etc. are read from the ROM 28a entirely at a time, or partially and sequentially as necessary so as to be stored into the RAM 48.

Each of the GPU 50 and the GPU 52 forms a part of a rendering means, is constructed by, for example, a single chip ASIC, and receives a graphics command (construction command) from the CPU core 42 to generate data for displaying game image according to the graphics command. Here, the CPU core 42 applies to each of the GPU 50 and the GPU 52 an image generating program (included in the game program) necessary for generating the game image data in addition to the graphics command.

It should be noted that data (image data: a polygon, a texture, etc.) necessary for executing the graphics command is obtained through the access to the RAM 48 by the GPU 50 or GPU 52. The GPU 50 and the GPU 52 may store the created data in the RAM 48.

Also, the GPU 50 is connected to a first video RAM (hereinafter, referred to as "VRAM") 56, and the GPU 52 is connected to a second VRAM 58. The GPU 50 renders the created game image data in the VRAM 56, and the GPU 52 renders the created game image data in the VRAM 58. The VRAM 56 and the VRAM 58 are a line buffer, for example, or may employ a frame buffer.

The VRAM 56 and the VRAM 58 are connected to the LCD controller 60. The LCD controller 60 includes a register 62. The register 62 includes one bit, for example, and stores a value (data value) of "0" or "1" according to an instruction of the CPU core 42. The LCD controller 60 outputs the game image data rendered in the VRAM 56 to the LCD 12, and outputs the game image data rendered in the VRAM 58 to the LCD 14 in a case that the data value of the register 62 is "0". Furthermore, the LCD controller 60 outputs the game image data rendered in the VRAM 56 to the LCD 14, and outputs the game image data rendered in the VRAM 58 to the LCD 12 in a case that the data value of the register 62 is "1".

It should be noted that the LCD controller 60 can directly read the image data from the VRAM 56 and the VRAM 58, or read the image data from the VRAM 56 and VRAM 58 via the GPU 50 and GPU 52. Also, the VRAM 56 and the VRAM 58 may be provided in the RAM 48.

The I/F circuit 54 is connected with the operating switch 20, the touch panel 22, the speaker 32, and the microphone 34. Here, the operating switch 20 is the above-described switches 20*a*, 20*b*, 20*c*, 20*d*, 20*e*, 20L and 20R. When the operating switch 20 is operated, a corresponding operation signal (operation input signal) is input to the CPU core 42 via the I/F circuit 54. Furthermore, the touch input data (coordinate data) from the touch panel 22 is input to the CPU core 42 via the I/F circuit 54. In addition, the CPU core 42 reads the sound data necessary for the game such as a game music (BGM), a sound effect, voices (onomatopoeic sound) of the game character, etc. from the RAM 48, and outputs it from the speaker 32 via the I/F circuit 54. Additionally, a sound (sound signal) input from the microphone 34 is converted into digital data (sound data) by the I/F circuit 54, and the resultant is input to the CPU core 42 as a sound input data.

Figure 3:
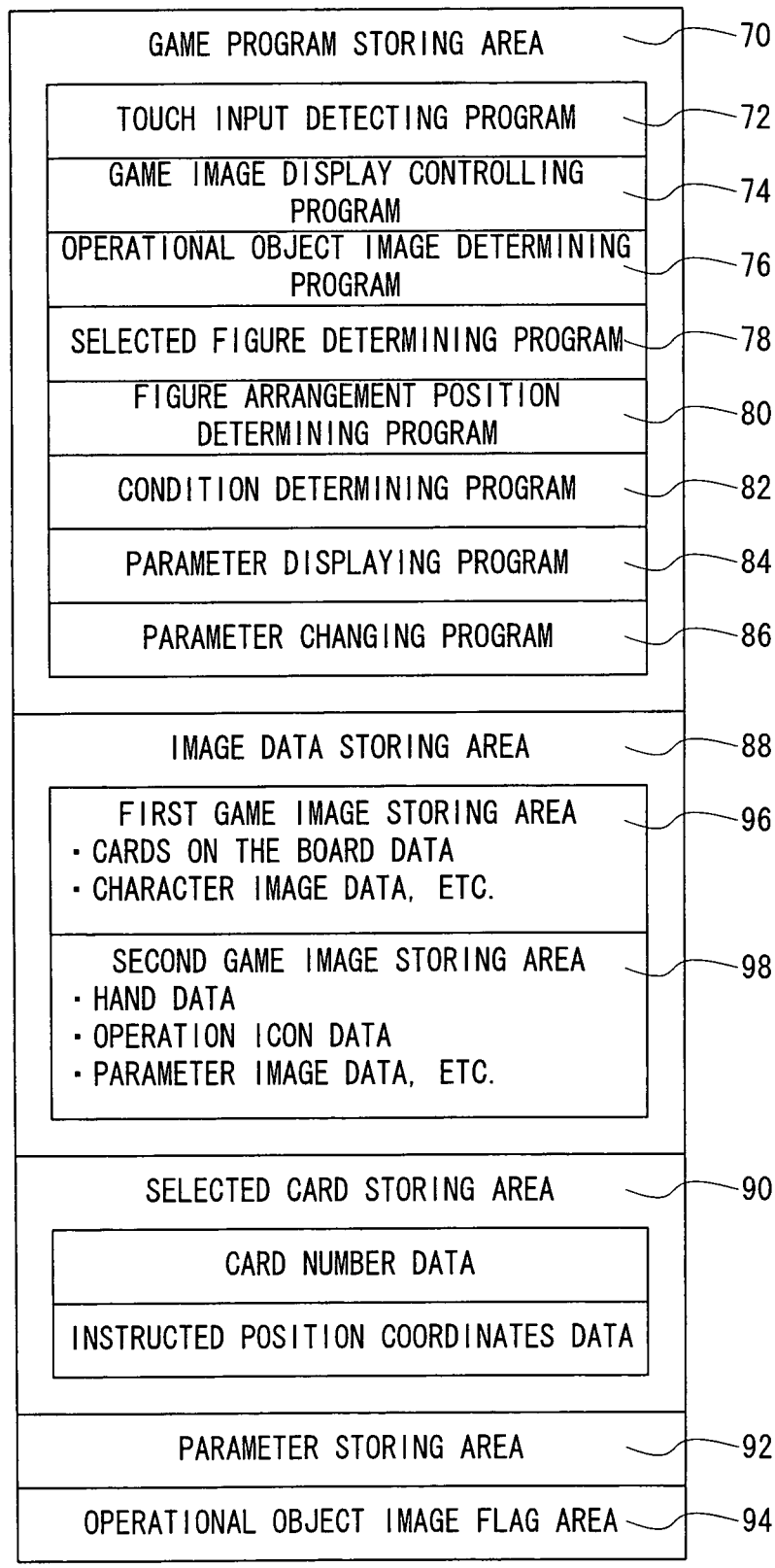
FIG. 3 is an illustrative view showing one example of a memory map of RAM 48 shown in FIG. 2.

FIG. 3 shows one example of a memory map of the RAM 48. The RAM 48 includes a game program storing area 70. Into the game program storing area 70, a game program is loaded from the ROM 28*a* of the memory card 28. The game program of the embodiment includes a touch input detecting program 72, a game image display controlling program 74, an operational object image determining program 76, a selected figure determining program 78, a figure arrangement position determining program 80, a condition determining program 82, parameter displaying program 84, a parameter changing program 86, etc.

The touch input detecting program 72 is a program for detecting coordinates data (touch input data) of a touched position input from the touch panel 22 in response to an operation of the touch panel 22 by the player. The detected coordinates data is stored in a predetermined area of the RAM 48.

The game image display controlling program 74 is a program for generating game images to be displayed on the LCD 12 and the LCD 14 on the basis of image data, etc. to display them on the LCD 12 and the LCD 14. By the program, for example, a game processing is executed on the game image to be displayed on the LCD 14 on the basis of touch input data, etc, and the game image is changed. If a game image to be displayed on the LCD 12 with no touch panel 22 becomes an object to be operated, the game image is displayed on the LCD 14 with touch panel 22. Furthermore, if the game image to be displayed on the LCD 14 does not become an object to be operated, the game image is displayed on the LCD 12.

The operational object image determining program 76 is a program for determining whether or not the game image is an object to be operated. For example, it is determined whether or not the game image displayed on the LCD 12 with no touch panel 22 becomes an object to be operated on the basis of the touch input data, or it is determined whether or not a predetermined condition is satisfied in the progress of the game, and according to the result, it is determined whether or not it becomes an object to be operated. Also, it is determined whether or not the game image displayed on the LCD 14 with touch panel 22 is not an object to be operated on the basis of the touch input data, or it is determined whether or not a predetermined condition is satisfied in the progress of the game, and according to the result, it is determined whether or not it becomes an object to be operated.

The selected figure determining program 78 is, in a game in which a plurality of figures (card of a card game or operation icon, etc.) are displayed, a program for determining whether or not any one of the figures is selected out of the plurality of figures included in the game image to be displayed on the LCD 14 with touch panel 22 on the basis of the touch input data.

The figure arrangement position determining program 80 is a program for determining whether or not a figure (selected figure) determined by the selected figure determining program 78 is arranged in a predetermined position on the basis of the touch input data in the above-described game in which the plurality of figures are displayed.

The condition determining program 82 is a program for determining whether or not a predetermined condition is satisfied in a progress of the game. According to the determination result of the condition determining program 82, the above-described operational object image determining program 76 determines whether or not the game image displayed on the LCD 12 becomes an object to be operated, or it is determined whether or not the game image displayed on the LCD 14 does not become an object to be operated.

The parameter displaying program 84 is a program for displaying on at least any one of the LCD 12 and the LCD 14 an image of a parameter representing characteristics (feelings, degree of domestication, etc.) of a character on the basis of parameter data indicating a value of the parameter in a game such as a pet-raising simulation game, for example in which a pet (character) appears.

The parameter changing program 86 is a program for changing a displayed parameter on the basis of the touch input data, etc. in the above-described character appearing game.

It should be noted that in the game program storing area 70, although illustration is omitted, various programs required for the game progress such as a program for generating and outputting a game music, etc. are stored.

The memory map of the RAM 48 includes a data storage area, and in the data storage area, data loaded from the ROM 28*a* or the RAM 28*b* of the memory card 28, data generated according to the game processing, etc. are stored. The data storage area includes an image data storing area 88, a selected card storing area 90, a parameter storing area 92, an operational object image flag area 94, etc.

In the image data storing area 88, data for generating and displaying a game image is stored. The image data storing area 88 includes a first game image storing area 96 and a second game image storing area 98. In the first game image storing area 96, an image to be displayed at a start of the game on the LCD 12 is stored. For example, data of the cards on the board of the card game, character image data of a pet-raising simulation game, etc. are stored. These are not an object to be operated at a start of the game. In the second game image storing area 98, an image to be displayed on the LCD 14 at a start of the game is stored. For example, hand data of the card game, operation icon data of the pet-raising simulation game, etc. are stored, and these are an object to be operated at a start of the game. Additionally, in the second game image storing area 98, parameter image data, etc. of the pet-raising simulation game is stored. It should be noted that the parameter image never becomes an object to be operated, and may be stored in the first game image storing area 96. A game screen is generated on the basis of data of each image stored in the image data storing area 88. The data for displaying each image includes data indicating coordinates of display position or area on the screen and image data, etc. of each image in correspondence with the identification number, for example.

In the selected card storing area 90, in the above-described card game in which the plurality of figures are displayed, information relating a figure selected on the basis of the touch input data, etc. is stored. For example, card number data storing an identification number of the selected card, instructed position coordinates data indicating a position of a card instructed by a touch input, etc. are stored.

In the parameter storing area 92, in the above-described pet-raising simulation game in which a character is arranged, parameter data is stored that is indicative of a value of the parameter of the character. As a parameter, various characteristics of the character may be set, and feelings, a degree of domestication of a pet, and the like are set.

In the operational object image flag area 94, a flag for indicating which of the two game images to be displayed on the LCD 12 and the LCD 14 becomes an object to be operated is stored. In the above-described card game, a game image indicative of the cards on the board and a game image indicative of a hand are displayed. Then, if the operational object image flag is set to "0", the game image of the hand is an object to be operated, and therefore, the hand is displayed on the LCD 14, and the cards on the board are displayed on the LCD 12. On the other hand, if the flag is set to "1", the game image of the cards on the board is an object to be operated, and therefore, the cards on the board are displayed on the LCD 14, and the hand is displayed on the LCD 12. Also, in the above-described pet-raising simulation game, a game image indicative of a pet and a game image indicative of an operation icon, etc. are displayed. In one embodiment, if the operational object image flag is set to "0", the operation icon is an object to be operated, and therefore, an image of the operation icon is displayed on the LCD 14, and a pet image is displayed on the LCD 12. On the other hand, if the flag is set to "1", the pet is an object to be operated, and the pet is displayed on the LCD 14, and a background image of a room in which the pet is kept, for example, is displayed on the LCD 12. For example, in a case that a game image including a plurality of pet images is displayed, a plurality of operational object image flags respectively corresponding to the plurality of pet images may be provided, or operational object image flags corresponding to all or some of the plurality of pet images may be provided.

It should be noted that although illustration is omitted, in the data storage area, the obtained data (touch input data, operation input data, sound input data, etc.), game data generated according to the progress of the game (including a flag and a counter), etc. are stored.

In the game apparatus 10, game images are respectively displayed on the two screens, that is, the LCD 12 and the LCD 14. On the LCD 14 with touch panel 22, a game image required for an operation of the touch panel 22, that is, a game image as an object to be operated is displayed. For example, it is determined whether or not the game image to be displayed on the LCD 12 with no touch panel 22 becomes an object to be operated, and if it is determined that it becomes the object to be operated, the game image displayed on the LCD 12 is displayed on the LCD 14 to allow the game image to be operated by the touch panel 22. Furthermore, it is determined whether or not the game image displayed on the LCD 14 with touch panel 22 does not become the object to be operated, and if it is determined that it is not the object to be operated, the game image displayed on the LCD 14 is displayed on the LCD 12.

Figure 4:
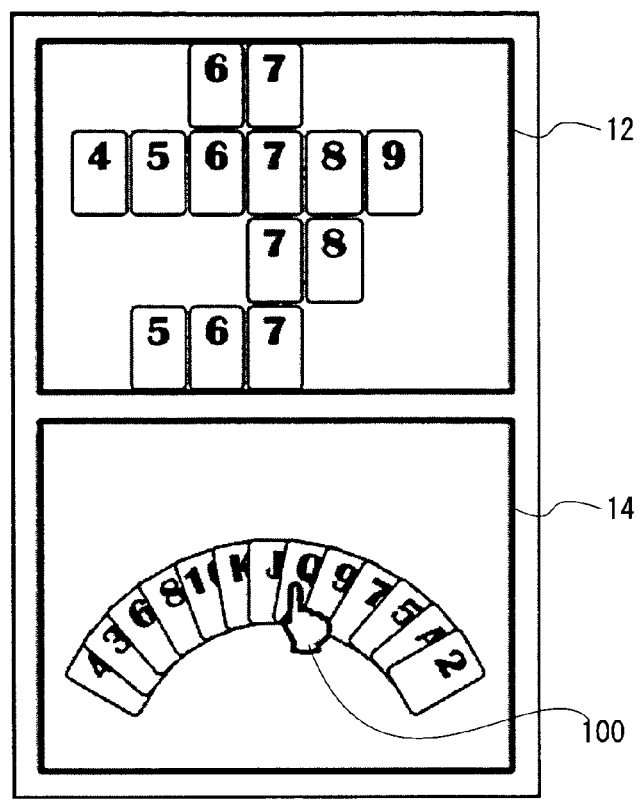
FIG. 4 is an illustrative view showing one example of a game screen of a card game, and shows a case that the cards on the board are displayed on an LCD 12, and a hand is displayed on an LCD 14.

If the above-described card game is played in the game apparatus 10 as one example, at a start of the game, the game image indicative of the cards on the board is displayed on the LCD 12, and the game image indicative of a hand of the player is displayed on the LCD 14, as shown in FIG. 4. The card game is fan-tan, in which a player and a computer selects one arrangeable card out of his or her hand in turn, and places it in an arrangeable position on the cards on the board. The image 100 of a hand on the game image of the LCD 14 is a pointer which is displayed at a touch position in response to a touch operation by the player.

Figure 5:
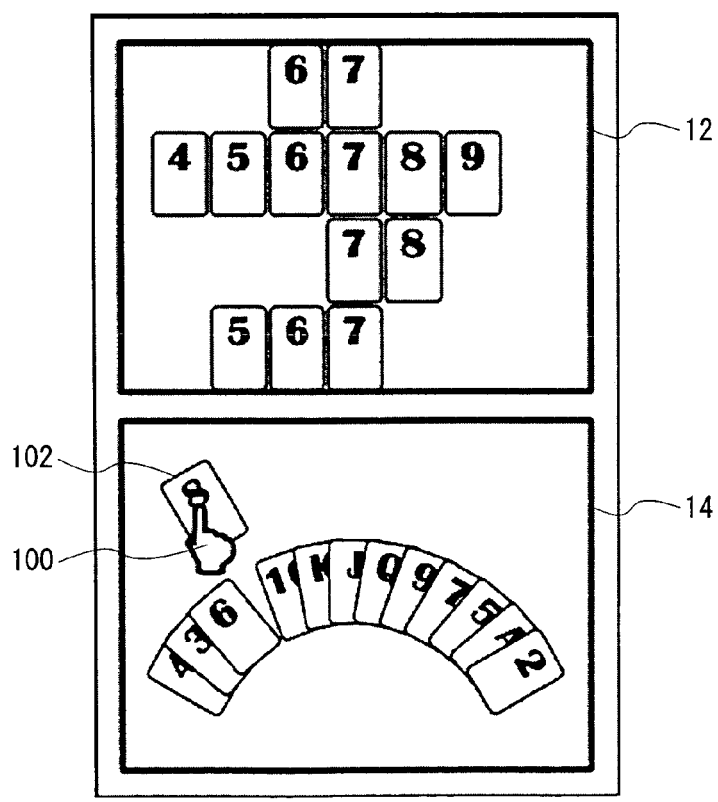
FIG. 5 is an illustrative view showing one example of a game screen after FIG. 4, and shows a state in which a selected card is extracted from a hand on the LCD 14.

When selecting a card, the player touches a card which is arrangeable on the cards on the board out of the hand displayed on the LCD 14 with the stick or the like 24. Then, as shown in FIG. 5, the stick or the like 24 is moved in a touched state (drag) to take the card from the hand. In this embodiment, when one card is taken from the hand, it is determined that the extracted card is a selected card. In FIG. 5 example, the selected card 102 is a card of "8".

Figure 6:
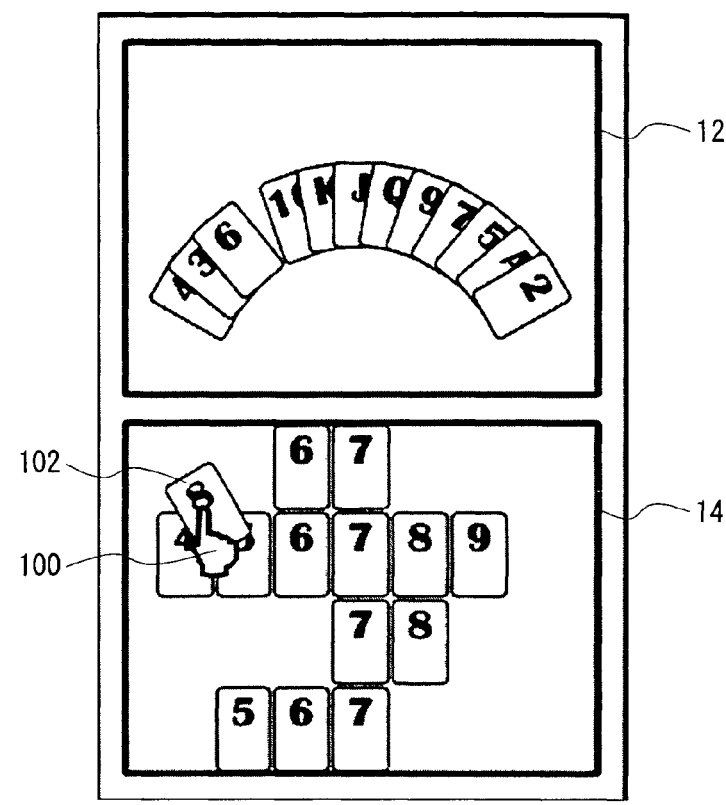
FIG. 6 is an illustrative view showing one example of a game screen after FIG. 5, and shows a state in which the displays are switched such that the hand is displayed on the LCD 12 with the selected card unchanged, and the cards on the board is displayed on the LCD 14.

Then, when it is determined that the card is selected, the game image of the cards on the board which is being displayed on the LCD 12 becomes an object to be operated, and the cards on the board and the hand are switched. That is, as shown in FIG. 6, the game image of the cards on the board is displayed on the LCD 14 so as to be operable, and the game image of the hand which is changed such that the selected card 102 is removed is displayed on the LCD 12. It should be noted that the card 102 selected from the hand is directly displayed on the LCD 14 as it is, and displayed on the game image of the cards on the board.

Figure 7:
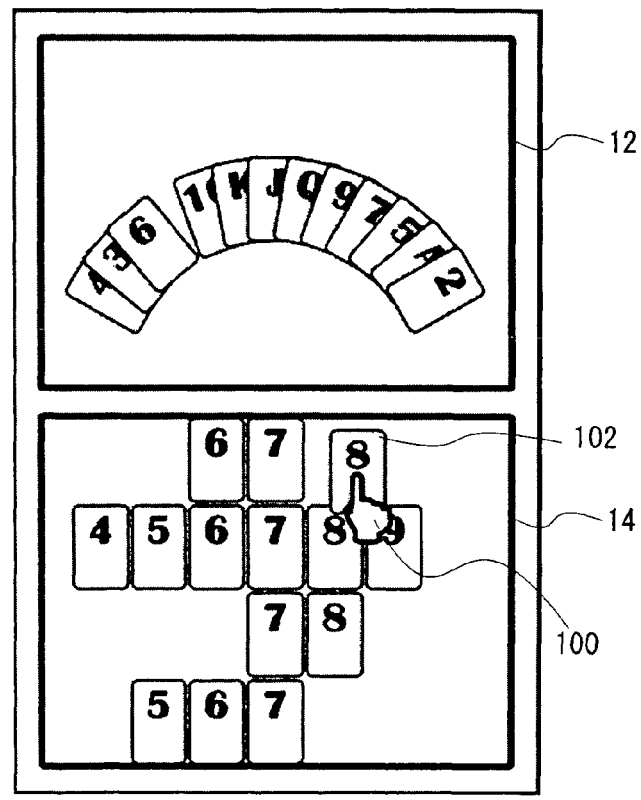
FIG. 7 is an illustrative view showing one example of a game screen after FIG. 6, and displays a state on the LCD 14 in which the selected card is arranged in an arrangeable position on the cards on the board.

In the game image of the cards on the board, as shown in FIG. 7, the player drags a card which is being selected 102 with the stick or the like 24, and moves the selected card 102 to the arrangeable position. In the example, the selected card 102 is a card of "8", and the arrangeable position is on the right side of "7" in the uppermost line, for example. For example, the player moves the selected card 102 to the arrangeable position and then stops the touch operation to the touch panel 22 to thereby arrange the selected card 102 in the position.

Figure 8:
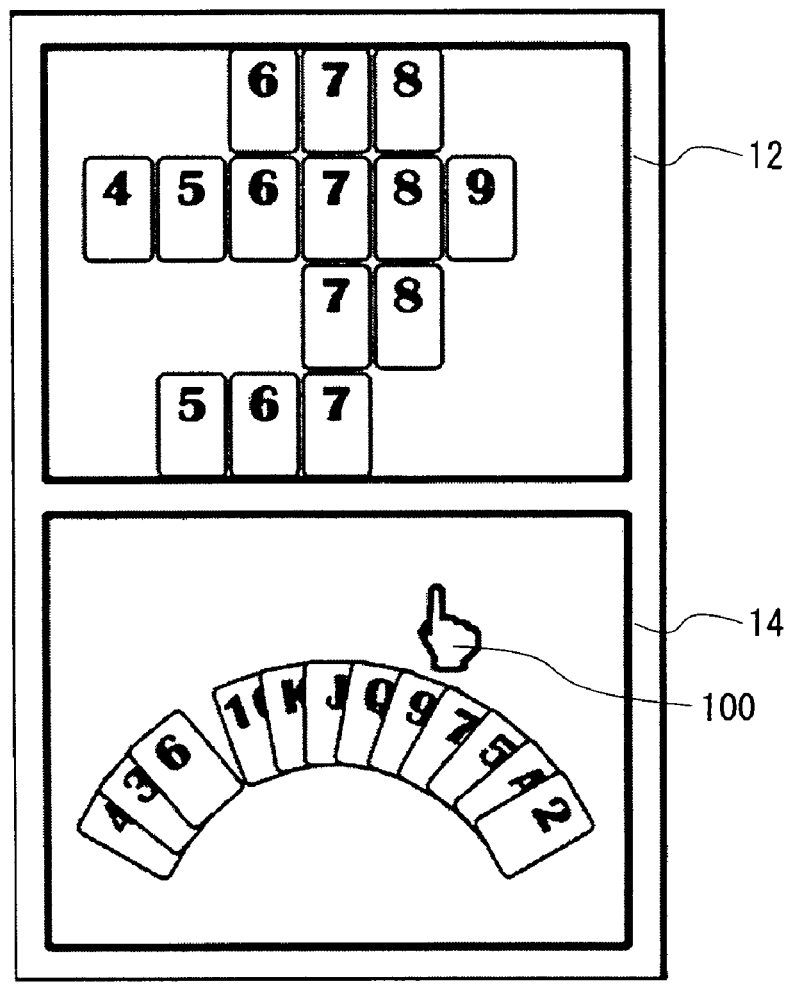
FIG. 8 is an illustrative view showing one example of a game screen after FIG. 7, and shows a state in which the selected card is arranged on the cards on the board, and then displays are switched so as to display the cards on the board on the LCD 12 and the hand on the LCD 14.

Thus, when the selected card 102 is in the arrangeable position, or when the selected card 102 is arranged in the arrangeable position, it is determined that the game image of the cards on the board which is being displayed on the LCD 14 does not become an object to be operated, and the cards on the board and the hand are switched with each other again. That is, as shown in FIG. 8, the game image of the cards on the board which is changed such that the selected card (card of "8") is arranged is displayed on the LCD 12, and the game image of the hand displayed on the LCD 12 is displayed on the LCD 14.

Furthermore, if the selected card is not arrangeable, that is, if a card of "2" is selected in FIG. 5, for example, another card has to be selected from the hand. In such a case, it is determined that the game image of the cards on the board displayed on the LCD 14 does not become an object to be operated, and the cards on the board and the hand are switched again. That is, the image of the hand which is changed such that the selected card is returned to the original position of the hand is displayed on the LCD 14, and the image of the cards on the board is displayed on the LCD 12.

In the card game, after a game image (the cards on the board) required for a touch panel operation is moved to the screen of the LCD 14 with touch panel 22, and when the game image does not become an object to be operated, it is displayed on the screen of the LCD 12 with no touch panel 22 again, and therefore, it is possible to change a display destination of the game image depending on the necessity of the touch panel operation.

In addition, after the game image (the cards on the board) required for a touch panel operation is moved to the screen of the LCD 14 with touch panel 22, and in response to a touch panel operation by the player, a selected card is arranged in a predetermined position to change the display, when the game image does not become an object to be operated thereafter, the game image is displayed in a changed manner on the screen of the LCD 12 with no touch panel 22, and therefore, it is possible to clearly inform the player of a necessary object to be operated and a desirable operation, increasing playability.

Thus, the hand and the cards on the board can be switched when the touch panel operation is needed according to the circumstance of the game, and therefore, it is possible to operate the hand and the cards on the board as necessary with the touch panel 22.

Figure 9:
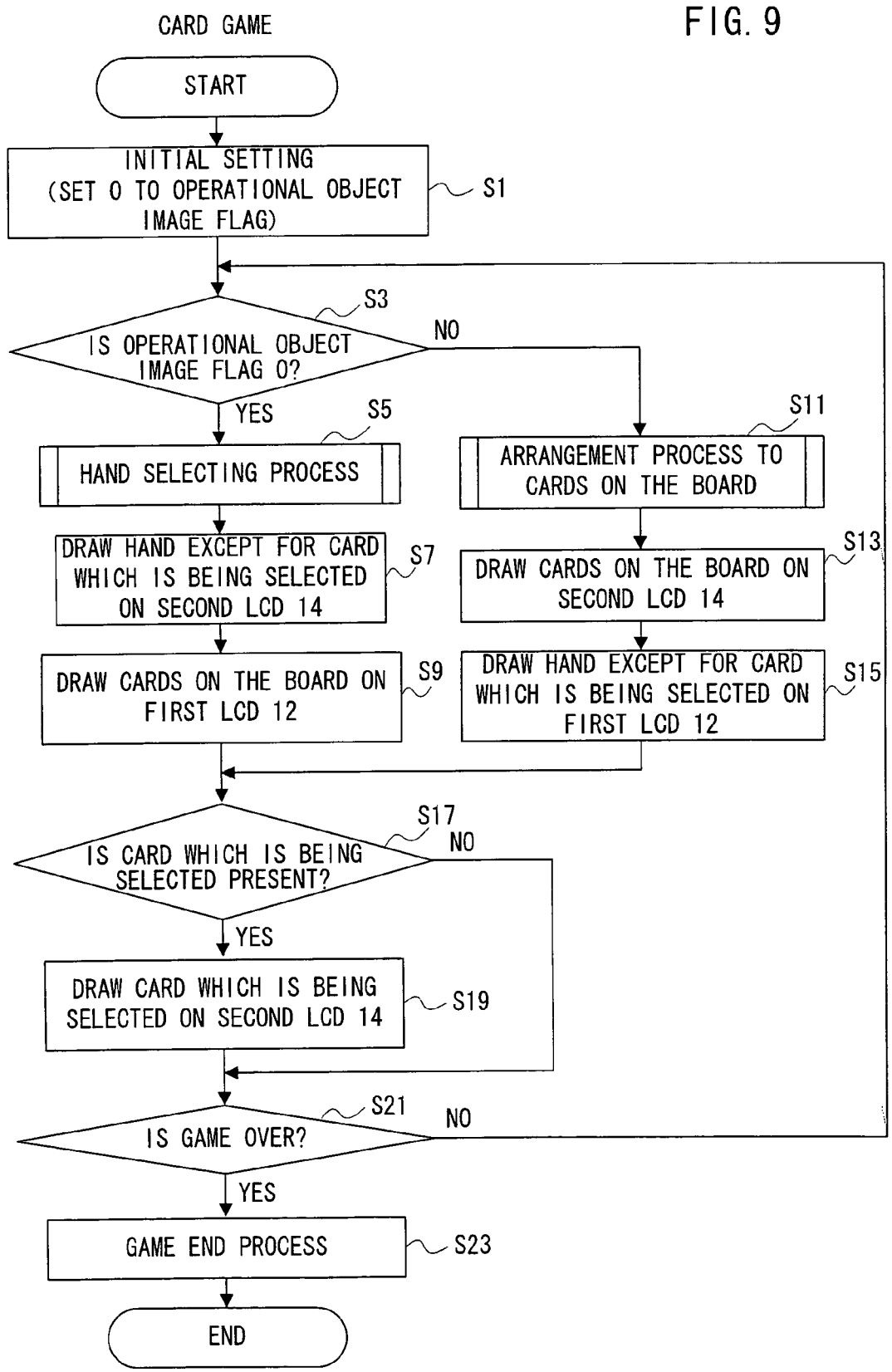
FIG. 9 is a flowchart showing one example of an operation of the game apparatus of the card game in FIG. 1 embodiment.

FIG. 9 shows a game operation in a case that the above-described card game is played in the game apparatus 10. As shown in FIG. 9, when starting a card game, the CPU core 42 first executes an initial setting to set initial values to various variables, flags, etc. in a step S1. For example, "0" is set to the operational object image flag area 94.

Next, in a step S3, the CPU core 42 determines whether or not an operational object image flag is "0". If "YES" in the step S3, the game image of the hand is an object to be operated. Thus, in a succeeding step S5, the CPU core 42 executes a hand selecting process. The hand selecting process is shown in detail in FIG. 10.

Figure 10:
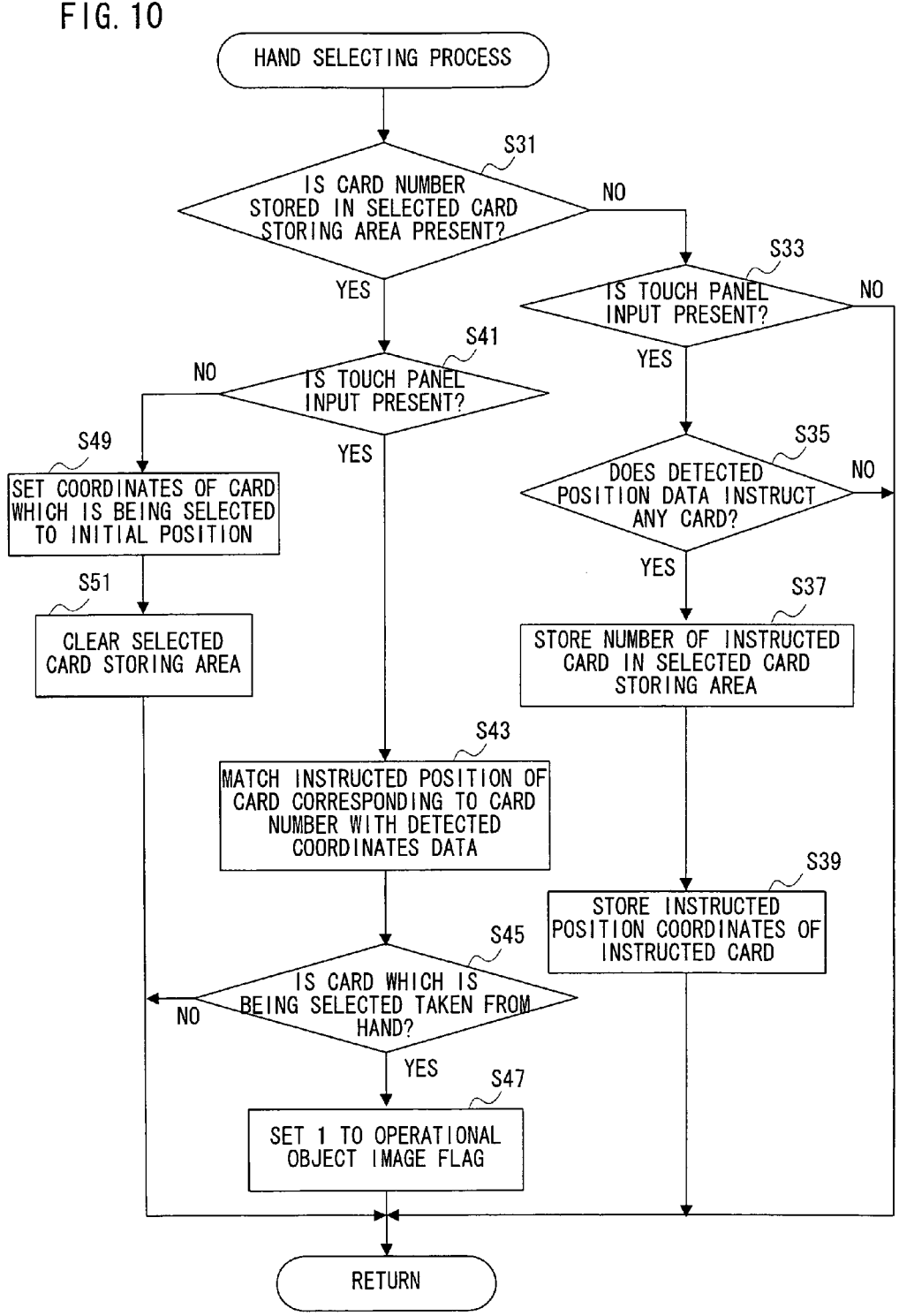
FIG. 10 is a flowchart showing one example of an operation of a hand selecting process in FIG. 9.

In a first step S31 in FIG. 10, the CPU core 42 determines whether or not card number data stored in the selected card storing area 90 is present. If "NO" in the step S31, that is, if no card is instructed out of the hand with a touch operation by the player, in a succeeding step S33, the CPU core 42 determines whether or not a touch panel input is present. If "NO" in the step S33, that is, if the touch input data is not detected, the hand selecting process is ended, and the process returns to a step S7 in FIG. 9.

On the other hand, if "YES" in the step S33, that is, if the touch input data is detected, the CPU core 42 determines whether or not the detected position coordinates data instructs any one of the cards in a step S35. For example, the coordinates data of the touch position and arrangement position data of each card of the hand stored in the second game image storing area 98 are compared to determine whether or not a coincident one is present. If "NO" in the step S35, that is, if no card is touched by the player, the hand selecting process is ended, and the process returns to the step S7 in FIG. 9.

If "YES" in the step S35, that is, if any of the cards is touched, since the player intends to select the card as a card to be arranged on the cards on the board, the CPU core 42 stores data with a number of the instructed card in the selected card storing area 90 in a step S37, and stores the detected coordinates data as instructed position coordinates data of the instructed card in the selected card storing area 90 in a step S39. After completion of the step S39, the hand selecting process is ended, and the process returns to the step S7 in FIG. 9.

On the other hand, if "YES" in the step S31, that is, if any one of the cards has already been instructed by the player, in a succeeding step S41, the CPU core 42 determines whether or not a touch panel input is present. If "YES" in the step S41, that is, if the touch input data is detected, the CPU core 42 matches the instructed position of the card corresponding to the card number stored in the selected card storing area 90 with the coordinates data of the detected touch position in a step S43. That is, the position of the detected coordinates data is stored as an instructed position in the selected card storing area 90. In this case, the player moves a card on the game image of the hand by a drag operation, and therefore, the display position of the card is matched with the touch position by the player.

Succeedingly, in a step S45, the CPU core 42 determines whether or not the card which is being selected is taken from the hand. For example, it is determined whether or not the instructed position coordinates of the selected card stored in the selected card storing area 90 is out of a range where the hand stored in the second game image storing area 98 is arranged (display position or area of the hand). In the card game, in response to the instructed card being taken out from the hand, it is determined that the card is selected.

If "NO" in the step S45, that is, if the card which is being selected still exists in the arrangement area of the hand, the hand selecting process is ended, and the process returns to the step S7 in FIG. 9.

On the other hand, if "YES" in the step S45, that is, if the instructed position of the card which is being selected is out of the range of the hand, it is determined that the card is selected by the player. Thus, it is determined that the game image of the cards on the board which is being displayed on the LCD 12 becomes an image of an object to be operated. That is, the CPU core 42 sets "1" in the operational object image flag area 94 in a step S47. After completion of the step S47, the hand selecting process is ended, and the process returns to the step S7 in FIG. 9.

If "NO" in the step S41, that is, if the touch input data is not detected, it is grasped that a touch operation or a drag operation to the card instructed by the player is stopped, and the stick or the like 24 is released from the touch panel 22. Accordingly, in a step S49, the CPU core 42 sets the coordinates of the display position of the selected card to an initial position, and clears the selected card storing area 90 in a step S51. Thus, the selected card is returned to the hand, and the player reselects one card from the hand. After completion of the step S51, the hand selecting process is ended, and then, the process returns to the step S7 in FIG. 9.

Returning to FIG. 9, in the step S7, the CPU core 42 sets or instructs drawing of the hand except for the card which is being selected on the second LCD 14. That is, the CPU core 42 generates the game image of the hand except for the card with the card number stored in the selected card storing area 90 by utilizing the second GPU 52, for example, on the basis of the image data, etc. stored in the second game image storing area 98 to draw it on the second VRAM 58, and sets or instructs displaying the game image of the hand on the LCD 14 by utilizing the LCD controller 60 storing "0" in the register 62. Thus, at a display updating timing, the generated game image of the hand is displayed on the LCD 14.

Succeedingly, in the step S9, the CPU core 42 sets the cards on the board so as to be drawn in the first LCD 12. That is, the CPU core 42 generates the game image of the cards on the board on the basis of the image data, etc. stored in the first game image storing area 96 by utilizing the first GPU 50, for example to draw it on the first VRAM 56, and sets the game image of the cards so as to be displayed on the LCD 12 by utilizing the LCD controller 60 storing "0" in the register 62. Thus, at a display update timing, the generated game image of the cards on the board is displayed on the LCD 12.

Thus, if "0" is set in the operational object image flag, the game image of the cards on the board is displayed on the LCD 12, and the game image of the hand as an object to be operated is displayed on the LCD 14 with touch panel 22.

On the other hand, if "NO" in the step S3, that is, if "1" is set in the operational object image flag area 94, the game image of the cards on the board is an object to be operated, and therefore, in a succeeding step S11, the CPU core 42 executes an arrangement process to the cards on the board. The arrangement process to the cards on the board is shown in detail in FIG. 11.

Figure 11:
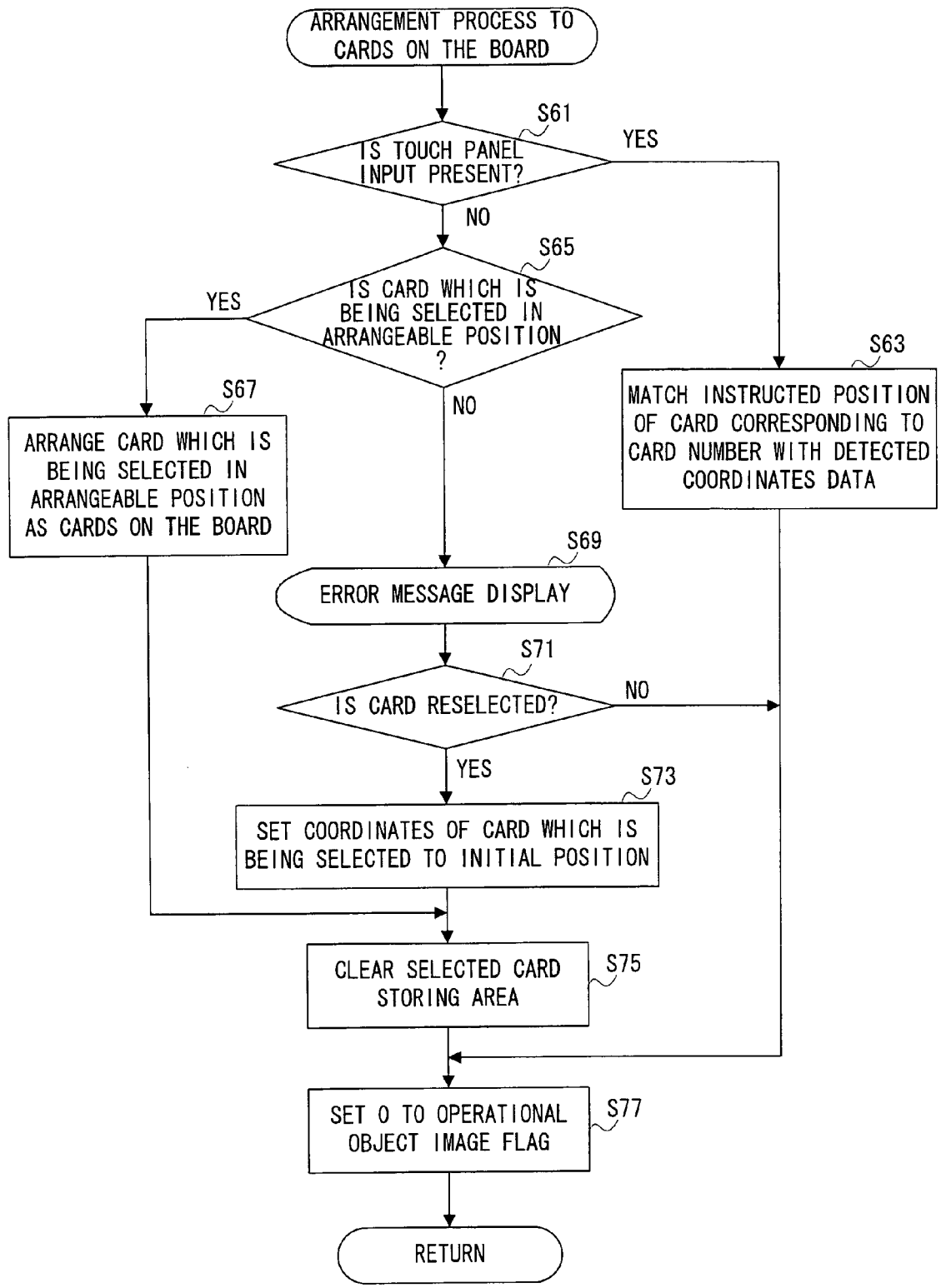
FIG. 11 is a flowchart showing one example of an operation of an arrangement process to the cards on the board in FIG. 9.

In a first step S61 in FIG. 11, the CPU core 42 determines whether or not a touch panel input is present. If "YES" in the step S63, that is, if touch input data is detected, in a succeeding step S63, the CPU core 42 matches the instructed position of the card corresponding to the card number stored in the selected card storing area 90 with the coordinates data of the detected touch position. More specifically, the position of the detected coordinates data is stored in the selected card storing area 90 as an instructed position of the selected card. In this case, the player moves the selected card by a drag operation on the game image of the cards on the board, and therefore, the display position of the selected card is aligned with the touch position by the player. After completion of the step S63, the arrangement process to the cards on the board is ended, and the process returns to a step S13 in FIG. 9.

On the other hand, if "NO" in the step S61, that is, if the touch input data is not detected, the CPU core 42 determines whether or not the card which is being selected is in an arrangeable position in a step S65. In the card game, the player can move a card which is being selected by a drag operation, and release the stick or the like 24 in the arrangeable position to whereby arrange the card in that position if possible. Accordingly, if the touch input is absent in the step S65, it is determined whether or not an instructed position coordinates stored in the selected card storing area 90 is included in the arrangeable position of the cards on the board for the card indicated by the card number. If "YES" in the step S65, that is, if the card which is being selected is placed in the arrangeable position, the CPU core 42 arranges the card which is being selected in the arrangeable position as cards on the board in a step S67, and then, the process proceeds to a step S75. Thus, by determining that the selected card is in the arrangeable position, it is determined that the game image of the cards on the board which is being displayed on the LCD 14 does not become an image of the object to be operated.

If "NO" in the step S65, that is, if the card which is being selected is not placed in the arrangeable position, the CPU core 42 displays an error message, such as "Unable to arrange" on the game image of the LCD 12 or LCD 14 by utilizing the GPU 50 or the GPU 52 in a step S69.

Then, in a step S71, the CPU core 42 determines whether or not the card is reselected. For example, an unarrangeable card may be selected, and therefore, it is determined whether or not reselection of the card is performed. More specifically, it is determined whether or not a predetermined touch input, etc. by the player is present, or whether or not the card needs to automatically be reselected on the basis of the program. If "NO" in the step S71, that is, if the card is not reselected, the arrangement process to the cards on the board is ended, and then, the process returns to a step S13 in FIG. 9. On the other hand, if "YES" in the step S71, that is, if the card is reselected, the CPU core 42 sets the coordinates of the display position of the card which is being selected to an initial position in a step S73. Thus, the selected card is displayed in the original position of the hand. After completion of the step S73, the process proceeds to a step S75. According to the determination that the selected card is reselected, the game image of the cards on the board which is being displayed on the LCD 14 is not an image of the object to be operated.

In a step S75, the CPU core 42 clears the selected card storing area 90, and cancels a selecting state of the selected card. Then, in a step S77, the CPU core 42 sets "0" in the operational object image flag area 94. That is, it is determined that the card which is being selected is placed in the arrangeable position of the cards on the board in the step S65, or it is determined the card is reselected in the step S71, and therefore, it is determined that the game image of the cards on the board does not become an object to be operated, and the image of the object to be operated is switched to the game image of the hand. After completion of the step S77, the arrangement process to the cards on the board is ended, and then, the process returns to the step S13 in FIG. 9.

In the step S13 the CPU core 42 sets drawing of the cards on the board on the second LCD 14. That is, the CPU core 42 generates a game image of the cards on the board on the basis of the image data, etc. stored in the first game image storing area 96 by utilizing the GPU 52, for example, to draw it in the VRAM 58, and sets displaying of the game image of the cards on the board on the LCD 14 by utilizing the LCD controller 60 storing "0" in the register 62. Or, the CPU core 42 generates the game image of the cards on the board by utilizing the GPU 50, for example, to draw it in the VRAM 56, and sets displaying of the game image of the cards on the board on the LCD 14 by utilizing the LCD controller 60 storing "1" in the register 62. Thus, at the display update timing, the generated game image of the cards on the board is displayed on the LCD 14.

Furthermore, in a step S15, the CPU core 42 sets drawing of the game image of the hand except for the card which is being selected on the first LCD 12. That is, the CPU core 42 generates the game image of the hand except for the card with the card number stored in the selected card storing area 90 by utilizing the GPU 50, for example, on the basis of the image data, etc. stored in the second game image storing area 98 to draw it on the second VRAM 56, and sets displaying of the game image of the hand on the LCD 12 by utilizing the LCD controller 60 storing "0" in the register 62. Or, the CPU core 42 generates the game image of the hand except for the selected card by utilizing the GPU 52, for example, to draw it in the VRAM 58, and sets displaying the game image of the hand on the LCD 12 by utilizing the LCD controller 60 storing "1" in the register 62. Thus, at a display update time, the generated game image of the hand is displayed on the LCD 12. After completion of the step S15, the process proceeds to a step S17.

In the step S17, the CPU core 42 determines whether or not a card which is being selected is present on the basis of the data in the selected card storing area 90. If "YES" in the step S17, the CPU core 42 sets drawing the card which is being selected on the second LCD 14 in a step S19. That is, the CPU core 42 generates an image of the card which is being selected on the basis of the instructed position coordinates data stored in the selected card storing area 90 and the image data, etc. stored in the second game image storing area 98 by utilizing the GPU 52, for example to draw it in the VRAM 58, and sets displaying of the image of the selected card on the LCD 14 by utilizing the LCD controller 60 storing "0" in the register 62. Or, the CPU core 42 generates an image of selected card by utilizing the GPU 50, for example to draw it in the VRAM 56, and sets displaying of the game image of the selected card on the LCD 14 by utilizing the LCD controller 60 storing "1" in the register 62. Thus, at the display update timing, the game image including the image of the selected card is displayed on the LCD 14. On the other hand, if "NO" in the step S17, that is, if no card is selected, the process directly proceeds to a step S21.

In the step S21, the CPU core 42 determines whether or not a game is to be ended. Until "YES" is determined in the step S21, the process from the step S3 is repeated so as to progress the game. Then, when "YES" is determined in step S21, a game end process is executed in a step S23, and then, the card game process is ended.

Figure 12:
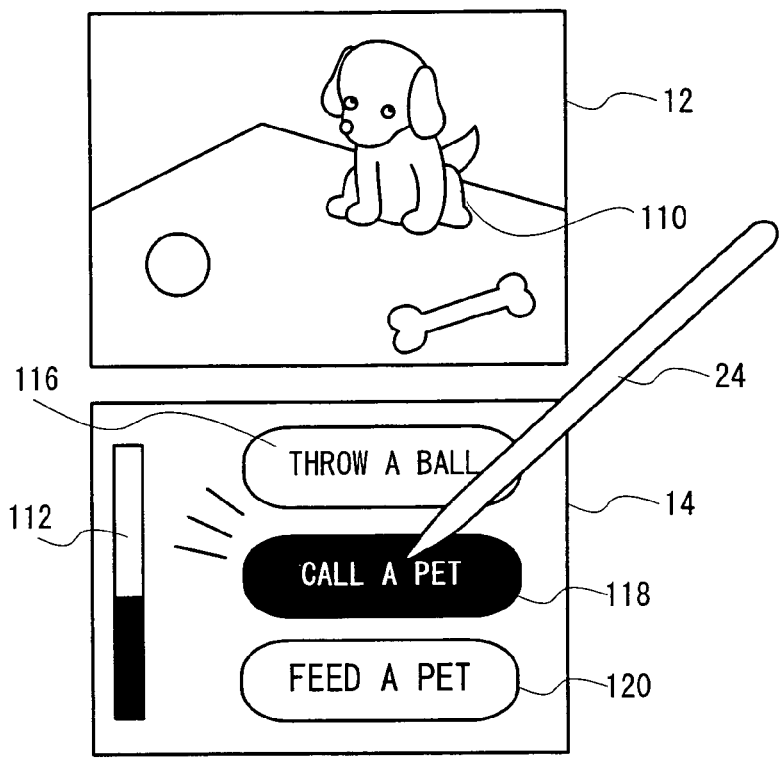
FIG. 12 is an illustrative view showing one example of a game screen of a pet-raising simulation game, and shows a case that a "Call a pet" icon is instructed on the touch panel in a state that a pet is displayed on the LCD 12 and a parameter and icons are displayed on the LCD 14.

Furthermore, if the above-described pet-raising simulation game is played in the game apparatus 10 as another example, a game image representing an animal or pet (character) 110 is displayed on the LCD 12, and game images representing operation icons 116, 118, 120 are displayed on the LCD 14 at a start of the game as shown in FIG. 12. That is, in this case, the game images representing the operation icons 116, 118, 120 displayed on the LCD 14 are an object to be operated. In the background of the game image indicative of a pet displayed on the LCD 12, a room where the pet 110 is kept is drawn, and in the room, a plaything such as a ball, a bone, etc. is placed. As a game image indicative of the operation icon to be displayed on the LCD 14, a plurality of operation icons instructing a raising method, such as "Throw a ball" icon 116, "Call a pet" icon 118, "Feed a pet" icon 120, etc are displayed. In addition, in this embodiment, a parameter display image 112 indicative of a value of the parameter, such as feelings and a degree of domestication of a pet is displayed by a bar graph, for example, on the LCD 14.

Figure 13:
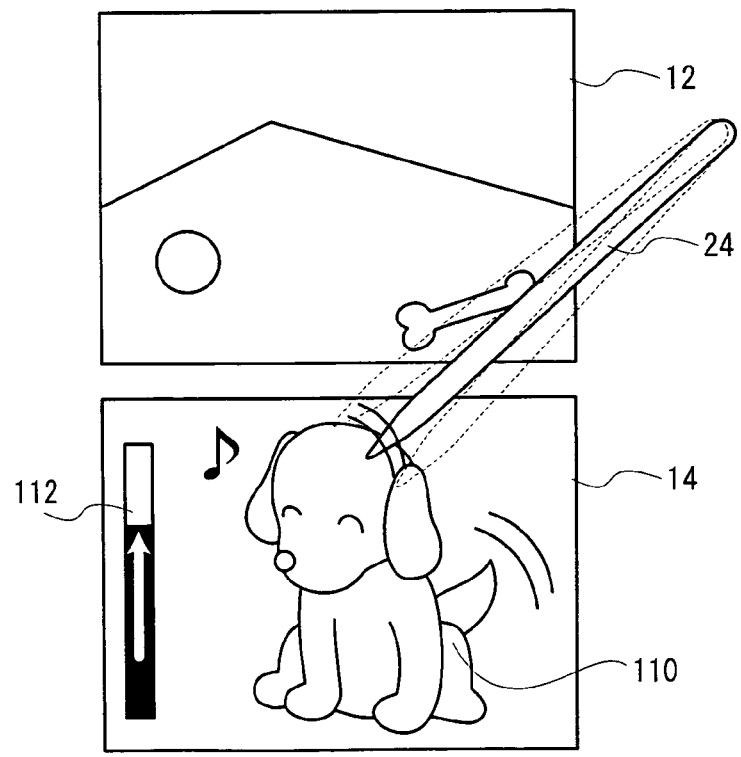
FIG. 13 is an illustrative view showing one example of the game screen after FIG. 12, and shows a case that a head of the pet is stroked with the touch panel after the pet moved to the LCD 14.

When a raising method is instructed, a player touches a corresponding position on the touch panel 22 such that a desired operation icon displayed on the LCD 14 is directly touched with the stick or the like 24. In FIG. 12 example, the "Call a pet" icon 118 is instructed. Thus, the "Call a pet" icon image 118 is highlighted. By performing a predetermined operation, such as touching the "Call a pet" operation icon 118, and so forth, it is determined that the game image indicative of the pet 110 which is being displayed on the LCD 12 becomes an object to be operated. Then, when the game image of the pet 110 becomes an object to be operated, the pet 110 displayed on the LCD 12 is displayed so as to be operable on the LCD 14. In this embodiment, the pet 110 is displayed so as to be moved to the LCD 14. For example, the pet 110 moves so as to disappear downwardly (toward the lower side) on the screen of the LCD 12, and then appears from above (the upper side) on the screen of the LCD 14. Then, as shown in FIG. 13, the pet 110 is displayed on the screen of the LCD 14. It should be noted that the background of the room from which the pet 110 disappears is displayed on the LCD 12 as it is.

Thus, when the pet 110 is to be trained, for example, the pet is called on the screen of the LCD 14 with touch panel 22 to be trained for breeding. In the "Call a pet" raising, the player can train the pet 110 called on the LCD 14 by stroking, beating, and etc. As shown in FIG. 13, if the player performs an operation so as to stroke the pet 110 with the stick or the like 24, the game image is changed such that the pet 110 is excited. Also, stroking raises the parameter to indicate feelings, etc. of the pet 110, which changes the game image such that a parameter value indicated by the parameter display image 112 rises.

Figure 14:
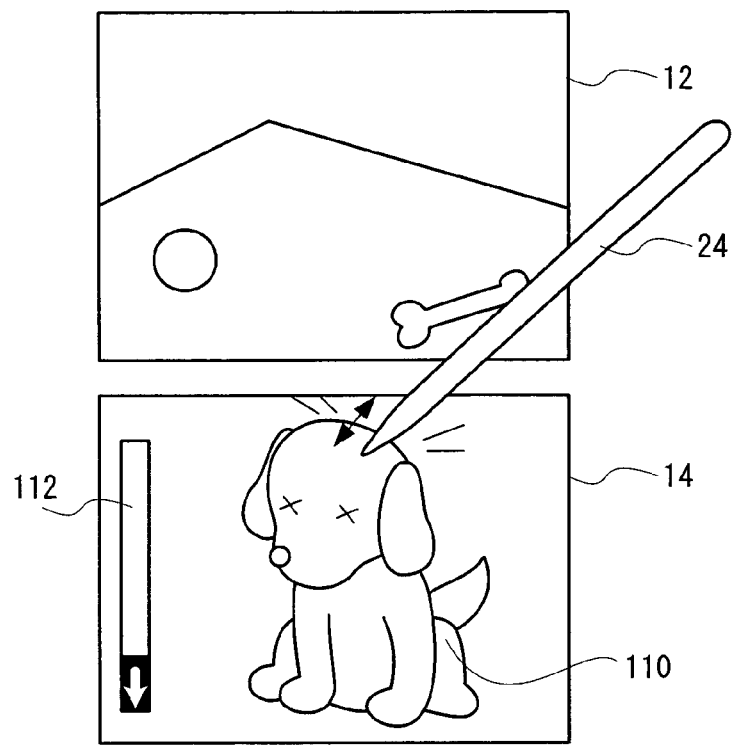
FIG. 14 is an illustrative view showing another example of the game screen after FIG. 12, and shows a case that a head of the pet is beaten with the touch panel after the pet moved to the LCD 14.

On the other hand, as shown in FIG. 14, if the player performs an operation so as to beat the pet 110 with the stick or the like 24, the game image is changed such that the pet 110 is pained. Also, in response to the beating, the parameter of the pet 110 descends, which changes the game image such that the parameter value indicated by the parameter display image 112 descends.

Figure 15:
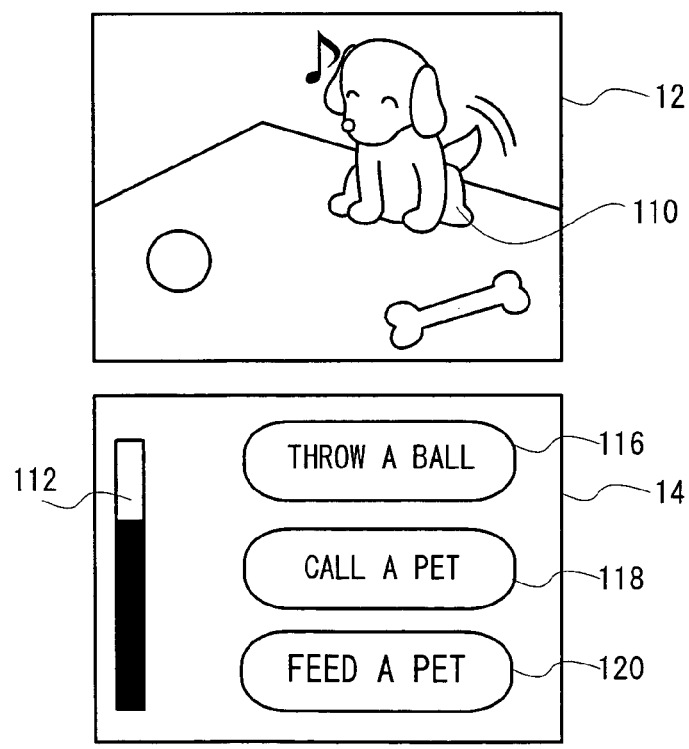
FIG. 15 is an illustrative view showing one example of the game screen after FIG. 13, and shows a case that no input to the touch panel is kept for a fixed time period, and the pet is moved to the LCD 12.

Then, if an input to the touch panel 22 is absent for a fixed period of time, for example, it is determined that the pet 110 displayed on the LCD 14 does not become an object to be operated. Then, as shown in FIG. 15, the pet 110 is displayed so as to return to the room displayed on the LCD 12. For example, the pet 110 moves so as to disappear upward (upper side) on the screen of the LCD 14, and then, appears from the below (lower side) of the screen of the LCD 12 so as to be displayed in the room. Additionally, the game image indicative of the operation icon is displayed on the LCD 14. Also, in FIG. 15 example, the game image changed with the pet 110 excited as a result of the training is displayed on the LCD 12, and the parameter display image 112 with the parameter value rising is displayed on the LCD 14.

It should be noted that as to the game image indicative of the operation icon displayed on the LCD 14 in FIG. 12, if the "Throw a ball" operation icon 116 is instructed, a raising is performed by causing the pet 110 to play with a ball in the room displayed on the LCD 12, for example, and the parameter is changed.

Alternatively, if the "Feed a pet" operation icon 120 is instructed, a raising is performed by calling the pet on the screen of the LCD 14 and feeding it, and the parameter is changed similarly to the above-described "Call a pet" case.

Figure 16:
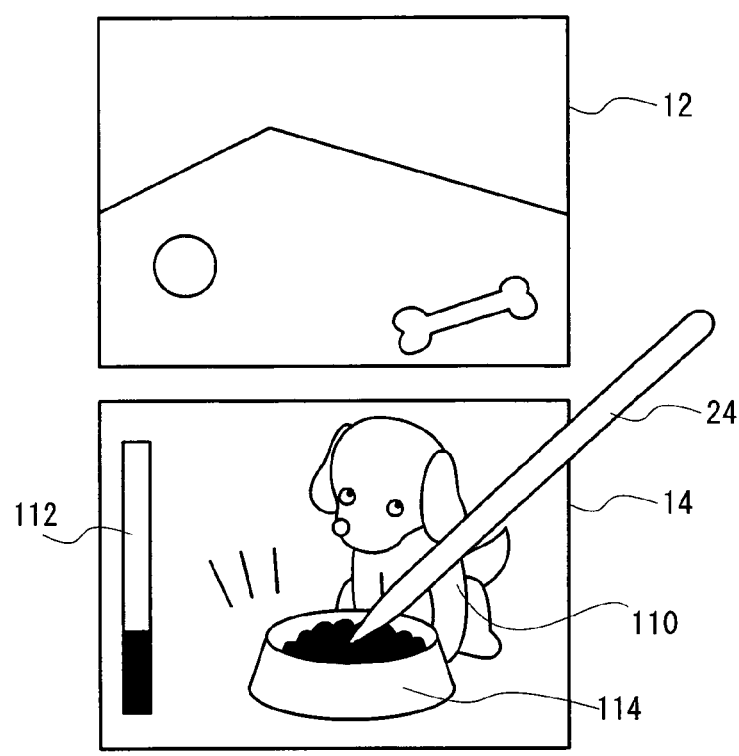
FIG. 16 is an illustrative view showing another example of the game screen in the pet-raising simulation game, and shows a case that a "Feed a pet" icon is instructed on the touch panel in a state that a pet is displayed on the LCD 12 and a parameter and icons are displayed on the LCD 14.

More specifically, in response to the "Feed a pet" operation icon 120 being touched, it is determined that the game image indicative of a pet becomes an object to be operated, and the pet 110 displayed on the LCD 12 is displayed on the LCD 14. The pet 110 is displayed so as to move to the LCD 14 similarly to the above-described "Call a pet" case. Then, as shown in FIG. 16, the pet 110 is displayed together with an image indicative of food 114 on the LCD 14.

Figure 17:
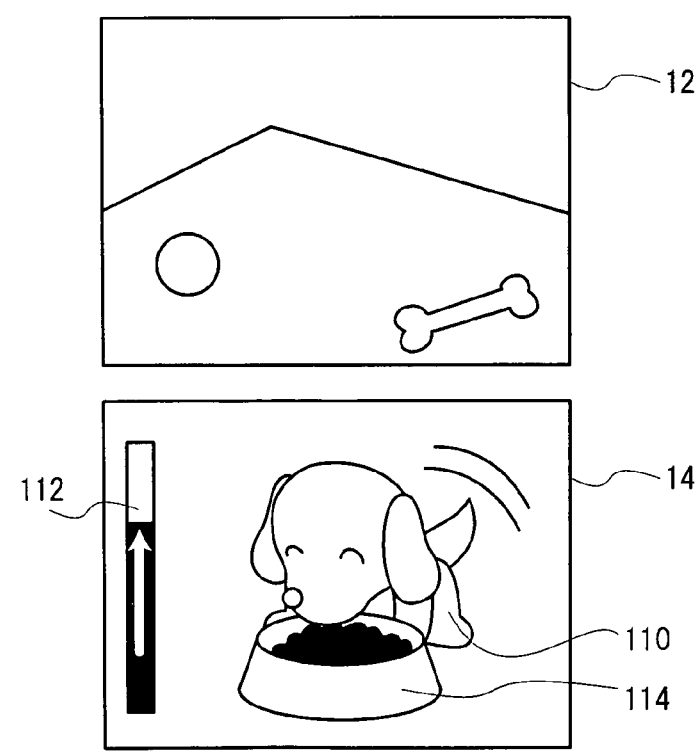
FIG. 17 is an illustrative view showing one example of the game screen after FIG. 16, and shows a manner in which the pet is moved to the LCD 14 and eats food.

In the "Feed a pet" raising, the player feeds the pet 110 called on the LCD 14 to thereby raise it. For example, as shown in FIG. 17, if the player makes a touch operation on the food image 114 with the stick or the like 24, the game image is changed such that the pet 110 delightedly eats the food. Also, the parameter indicative of the feelings, etc. of the pet 110 rises, and the game image is changed such that the parameter value represented by the parameter display image 112 rises.

In the pet-raising simulation game, after the game image (pet 110) required for the touch panel operation is moved to the screen of the LCD 14 with touch panel 22, when the game image does not become an object to be operated, it is displayed on the screen of the LCD 12 with no touch panel 22 again, and therefore, it is possible to change a display destination of the game image depending on the necessity of the touch panel operation.

In addition, after the game image (pet 110) required for a touch panel operation is moved to the screen of the LCD 14 with touch panel 22, and the display of the pet 110 is changed like being delighted or pained according to a touch panel operation by the player, when the game image does not become an object to be operated, the changed game image is displayed on the screen of the LCD 12 with no touch panel 22. Also, it is possible to change the parameter image 112 along with the image of the pet 110. Thus, it is possible to clearly inform the player of a necessary object to be operated and a desired operation, capable of enhancing playability.

Figure 18:
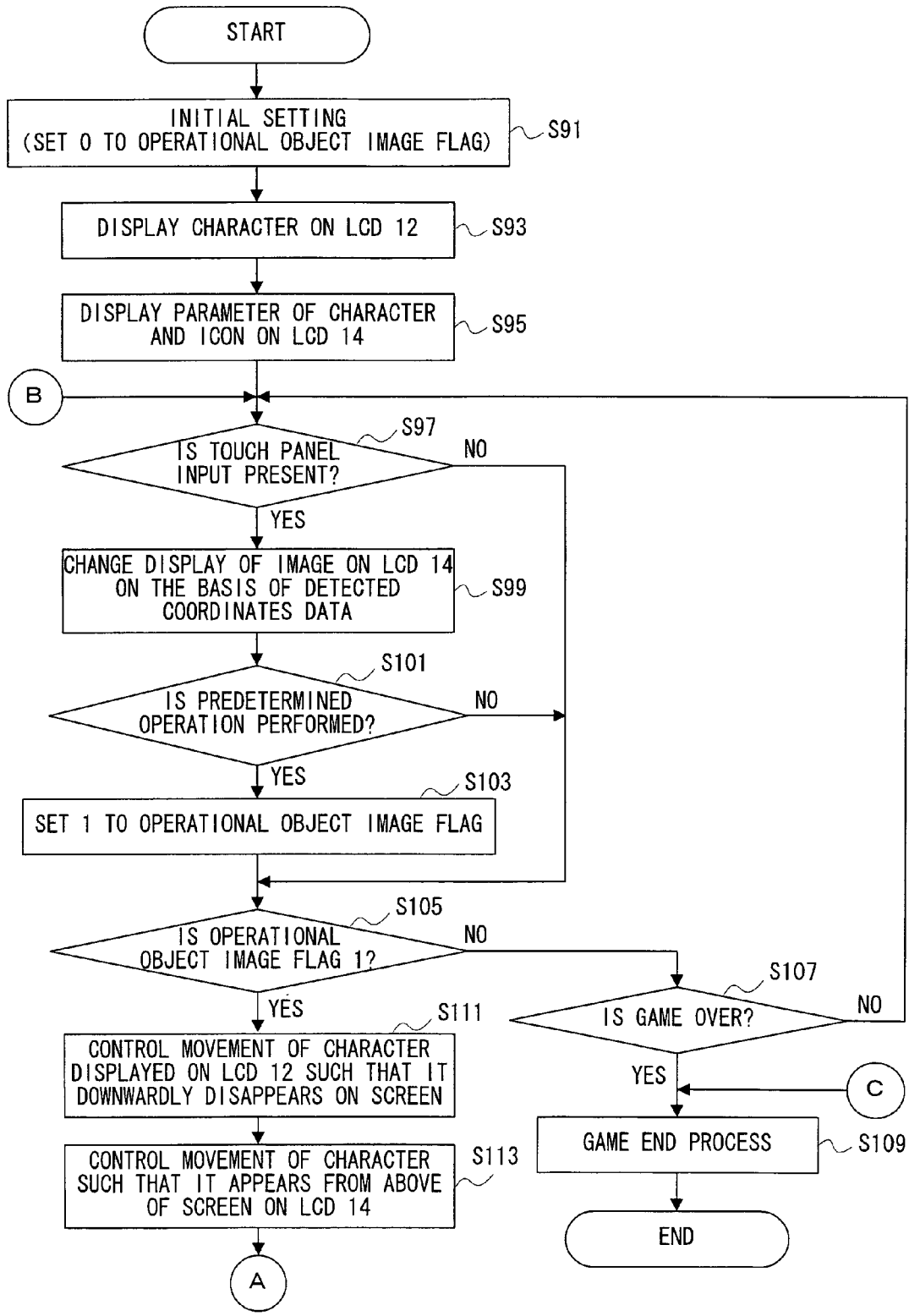
FIG. 18 is a flowchart showing one example of an operation of the pet-raising simulation game in the game apparatus of FIG. 1 embodiment.
Figure 19:
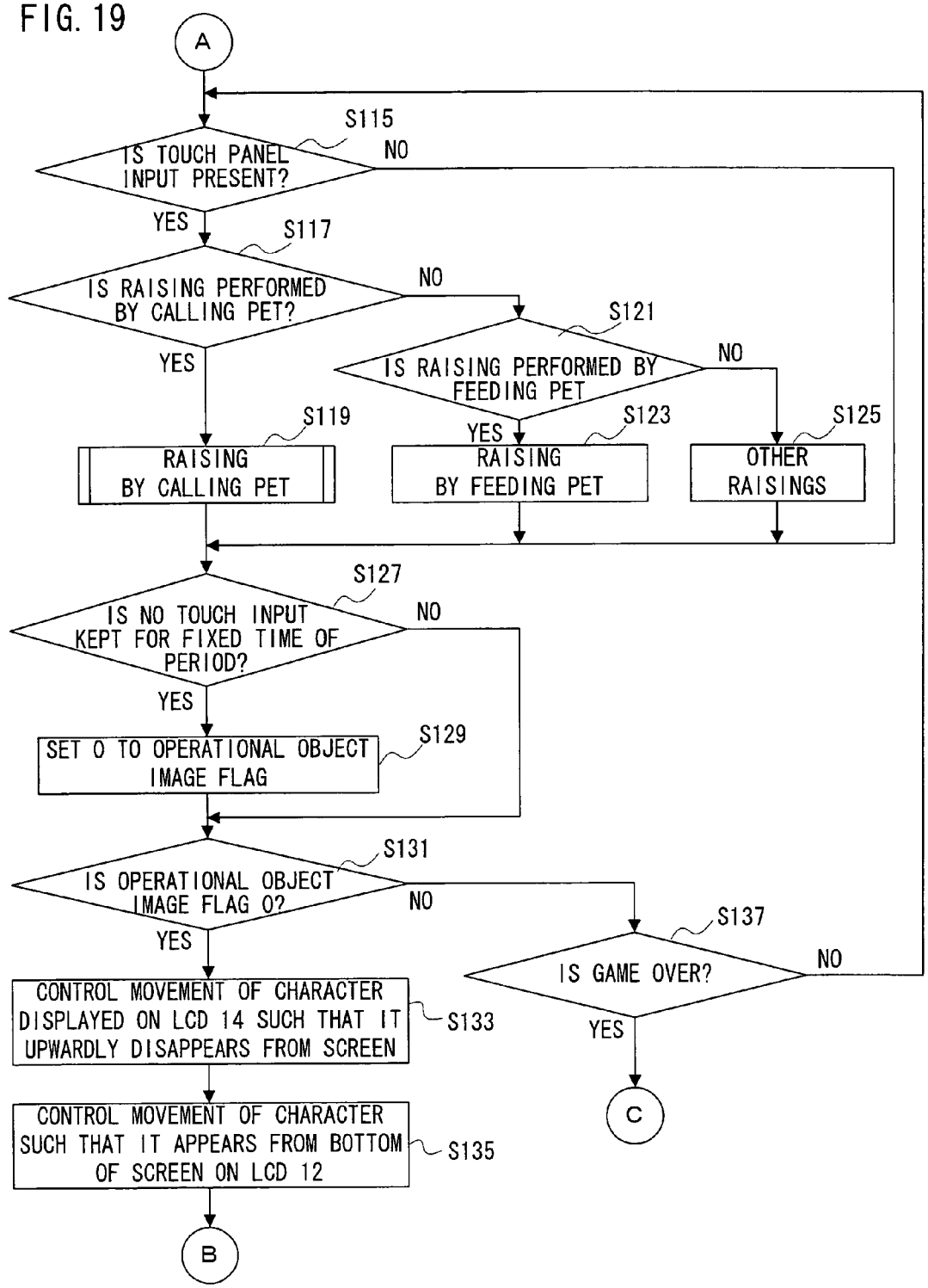
FIG. 19 is a flowchart continued from FIG. 18.

FIG. 18 and FIG. 19 show a game operation when the above-described pet-raising simulation game is played in the game apparatus 10. As shown in FIG. 18, when starting the pet-raising simulation game, the CPU core 42 first executes an initial setting to set initial values to various variables and flags in a step S91. For example, "0" is set to the operational object image flag area 94.

Next, in a step S93, the CPU core 42 sets or instructs displaying of a game image including a character (pet 110) on the LCD 12. That is, the CPU core 42 generates the game image including the character on the basis of the character image data, etc. stored in the first game image storing area 96 by utilizing the GPU 50, for example to draw it in the VRAM 56, and sets or instructs displaying the game image on the LCD 12 by utilizing the LCD controller 60 storing "0" in the register 62. Thus, at a display update time, the game image including the generated character is displayed on the LCD 12.

Succeedingly, in a step S95, the CPU core 42 sets displaying the game image including a parameter of the character and an operation icon on the LCD 14. That is, the CPU core 42 generates the game image including the operation icon, etc. on the basis of the operation icon data and parameter image data stored in the second game image storing area 98 and the parameter value, etc. stored in the parameter storing area 92 by utilizing the GPU 52, for example to draw it in the VRAM 58, and sets displaying the game image on the LCD 14 by utilizing the LCD controller 60 storing "0" in the register 62. Thus, at a display update timing, the game image including the generated operation icon, etc. is displayed on the LCD 14.

Then, the CPU core 42 obtains the touch input data via the I/F circuit 54 to determine whether or not the touch panel input is present in a step S97. If "NO" in the step S97, that is, if the touch input data is not detected, the process proceeds to a step S105.

On the other hand, if "YES" in the step S97, that is, if the touch input data is detected, the CPU core 42 sets changing the image display on the LCD 14 on the basis of the coordinates data of the detected touch position in a step S99. For example, as shown in FIG. 12, the touched operation icon is highlighted.

Then, in a step S101, the CPU core 42 determines whether or not a predetermined operation is performed. That is, the CPU core 42 determines whether or not the position indicated by the detected coordinates data is included in the coordinates indicative of the data of the display position or range of the "Call a pet" operation icon 118 or the "Feed a pet" operation icon 120. If "YES" in the step S101, that is, if a predetermined operation is performed, by determining that the image indicative of the pet displayed on the LCD 12 becomes an object to be operated, the CPU core 42 sets "1" in the operational object image flag area 94 in a step S103, then, the process proceeds to the step S105.

If "NO" in the step S101, that is, if no touch operation is performed on the "Call a pet" or "Feed a pet" operation icon, the process proceeds to the step S105.

In the step S105, the CPU core 42 determines whether or not the operational object image flag is "1". If "NO" in the step S105, that is, if "0" is set to the operational object image flag, the game image indicative of the operation icon displayed on the LCD 14 remains to be an object to be operated, and the CPU core 42 determines whether or not the game is to be ended in a step S107. If "NO" in the step S107, that is, if it is not the game end, the process returns to the step S97. On the other hand, if "YES" in the step S107, that is, if an operation indicative of a game end is performed by the player, for example, the CPU core 42 executes a game end process in a step S109 to end the pet-raising simulation game process.

On the other hand, if "YES" in the step S105, that is, if "1" is set to the operational object image flag area 94, the CPU core 42 controls the movement of character such that the character (pet 110) displayed on the LCD 12 downwardly disappears on the screen in a step S111. That is, the CPU core 42 generates an image in which the pet 110 downwardly disappears on the screen of the LCD 12 by utilizing the GPU 50, etc., for example, and sets displaying it on the LCD 12. It should be noted that background indicative of the raising room of the pet 110 is fixed, and displayed on the LCD 12 as it is. Then, in the step S113, the CPU core 42 controls the movement of the character such that the character appears from above of the screen of the LCD 14. That is, the CPU core 42 generates an image in which the pet 110 moves so as to appear from above on the screen by utilizing the GPU 52, etc. and sets displaying it on the LCD 14. Thus, a game image in which the pet 110 moves from the LCD 12 to the LCD 14 as the game progresses is displayed, and finally, as shown in FIG. 13 or FIG. 16, for example, the pet 110 is displayed on the LCD 14 with touch panel 22.

Succeedingly, in a step S115 in FIG. 19, the CPU core 42 determines whether or not a touch panel input is present. If "YES" in the step S115, that is, if touch input data is detected, the CPU core 42 determines whether or not a pet calling raising in a step S117. If "YES" in the step S117, the CPU core 42 executes a raising process by calling a pet in a step S119. The raising process by calling a pet is executed on the basis of the input coordinates data as shown in detail in FIG. 20.

Figure 20:
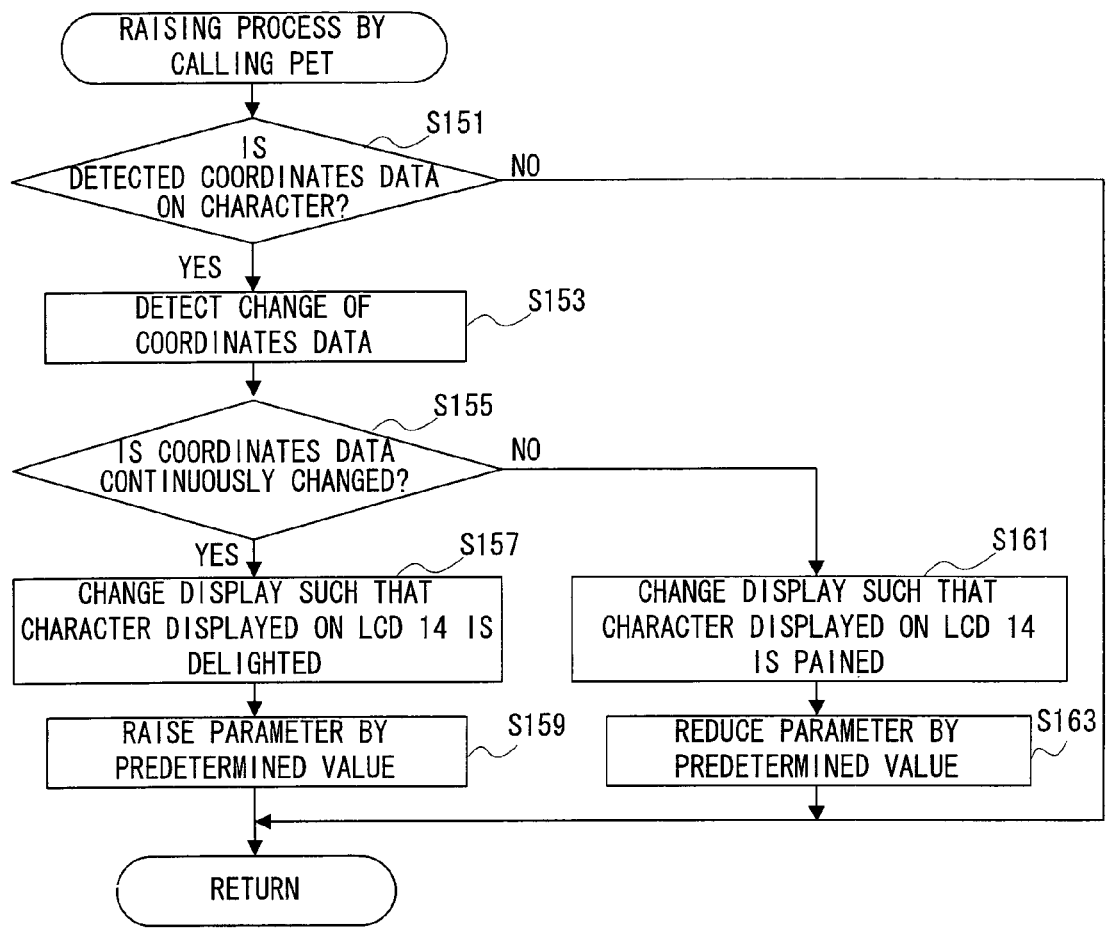
FIG. 20 is a flowchart showing an operation of a raising process by calling a pet in FIG. 19.

In a first step S151 in FIG. 20, the CPU core 42 determines whether or not the detected coordinates data is on the character. If "YES" in the step S151, that is, if the detected touch position is included in the coordinates of the data indicative of the display position or range of the character, the CPU core 42 detects a change of the input coordinates data in a step S153. For example, in a touch input data buffer area not shown of the RAM 48, a plurality of piece of detected touch input data is stored, and the changes of the coordinates data of them are checked.

Then, in a step S155, the CPU core 42 determines whether or not the coordinates data is continuously changed. For example, as shown in FIG. 13, if the player strokes the pet 110 with the stick or the like 24, the coordinates data is continuously changed. On the other hand, as shown in FIG. 14, if the player beats the pet 110 with the stick or the like 24, the coordinates data does not continuously change, and are intermittently detected. In the step S155, it is determined whether the player strokes or beats the pet 110.

If "YES" in the step S155, that is, if the player makes an operation to stroke the pet 110, the CPU core 42 changes the displays such that the character displayed on the LCD 14 reacts in a delighted way in a step S157. That is, the CPU core 42 generates a game image in which the pet 110 is delighted by utilizing the GPU 52, etc., for example, to display it on the LCD 14.

In addition, in a step S159, the CPU core 42 raises the parameter by a predetermined value to thereby store the updated value in the parameter storing area 92. Also, the CPU core 42 generates a parameter image 112 changed so as to raise the parameter value on the basis of the updated parameter value, and sets displaying it on the LCD 14.

On the other hand, if "NO" in the step S155, that is, if the player makes an operation to beat the pet 110, the CPU core 42 change the display such that the character displayed on the LCD 14 reacts in pained way in a step S161. That is, the CPU core 42 generates the game image in which the pet is pained by utilizing the GPU 52, etc., and sets displaying it on the LCD 14.

In addition, in a step S163, the CPU core 42 reduces the parameter by a predetermined value to store the updated value in the parameter storing area 92. In addition, a parameter image 112 with the parameter value reduced is generated on the basis of the updated parameter value, and is set to be displayed on the LCD 14.

After completion of the step S159 or the step S163, the raising process by calling a pet is ended, and the process returns to the step S127 in FIG. 19.

Returning to FIG. 19, if "NO" in the step S117, the CPU core 42 determines whether or not a pet feeding raising in a step S121. If "YES" in the step S121, the CPU core 42 executes a raising process by feeding in a step S123. In the process, if the detected touch input data is one representing the food image 114, the CPU core 42 generates a game image in which the pet 110 delightedly eats the food by utilizing the GPU 52, etc. and sets displaying of it on the LCD 14. In addition, the CPU core 42 raises the parameter by a predetermined value to update the parameter storing area 92. Then, the CPU core 42 generates a parameter image 114 with the parameter value raised by utilizing the GPU 52, etc., and sets displaying it on the LCD 14. After completion of the step S123, the process proceeds to a step S127.

It should be noted that if "NO" in the step S121, the CPU core 42 executes a process for another raising process in a step S125, and the process proceeds to the step S127.

In the step S127, the CPU core 42 determines whether or not no touch input is kept for a fixed period of time. If "YES" in the step S127, that is, if not touch input data is detected after a lapse of a fixed period of time from the display on the LCD 14 or from a previous touch input, for example, it is determined that the pet 110 displayed on the LCD 14 is not an object to be operated, and the CPU core 42 sets "0" in the operational object image flag area 94 in a step S129. On the other hand, if "NO" in the step S127, the process directly proceeds to a step S131.

In a step S131, the CPU core 42 determines whether or not the operational object image flag is "0". If "YES" in the step S131, the CPU core 42 controls the movement of the character such that the character displayed on the LCD 14 upwardly disappears from the screen in a step S133. That is, the CPU core 42 generates the game image in which the pet 110 moves so as to upwardly disappear from the screen is generated by utilizing the GPU 52, etc. and sets displaying it on the LCD 14. Then, in a step S135, the CPU core 42 controls the movement of the character such that the character appears from the bottom of the screen on the LCD 12. That is, the CPU core 42 generates a game image in which the pet 110 moves so as to appear from the bottom of the screen by utilizing the GPU 50, etc. and sets displaying it on the LCD 12. Thus, as the game progresses, the game image in which the pet 110 moves from the LCD 14 to the LCD 12 is displayed, and finally, as shown in FIG. 15, for example, the game image indicative of the pet 110 is displayed on the LCD 12 again, and the game image indicative of the operation icon is displayed on the LCD 14. In this case, the game image is displayed in a state of changed such that a raising result is reflected. For example, in FIG. 15, the pet 110 is displayed in the delighted manner on the LCD 12, and the parameter image 112 with the parameter value rising is displayed on the LCD 14. After completion of the process in the step S135, the process returns to the step S97 in FIG. 18 to perform a process according to an operation on the game image represented by the operation icon displayed on the LCD 14.

On the other hand, if "NO" in the step S131, that is, if the operational object image flag is "1", the game image of the character is still an object to be operated. In a step S137, the CPU core 42 determines whether or not the game is to be ended, and if "NO", the process returns to the step S115 to perform a process according to an operation with respect to the character image. On the other hand, if "YES" in the step S115, the process proceeds to the step S109 in FIG. 18 to execute the game end process, ending the pet-raising simulation game.

According to the embodiment, the two screens of the LCD 12 and the LCD 14 are provided, and the touch panel 22 is provided on the LCD 14, and therefore, it is possible to play the game by performing an operation, like directly touching via the touch panel 22, on the game image on the touch panel 22 out of the game images respectively displayed on the two screens. Then, when a game image (the cards on the board, pet 110, etc.) displayed on the screen of the LCD 12 with no touch panel 22 becomes an object to be operated, the game image is displayed on the screen of the LCD 14 with the touch panel 22, and therefore, the game image required for a touch panel operation is moved to and displayed on the screen with the touch panel 22, allowing the player to operating the image as if he or she directly touches it and to play the game. Also, since the game image required for a touch panel operation is displayed on the screen with touch panel 22 of the LCD 14, the player can easily grasp which game image is an object to be operated, allowing a simple game play.

It should be noted that in the pet-raising simulation game of the above-described embodiment, when the pet 110 displayed on the screen of the LCD 12 becomes an object to be operated, the image of the pet 110 is displayed on the LCD 14 with touch panel 22. However, as the modified example 1 of pet-raising simulation game shown in FIG. 21 and FIG. 22, when the pet (character) 110 becomes an object to be operated, the upper screen displayed with the pet 110 and the lower screen displayed with the icon are entirely switched with each other.

More specifically, as shown in FIG. 21 (A), on the LCD 12 (upper screen), a plurality of pets 110A, 110B and 110C are displayed, and on the LCD 14 (lower screen), parameter display images 112A, 112B and 112C respectively representing feelings, etc. of the plurality of pets 110A, 110B and 110C are displayed together with a plurality of operation icons ("Throw a ball" icon 116, "Call a pet" icon 118, "Feed a pet" icon 120, etc.). When a predetermined input is performed on a display position or range of the "Call a pet" icon 118 (or "Feed a pet" icon 120) out of the plurality of operation icons, it is determined that images representing the pets 110A-C or an entire game screen including the pets 110A-C becomes an object to be operated, and the operational object image flag is rewritten. Then, as shown in FIG. 21(B), the screen including the pets 110 A-C displayed on the LCD 12 is displayed on the LCD 14, and the screen including the operation icons 116, 118, and 120 and the parameter display images 112 A-C displayed on the screen LCD 14 is displayed on the LCD 12.

Thus, when the game image including the plurality of pets 110 A-C is displayed on the LCD 14, the user performs a predetermined operation on a display position of each of pets 110 A-C with a stick or the like 24 to thereby perform a raising on the selected pet 110 similarly to the above-described embodiment. Additionally, the entire game screen including the plurality of pets 110 A-C is moved to the lower screen, and therefore, with one selecting operation of the operation icon 118, the plurality of pets 110 A-C are made to be an operable state.

Also, a "return" icon 122 is added to the screen of the LCD 14. The "return" icon 122 is utilized for instructing return of the display position of the switched screen. That is, as shown in FIG. 22 (A), when a predetermined input is performed on the display position or area (range) of the "return" icon 122, it is determined that the image indicative of the pets 110 A-C which is being displayed on the LCD 14 or an entire screen including them does not become an object to be operated, or it is determined that the operation icons 116, 118, 120 which is being displayed on the LCD 12 or the screen including them becomes an object to be operated, and the operational object image flag is rewritten so as to be the original. It should be noted that similarly to the above-described embodiment, if no coordinates input is detected for a fixed period of time also, it is determined that the image including the pet 110 which is being displayed on the LCD 14 is no longer an object to be operated, and the operational object image flag is returned to the original.

Then, as shown in FIG. 22 (B), the screen is switched again. That is, the screen including pets 110 A-C displayed on the LCD 14 is displayed on the LCD 12, and the screen including the operation icons displayed on the LCD 12 is displayed on the LCD 14. Also, the "Return" icon 122 displayed on the lower screen for instructing returning of the switch of the screen is not necessary, and thus, erased from the LCD 14.

Figure 23:
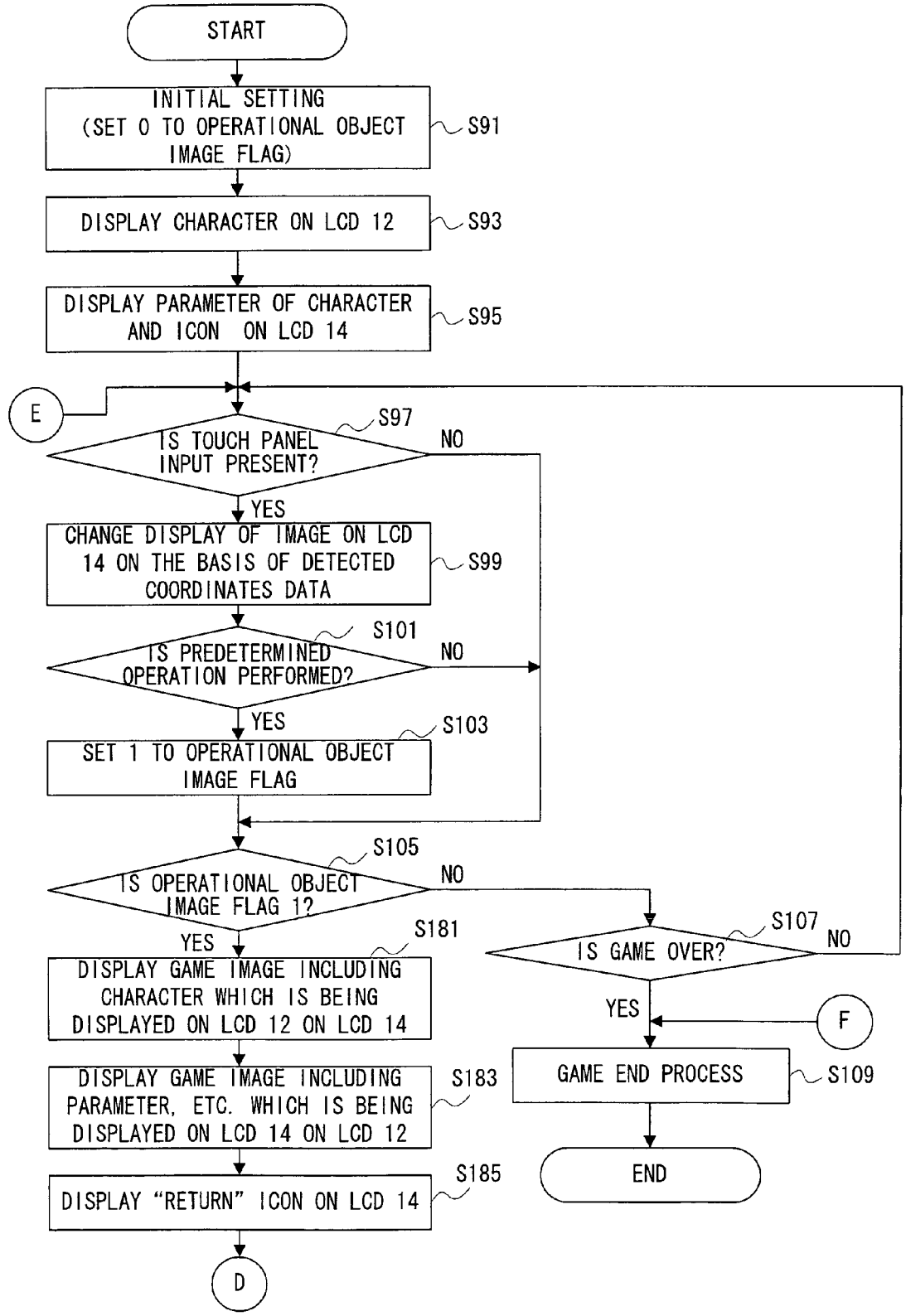
FIG. 23 is a flowchart showing one example of an operation of the game apparatus in a modified example 1 of the pet-raising simulation game.
Figure 24:
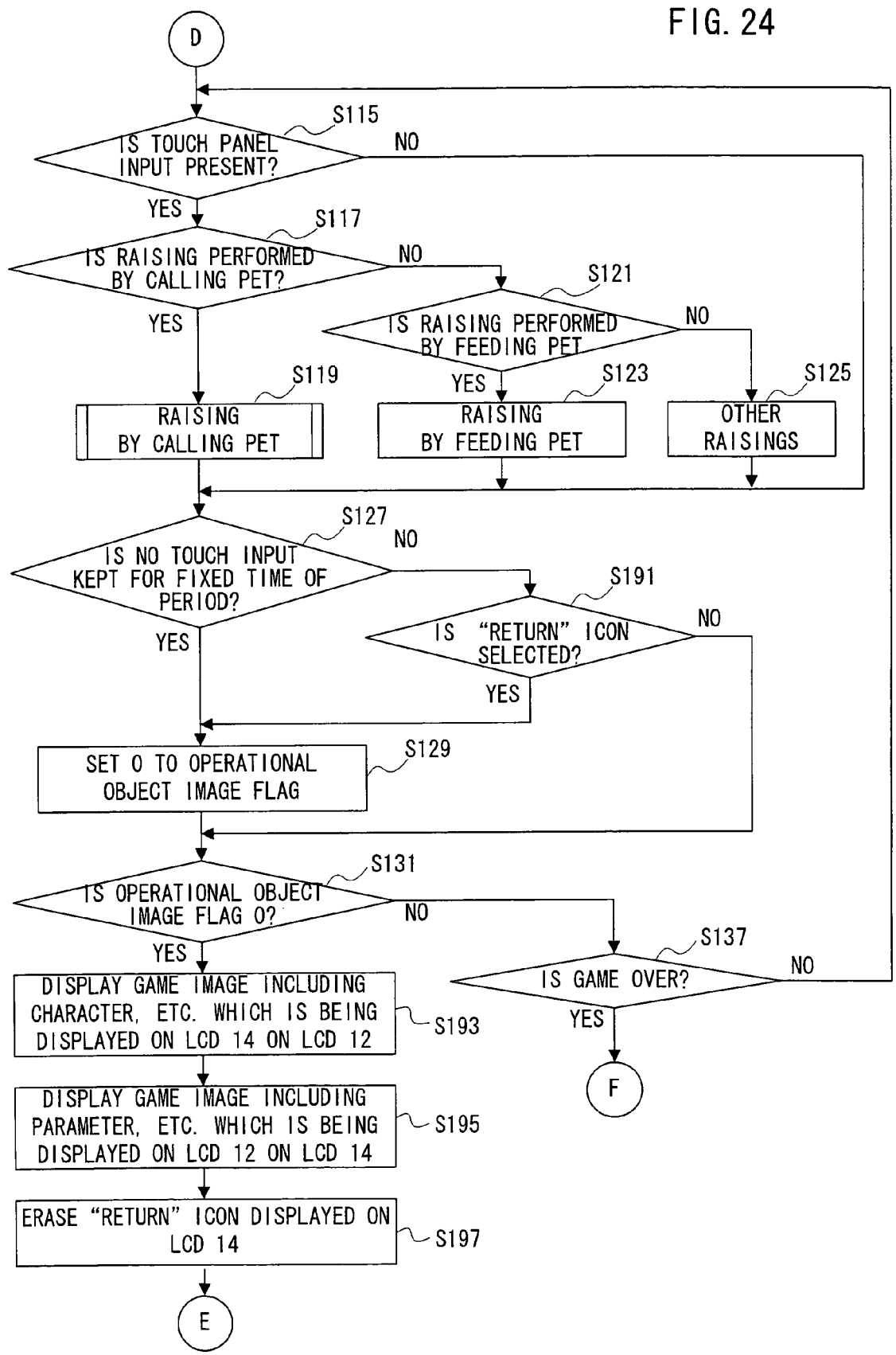
FIG. 24 is a flowchart continued from FIG. 23.

FIG. 23 and FIG. 24 shows one example of an operation of the game apparatus 10 if a modified example 1 of the pet-raising simulation game is executed. It should be noted that the same reference numerals are applied to the process the same as that in the above-described FIG. 18 and FIG. 19 out of the operation shown in FIG. 23 and FIG. 24 to thereby omit the detailed description thereof.

If "YES" in the step S105 in FIG. 23, that is, if an input to the display position of the operation icon 118 or 120 is present, and "1" is stored in the operational object image flag area 94, the CPU core 42 displays a game image including the character which is being displayed on the LCD 12 on the LCD 14 in a step S181. For example, the CPU core 42 generates a game screen including each of the pets 110 A-C on the basis of the image data, etc. indicative of each of the pets 110 A-C in the first game image data storing area 96, and displays it on the LCD 14 by utilizing the GPU 52 (or GPU 50) and the LCD controller 60. Furthermore, in a step S183, the CPU core 42 displays a game image including the parameter display images 112 A-C and the operation icons 116, 118, 120 which are being displayed on the LCD 14 on the LCD 12. For example, the CPU core 42 generates a game screen including the parameter display images 112 A-C and the operation icons 116, 118, 120 on the basis of the image data indicative of the parameter display image of the second game image data storing area 98 and the image data indicative of the operation icon, and displays it on the LCD 12 by utilizing the GPU 50 (or GPU 52) and the LCD controller 60. In addition, in a step S185, the CPU core 42 displays the "Return" icon 122 on the LCD 14. For example, the CPU core 42 generates an image indicative of the "Return" icon 122 on the basis of the data for displaying the "Return" icon 122 stored in the image data storing area 88 in a predetermined display position or area on the screen generated in the step S183, and displays it on the LCD 14 by utilizing the GPU 52 (or GPU 50) and the LCD controller 60. After completion of the process in the step S185, the process proceeds to the step S115 in FIG. 24. Thus, as shown in FIG. 21, the game screens are switched between the LCD 12 and the LCD 14.

Furthermore, if "NO" in the step S127 in FIG. 24, the CPU core 42 determines whether or not the "Return" icon 122 is selected in a succeeding step S191. That is, the CPU core 42 determines whether or not the detected input coordinates are included in the display position or area of the "Return" icon 122 on the basis of the detected touch input data and the data indicative of the display position of the "Return" icon 122 stored in the image data storing area 88. If "YES" in the step S191, it is considered that the screen including the pet 110 which is being displayed on the LCD 14 is not an object to be operated, and "0", for example, is written to the operational object image flag area 94 in the step S129. On the other hand, if "NO" in the step S191, the process proceeds to the step S131 without changing the object to be operated.

Then, if "YES" in the step S131, the CPU core 42 displays the game image including the character (pets 110 A-C), etc. which is being displayed on the LCD 14 on the LCD 12 in a step S193. Furthermore, in a step S195, the CPU core 42 displays the game image including the parameter display images 112 A-C and the operation icons 116, 118, 120, etc. which is being displayed on the LCD 12 on the LCD 14. In addition, the CPU core 42 erases the "Return" icon 122 which is being displayed on the LCD 14 in a step S197. For example, in the steps S195 and S197, data to display the screen not including the "Return" icon 122 is generated so as to be displayed on the LCD 14. Thus, as shown in FIG. 22, the game screens are switched between the LCD 12 and the LCD 14 so as to be returned to the original arrangement again. After completion of the process in the step S197, the process returns to the step S97 in FIG. 23.

Figure 25:
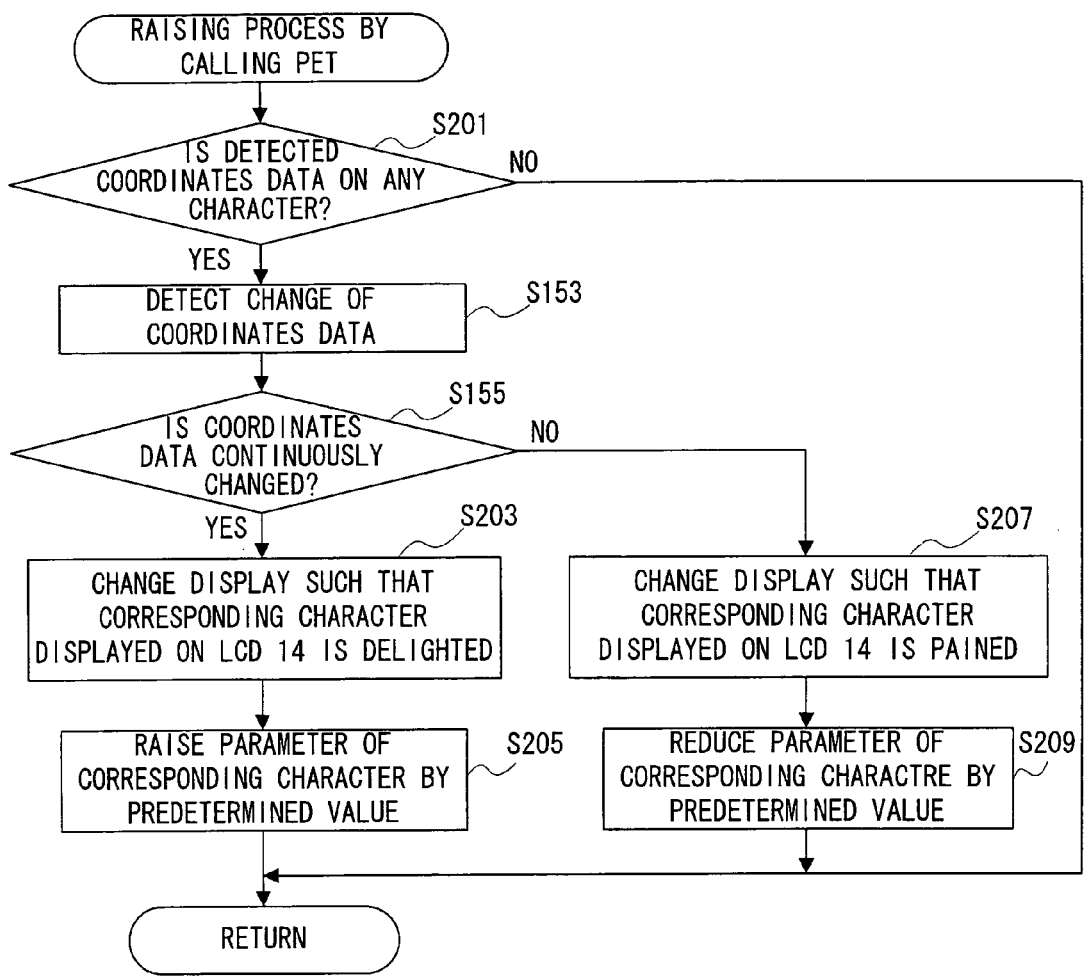
FIG. 25 is a flowchart showing one example of an operation in a raising process by calling a pet in FIG. 24.

FIG. 25 shows one example of an operation of a raising process by calling a pet (step S119 in FIG. 24) in the modified example 1. It should be noted that the same reference numerals are applied to the process the same as that in the above-described FIG. 20 out of the process shown in FIG. 25 to thereby omit the detailed description.

In a step S201 in FIG. 25, the CPU core 42 determines whether or not the detected coordinates data is equal to the display position coordinates in any one of the characters (pets 110 A-C) on the basis of the detected touch input data and data indicative of the display position of each character stored in the first game image storing area 96. In this embodiment, the plurality of pets 110 A-C are displayed on the screen, and therefore, a pet that a user intends to raise is specified.

Then, when it is determined that the pet 110 is stroked, the CPU core 42 changes the display of the character such that the character (pet 110) corresponding to the detected coordinates which is being displayed on the LCD 14 reacts in a delighted way in a step S203. Also, in a step S205, the CPU core 42 raises the parameter of the character (pet 110) corresponding to the detected coordinates by a predetermined value to change the parameter display image 112 such that the parameter value is raised.

Alternatively, when it is determined that the pet 110 is beaten, the CPU core 42 changes the display of the character (pet 110) corresponding to the detected coordinates which is being displayed on the LCD 14 such that the character reacts in a pained way in a step S207. In addition, in a step S209, the CPU core 42 lowers the parameter of the character (pet 110) corresponding to the detected coordinates by a predetermined value, and changes the parameter display image 112 such that the parameter value is reduced. After completion of the process in the step S205 or the step S209, the process returns to the step S127 in FIG. 24.

In the above-described modified example 1 of the pet-raising simulation game, the entire screen including the plurality of pets 110 is moved from the upper screen to the lower screen. However, as shown in the modified example 2 of the pet-raising simulation game shown in FIG. 26 to FIG. 30, a selected image out of the plurality of pets 110 may be moved.

In the modified example 2, as shown in FIG. 26 (A), a plurality of pets 110A, 110B and 110C are displayed on the LCD 12. On the other hand, a "Call a dog A" icon 118A, a "Call a dog B" icon 118B, "Call a dog C" 118C, and a "Call all" icon 118D are displayed as an operation icon on the LCD 14. These are equal to the "Call a pet" icon 118 in the embodiment of the above-described pet-raising simulation game, and are for moving the pet 110 to the lower screen in order to raise the pet. It should be noted that the parameter display images 112 A-C indicative of a parameter such as feelings, etc. of each of the pets 110 A-C are also displayed on the lower screen.

More specifically, the icons 118A, 118B and 118C are operation icons which are respectively corresponded to the pets 110A, 110B and 110C, and are for instructing movement of the corresponding pet 110 to the lower screen. In the data storage area, data which brings the identification number of the plurality of pets 110 into correspondence with the identification number and the display position, etc. of the plurality of operation icons 118, for example, are stored. When a coordinates input to the display position of each icon 118A-C is detected, it is determined that a corresponding pet 110 A-C becomes an object to be operated. In the operational object image flag area 94, operational object image flags A-C which are respectively corresponded to the plurality of pets 110 A-C are provided. When the pet 110 becomes an object to be operated, "1", for example, is set in the corresponding operational object image flag, and when the pet 110 is not an object to be operated, "0", for example, is set in the corresponding operational object image flag. Then, an image showing the pet 110 having the operational object image flag of "1" is displayed on the LCD 14.

In FIG. 26 (A), the "Call a dog A" icon 118A is selected, and therefore, as shown in FIG. 26 (B), the corresponding pet 110A is displayed on the LCD 14, and the rest of the pets 110B and 110C are displayed on the background of the LCD 12. In FIG. 27 (A), the "Call a dog C" icon 118C is selected, and therefore, as shown in FIG. 27 (B), the corresponding pet 110C is displayed on the LCD 14, and the rest of the pets 110A and 110C are displayed on the background of the LCD 12. Thus, when the selected pet 110 is displayed on the lower screen, a raising the pet 110 is allowed.

Also, when the pet 110 is moved to the lower screen so as to be displayed, the "Return" icon 122 is displayed on the lower screen as shown in FIG. 26(B) and FIG. 27(B). The "Return" icon 122 is for instructing returning of the image indicative of the pet 110 moved to the lower screen to the upper screen, and by selecting the icon 122 as a selected area, the pet 110 displayed on the lower screen is returned to the upper screen.

In addition, the "Call all" icon 118D is for instructing collectively moving of all the pets 110 A-C to the lower screen. When the coordinates input to the display position of the icon 118D is detected, it is determined that all the pets 110 A-C become an object to be operated, and "1" is set to the operational object image flags A-C corresponding to all the pets. Thus, as shown in FIG. 28 (A), when the "Call all" icon 118D is selected, an image showing all the pets 110 A-C is displayed on the LCD 14 as shown in FIG. 28 (B). Thus, it is possible to raise all the pets 110 A-C.

Furthermore, when all the pets 110 A-C are moved to the lower screen, a "Return A" icon 122A, a "Return B" icon 122B, a "Return C" icon 122C, and a "Return all" icon 122D are displayed on the lower screen as shown in FIG. 28 (B).

The icons 122A, 122B, and 122C are the operation icons which are respectively corresponded to the pets 110A, 110B and 110C, and are for instructing moving a corresponding pet 110 to the upper screen. When a coordinates input to the display position of each icon 122 A-C is detected, it is determined that a corresponding pet 110 A-C does not become an object to be operated, and "0" is set to the corresponding operational object image flag. Then, an image indicative of the pet 110 having the operational object image flag of "0" is displayed on the LCD 12.

In FIG. 29(A), since the "Return B" icon 122B is selected, a corresponding pet 110B is displayed on the LCD 12 as shown in FIG. 29 (B). On the other hand, the rest of the pets 110B and 110C are displayed together with the operation icons 122A, 122C and 122D, etc on the LCD 14. The operation icon 122B for returning the pet 110B to the upper screen is not needed, and therefore, it is erased from the lower screen.

Furthermore, the icon 122D is for instructing collectively moving of all the pets 110 A-C to the upper screen. When a coordinates input to the display position of the icon 122D is detected, it is determined that all the pets 110 A-C do not become an object to be operated, and "0" is set to the operational object image flags A-C corresponding to all the pets. Thus, when the "Return all" icon 122D is selected as shown in FIG. 30 (A), the image representing all the pets 110 A-C is displayed on the LCD 12 as shown in FIG. 30(B). Furthermore, the initial operation icons 118A-D for moving the pets 110 A-C individually or collectively to the lower screen is displayed on the LCD 14 again.

Figure 31:
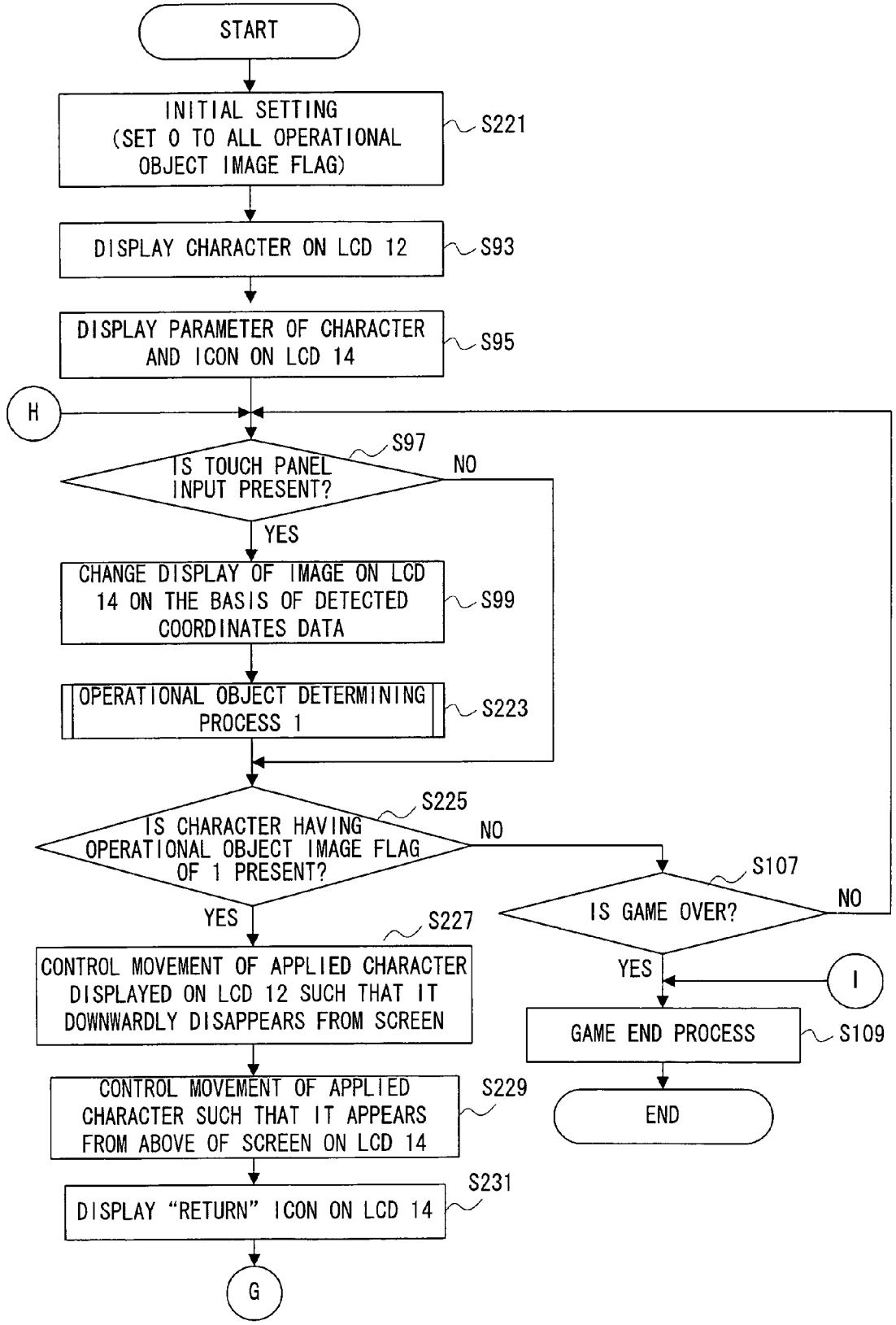
FIG. 31 is a flowchart showing a part of one example of an operation of the game apparatus in the modified example 2 of the pet-raising simulation game.
Figure 32:
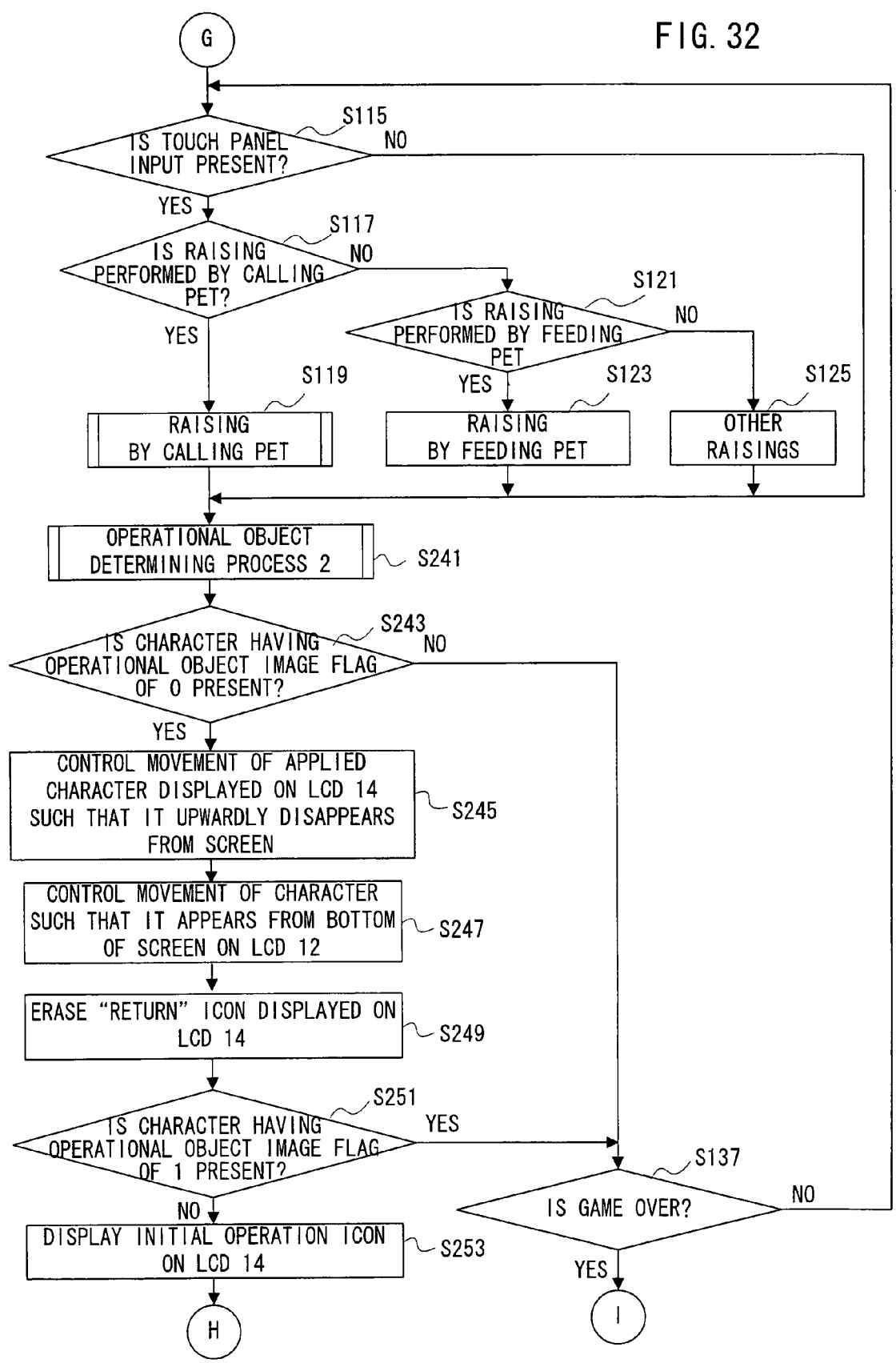
FIG. 32 is a flowchart continued from FIG. 31.

FIG. 31 and FIG. 32 show one example of an operation of the game apparatus 10 in a case that the modified example 2 of the pet-raising simulation game is executed. It should be noted that the same reference numerals are applied to the processes the same as that in the above-described FIG. 18 and FIG. 19 or FIG. 23 and FIG. 24 out of the operations shown in FIG. 31 and FIG. 32 to thereby omit the detailed description.

In a first step S221 in FIG. 31, the CPU core 42 executes an initial setting to set initial values in various variables, flags, etc. And, "0" is set to all the operational object image flags in the operational object image flag area 94.

In a step S223, the CPU core 42 executes an operational object determining process 1 on the basis of the detected touch input coordinates and the display position coordinates of each icon 118 stored in the second game image storing area 98. The operation of the operational object determining process 1 is shown in FIG. 33.

Figure 33:
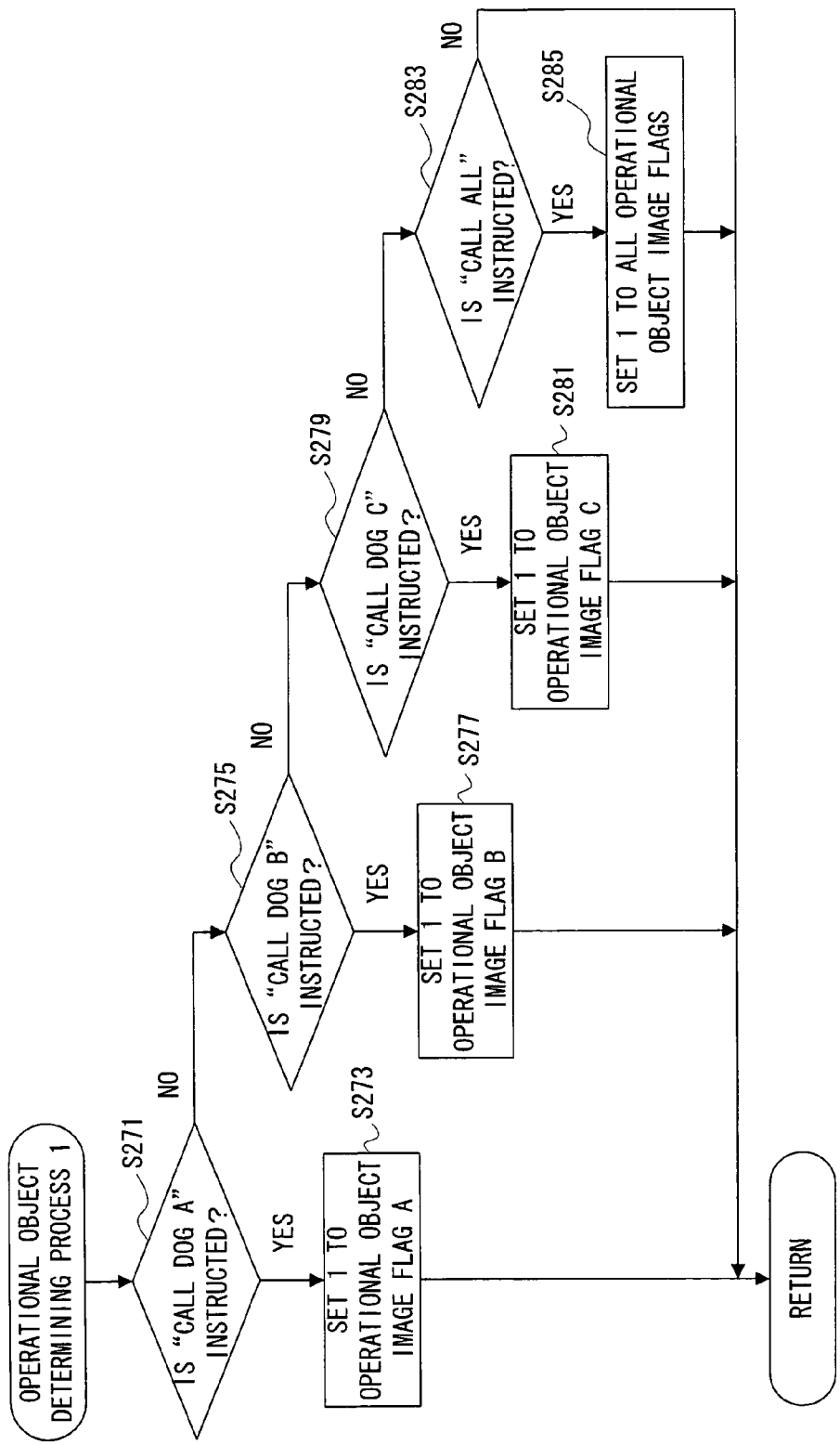
FIG. 33 is a flowchart showing one example of an operation of an operational object determining process 1 in FIG. 31.

In a first step S271 in FIG. 33, the CPU core 42 determines whether or not the "Call a dog A" icon 118A is instructed, and if "YES", "1" is stored in the storage area of the operational object image flag A corresponding to the pet 110A in a step S273. Also, if "NO" in the step S271, the CPU core 42 determines whether or not the "Call a dog B" icon 118B is instructed in a step S275, and if "YES", "1" is stored in the storage area of the operational object image flag B corresponding to the pet 110B in a step S277. If "NO" in the step S275, the CPU core 42 determines whether or not the "Call a dog C" icon 118C is instructed in a step S279, and if "YES", "1" is stored in the storage area of the operational object image flag C corresponding to the pet 110C in a step S281. Alternatively, if "NO" in the step S279, the CPU core 42 determines whether or not the "Call all" icon 118D is instructed in a step S283, and if "YES", "1" is stored in the respective storage areas of the operational object image flags corresponding to all the pets 110 in a step S285. It should be noted that if "NO" in the step S283, that is, if none of the operation icons 118 A-D is instructed, the operational object determining process 1 is ended, and the process returns to the step S225 in FIG. 31.

Returning to FIG. 31, in the step S225, the CPU core 42 determines whether or not the character (pet 110) having the operational object image flag of "1" is present. More specifically, it is determined whether or not the character with the operational object image flag changed to "1" is present. If "YES" in the step S225, that is, if the character which becomes an object to be operated exists, the CPU core 42 specifies a applied character on the basis of the operational object image flag, and controls the movement of it such that the applied character which is being displayed on the LCD 12 downwardly disappears from the screen in a step S227. Succeedingly, in a step S229, the CPU core 42 controls the movement of it such that the applied character appears from above of the screen on the LCD 14. For example, when "1" is set to the operational object image flag A, a screen is displayed in which the pet 110A corresponding to the applied flag A moves to the lower end of the LCD 12, and appears from the upper end of the LCD 14 and moves to a predetermined display position. Or, when "1" is set to all the operational object image flag A-C, a screen in which all the pets 110 A-C move from the upper screen to the lower screen is displayed. In a step S231, the CPU core 42 displays an applied "Return" icon 122 on the LCD 14 on the basis of the data for displaying the "Return" icon 122A-D stored in the image data storing area 88 and the operational object image flag. For example, if "1" is set to the only one operational object image flag, one "Return" icon 122 is displayed on the LCD 14. Also, if "1" is set to the plurality of operational object image flags, the applied plurality of game characters are specified on the basis of the data, etc. indicative of a correspondence between the operational object image flag and the game character stored in the data storage area, and the "Return" icon 122 for each character on the LCD 14 is displayed. Also, if "1" is set to all the operational object image flags, the "Return" icon 122 for each character and the "Return all" icon 122D are displayed on the LCD 14. After completion of the process in the step S231, the process proceeds to the step S115 in FIG. 32.

Thus, after moving the pet 110 to the lower screen, the CPU core 42 executes an operational object determining process 2 in a step S241 in FIG. 32 on the basis of the detected touch input coordinates, the display position coordinates of each icon 122 stored in the image data storing area 88, etc. The operation of the operational object determining process 2 is shown in detail in FIG. 34.

Figure 34:
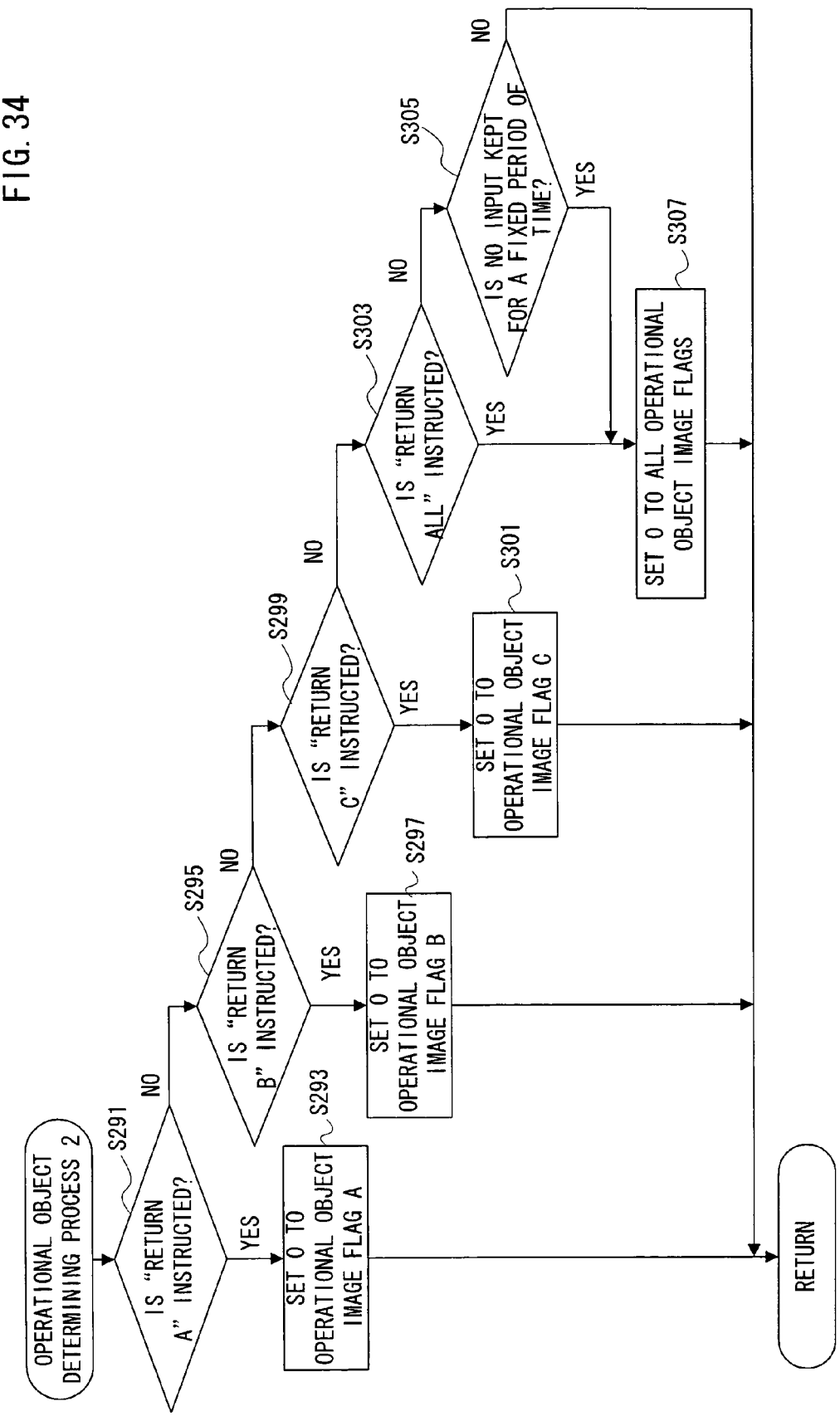
FIG. 34 is a flowchart showing one example of an operation of an operational object determining process 2 in FIG. 32.

In a first step S291 in FIG. 34, the CPU core 42 determines whether or not the "Return A" icon 122A is instructed, and if "YES", "0" is stored in a storage area of the operational object image flag A corresponding to the icon 122A (pet 110A) in a step S293. If "NO" in the step S293, the CPU core 42 determines whether or not the "Return B" icon 122B is instructed in a step S295, and if "YES", "0" is stored in a storage area of the operational object image flag B corresponding to the icon 122B (pet 110B) in a step S297. Also, if "NO" in the step S295, the CPU core 42 determines whether or not the "Return C" icon 122C is instructed in a step S299, and if "YES", "0" is stored in a storage area of the operational object image flag C corresponding to the icon 122C (pet 110C) in a step S301. Furthermore, if "NO" in the step S299, the CPU core 42 determines whether or not the "Return all" icon 122D is instructed in a step S303. If "NO" in the step S303, the CPU core 42 determines whether or not input coordinates is not detected for a fixed period of time in a step S305. If "YES" in the step S303 or the step 305, the CPU core 42 stores "0" in the storage areas of all the operational object image flags in a step S307. It should be noted that if "NO" in the step S305, the operational object determining process 2 is directly ended, and the process returns to a step S243 in FIG. 32.

In the step S243 in FIG. 32, the CPU core 42 determines whether or not the character (pet 110) having the operational object image flag of "0" is present. More specifically, it is determined whether or not the character with the operational object image flag changed to "0" is present. If "NO" in the step S243, the character which does not become an object to be operated is not present, the process proceeds to a step S137.

Alternatively, if "YES" in the step S243, that is, if the character which does not become an object to be operated is present, the CPU core 42 controls the movement of it such that the applied character displayed on the LCD 14 upwardly disappears from the screen in a step S245. Succeedingly, in a step S247, the CPU core 42 controls the movement of it such that the applied character appears from the bottom of the screen on the LCD 12. Also, in a step S249, the CPU core 42 erases the applied "Return" icon 122 which is being displayed on the LCD 14. For example, data to display the screen not including the applied "Return" icon 122 is generated so as to be displayed on the LCD 14.

Succeedingly, in a step S251, the CPU core 42 determines whether or not the character having the operational object image flag of "1" is present. If "YES" in the step S251, that is, if the character of the object to be operated still remains, the process proceeds to a step S137. On the other hand, if "NO" in the step S251, all the characters do not become an object to be operated, and are moved to the LCD 12, and therefore, the CPU core 42 displays the initial operation icons 118A-D on the LCD 14 in a step S253. After completion of the process in the step S253, the process returns to the step S97 in FIG. 31.

In each of the above-described embodiments, in a step S101 in FIG. 18, for example, when the touch input coordinates are a specific position (display position of the operation icon 118, 120 or the like), it is determined that the game image which is being displayed on the LCD 12 (the pet 110 or the screen including the pet 110, and the like) becomes an object to be operated. However, in another embodiment, when the input coordinates are one which indicates the presence of an specific instructing operation, it may be determined that the game image which is being displayed on the LCD 12 is an object to be operated, or it may be determined that the game image which is being displayed on the LCD 14 does not become an object to be operated. The specific instructing operation may be, for example, to instruct an arbitrary position (arbitrary position on the touch panel 22) on the LCD 14 twice in a brief time (double-click operation), or to continuously change an instructed position by a predetermined distance (or for a predetermined time period) (drag operation or sliding operation), etc. In these cases, determining changes or continuous detection time of the coordinates data makes it possible to determine whether or not a specific instructing operation is present.

Also, in each of the above-described embodiments, by determining an image of an object to be operated on the basis of the input data (coordinates data) from the touch panel 22, a character image displayed on the upper screen or a game image such as an entire screen, etc. is displayed on the lower screen, or the game image displayed on the lower screen is displayed on the upper screen. However, the display control of the game images between the LCD 12 and the LCD 14 may be executed on the basis of operation input data from the operating switch 20 or sound input data from the microphone 34.

For example, in the pet-raising simulation game, if the pet 110 is displayed on the LCD 12 (FIG. 12, FIG. 21 (A), etc.), when the obtained operation input data is data indicative of instructing the down direction key of the cross switch 20a, for example, or when the obtained sound input data is data indicative of exceeding a predetermined volume, data which indicates a predetermined sound wave form, or the like, it is determined that the pet 110 becomes an object to be operated, and thus the pet 110 may be displayed on the LCD 14. On the other hand, if the pet 110 is displayed on the LCD 14 (FIG. 13, FIG. 22 (A), etc.), when the obtained operation input data is data indicative of instructing the up direction key of the cross switch 20a, for example, or when the obtained sound input data is data indicative of exceeding a predetermined volume, data which indicates a predetermined sound wave form, or the like, it is determined that the pet 110 does not become an object to be operated, and thus, the pet 110 may be displayed on the LCD 12.

Figure 35:
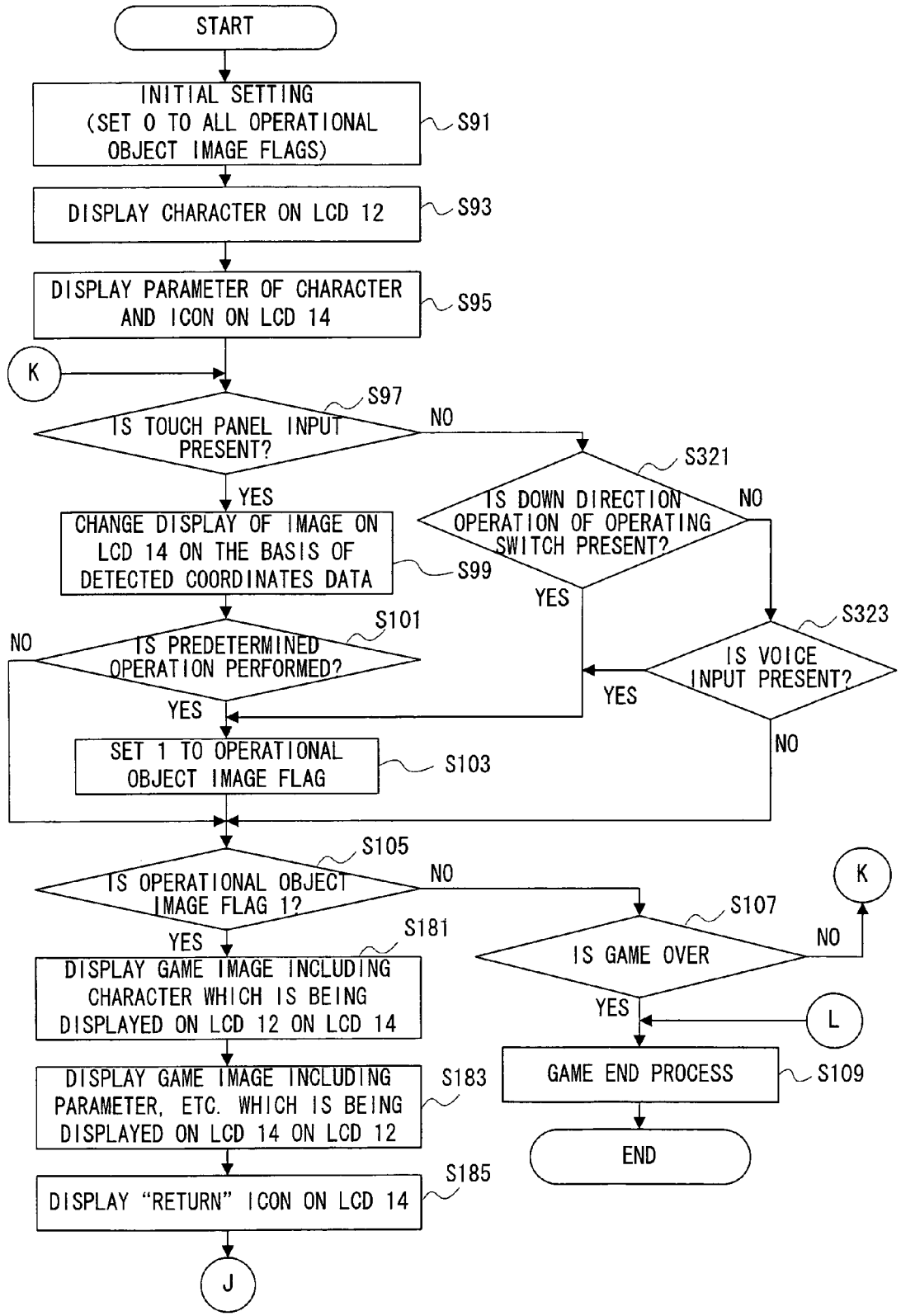
FIG. 35 is a flowchart showing one example of an operation of the game apparatus in a modified example 3 of the pet-raising simulation game.
Figure 36:
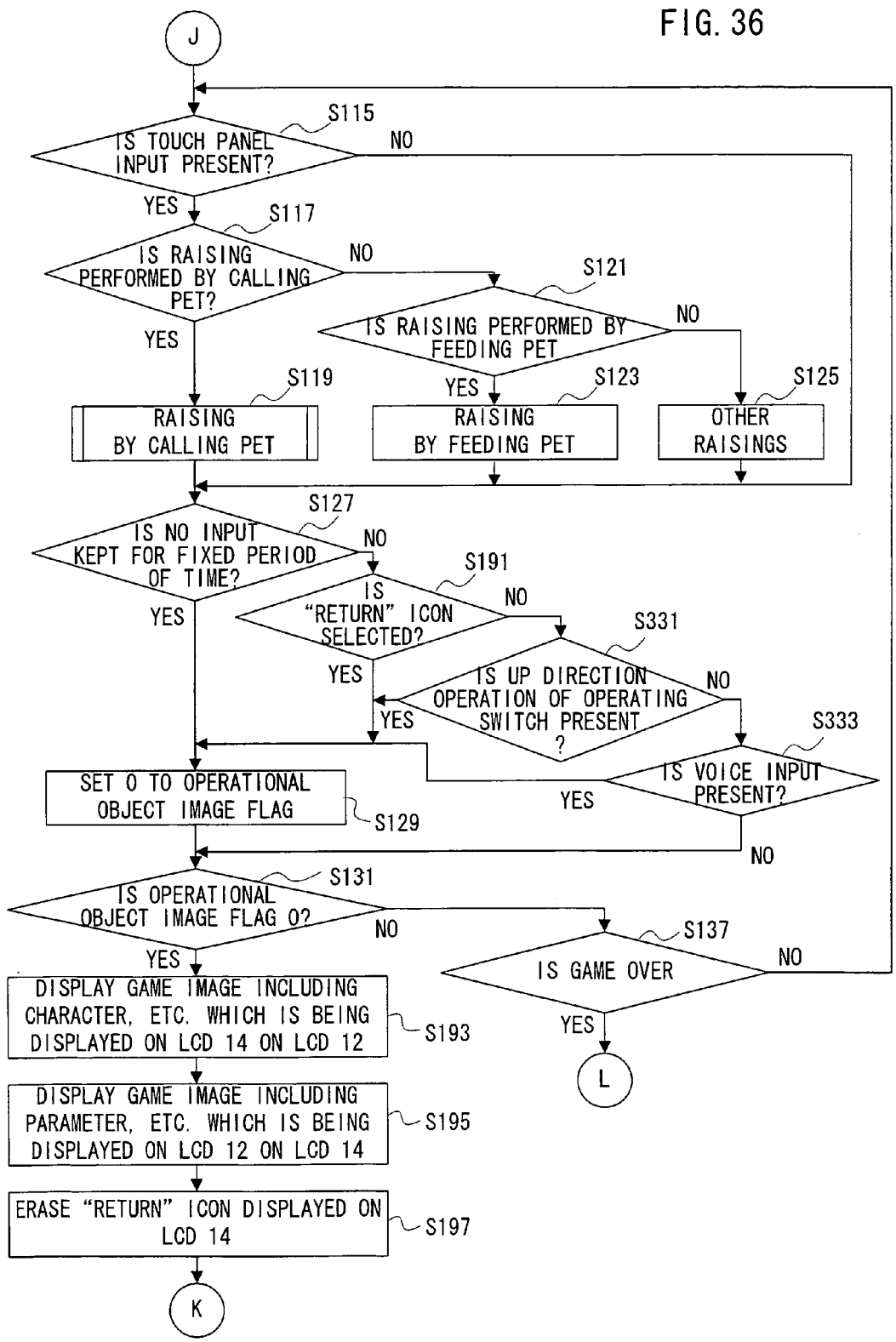
FIG. 36 is a flowchart continued from FIG. 35.

More specifically, FIG. 35 and FIG. 36 show one example of an operation of the game apparatus 10 in this case. It should be noted that a modified example 3 in the pet-raising simulation game shown in FIG. 35 and FIG. 36 is one example incorporating a game image control on the basis of input data from the operating switch 20 or sound input data into the above-described modified example 1 of the pet-raising simulation game. The same reference numerals are applied to the process the same as that in the above-described FIG. 23 and FIG. 24 out of the operation in FIG. 35 and FIG. 36 to thereby omit the detailed description.

If "NO" in the step S97 in FIG. 35, the CPU core 42 detects operation input data from the operating switch 20 via the I/F circuit 54, and determines whether or not a down direction operation of the cross switch (cross key) 20a is present on the basis of the detected operation input data in a step S321. It should be noted that the down direction operation of the cross switch 20a as a determination condition is one example, and an operation of another operation button out of the operating switch 20 may be the condition. If "YES" in the step S321, the process proceeds to a step S103. Alternatively, if "NO" in the step S321, the CPU core 42 detects sound input data on the basis of the input from the microphone 34 via the I/F circuit 54 in a step S323, and determines whether or not the a voice input by a user is present on the basis of the detected sound input data. For example, if the volume indicated by the sound input data exceeds a threshold value, or if the sound input data indicates a predetermined sound wave form, and so forth, it is determined the voice input by the user is present. If "YES" in the step S323, the process proceeds to a step S103. It should be noted that if "NO" in the step S323, the process proceeds to a step S105 as it is.

If "NO" in a step S191 in FIG. 36, the CPU core 42 detects operation input data from the operating switch 20 via the I/F circuit 54, and determines whether or not an up direction operation of the cross switch 20a, for example, is present on the basis of the detected operation input data in a step S331. It should be noted that the up direction operation of the cross switch 20a as a determination condition is one example, and an operation of another operation button out of the operating switches 20 may be an condition. If "YES" in the step S331, the process proceeds to a step S129. Alternatively, if "NO" in the step S331, the CPU core 42 detects sound input data on the basis of the input from the microphone 34 via the I/F circuit 54, and determines whether or not a voice input by the user is present on the basis of the detected sound input data in a step S333. If "YES" in the step S333, the process proceeds to a step S129. It should be noted that if "NO" in the step S333, the process proceeds to a step S131.

It should be noted that in the above-described FIG. 35 and FIG. 36, a determination whether or not it is an image of the object to be operated is performed on the basis of the touch input data from the touch panel 22, the operation input data by the operating switch 20, and the sound input data by the microphone 34 in the step S101, the step S321 and in the step S323, respectively. Furthermore, a determination whether or not it is not an image of an object to be operated is performed on the basis of the touch input data, the operation input data, and the sound input data in the steps S127 and S191, the step S331 and the step S333, respectively. However, the determination of the image of the object to be operated may be executed on the basis of only the operation input data or the sound input data. That is, the touch input data may be utilized for the game processing on the game image displayed on the LCD 14, and may not be utilized as a determination condition of the object to be operated. In this case, a movement instructing means for inputting an instruction of movement of the game image between the LCD 12 and the LCD 14 is the operating switch 20 or the microphone 34, and the operation input data or the sound input data is detected as movement instructing data. More specifically, the steps S97, S99, and S101 may be deleted in FIG. 35, and the steps S127 and S191 may be deleted in FIG. 36. In such a case, it is possible to determine whether or not the game image is an object to be operated in response to a user instruction from another instructing means different from the touch panel 22 for making an input to the game image during the play.

In the above-described card game also, it is needless to say that the display control of the game images between the LCD 12 and the LCD 14 is performed on the basis of the operation input data from the operating switch 20, or the sound input data from the microphone 34. For example, it is appropriate that it is determined in the step S45 in FIG. 10 whether or not the obtained operation input data indicates an operation from the predetermined operating switch 20, or whether or not the obtained sound input data indicates a voice input by the user on the basis of the volume or the sound waveform, etc.

Also, whether or not the game image is an object to be operated may be determined depending not on the input data from the touch panel 22, the operating switch 20, or the microphone 34, but on a lapse of unit of time. In this case, the game images are automatically moved between the LCD 12 and the LCD 14 per unit of time. The method can be applied to a match-up game adopting a time-turning-method, for example.

Furthermore, in each of the above-described embodiments, although the first LCD 12 and the second LCD 14 are vertically arranged, the arrangement of the two LCDs can be arbitrarily changed. In the game apparatus 10 of another embodiment, for example, the first LCD 12 and the second LCD 14 may be horizontally arranged.

In the above-described each of the embodiments, although the two LCD each displaying a screen are provided, the number of the LCDs as a display portion may be changed as necessary. In the game apparatus 10 of the other embodiment, for example, one vertically-long shaped LCD is provided, and a touch panel 22 is provided on at least one of the display areas vertically divided, and two images may be displayed on the display areas. Or, one horizontally-long shaped LCD is provided, and the touch panel 22 is provided on at least one of the display areas horizontally divided, and two images may be displayed on the display areas.

Additionally, in each of the above-described embodiments, an input means for instructing an arbitrary position of the second LCD 14 (display portion or display area) is the touch panel 22. However, other pointing devices, such as a computer mouse, a touch pad, a tablet, etc. may be utilized. In this case, an image indicative of an instructed position by the user, such as a mouse pointer and a cursor is displayed on the LCD 14.

Although the non-limiting illustrative embodiments have been described and illustrated in detail, it is clearly understood that the same is by way of illustration and example only and is not to be taken by way of limitation. The spirit and scope of the invention is intended to be limited only by the terms of the appended claims.

What is claimed is:

1. A game apparatus, comprising:
   a first display portion;
   a second display portion;
   a memory storage to store data to display a game image;
   an input device for configured to instruct a position on said second display portion;
   a sensor to detect coordinates data corresponding to the position;
   operational object determining programmed logic circuitry configured to determine whether or not a first game image displayed on said first display portion becomes an object to be operated on the basis of the coordinate data;
   a processing system configured to cause:
      a switch between said first game image which is being displayed on said first display portion and a second game image which is being displayed on said second display portion, and respectively displaying the images on said second display portion and said first display portion when a determination is made that said first game image becomes the object to be operated on the basis of the coordinate data; and
      a game process on said game image displayed on second display portion on the basis of the coordinate data,
   wherein the first game image displayed on said second display portion is changed on the basis of the coordinate data.

2. A game apparatus according to claim 1, wherein said operational object determining programmed logic circuitry further determines whether or not said first game image displayed on said second display portion does not become the object to be operated, and
   if said first game image displayed on said second display portion does not become the object to be operated by the operational object determining programmed logic circuitry, then the processing system is configured to cause said first game image to be displayed on said first display portion.

3. A game apparatus according to claim 2, wherein if said first game image does not become the object to be operated by the operational object determining programmed logic circuitry, then the processing system is configured to cause said first game image to be changed on the basis of the coordinate data on said first display portion.

4. A game apparatus according to claim 2, wherein
   said operational object determining programmed logic circuitry determines whether or not a predetermined condition is satisfied when said first game image is being displayed on said second display portion, and further determines that said first game image does not become the object to be operated,
   if said first game image does not become an object to be operated by said operational object determining programmed logic circuitry, then the processing system is configured to cause said first game image displayed on said second display portion to be displayed on said first display portion and causes said second game image displayed on said first display portion on to be displayed on the second display portion.

5. A game apparatus according to claim 4, wherein said predetermined condition includes no detection of said coordinate data for a fixed period of time.

6. A game apparatus according to claim 4, further comprising a selected area storage for storing data to display a selected area to instruct returning said first game image displayed on said second display portion to said first display portion, wherein
   the processing system is configured to cause said selected area to be displayed on said second display portion when said first game image is displayed on said second display portion, and
   said predetermined condition includes the coordinate data that indicates a display position of said selected area.

7. A game apparatus according to claim 6, wherein if said first game image does not become the object to be operated, then the processing system is configured to cause the said selected area to be erased on said second display portion.

8. A game apparatus according to claim 1, wherein
   said memory storage stores data to display a game image including a plurality of figures,
   said operational object determining programmed logic circuitry determines whether or not any one of said plurality of figures of the second game image displayed on said second display portion is selected on the basis of the coordinate data, and by determining that said figure is selected determines that said first game image displayed on said first display portion becomes the object to be operated,
   if said first game image becomes the object to be operated by said operational object determining programmed logic circuitry, then the processing system is configured to cause said first game image displayed on said first display portion to be displayed on said second display portion and to cause said second game image displayed on said second display portion to be displayed on said first display portion.

9. A game apparatus according to claim 8, wherein if said first game image becomes the object to be operated by said operational object determining programmed logic circuitry, then the processing system is configured to cause said first display portion to display a third game image obtained by changing said second game image in such a manner as to exclude the selected figure from said second game image displayed on second display portion and to cause said first game image displayed on said first display portion and said selected figure on said second display portion to be displayed.

10. A game apparatus according to claim 9, wherein said operational object determining programmed logic circuitry further determines whether or not said selected figure is arranged in a predetermined position in said first game image on the basis of the coordinate data after the processing system causes said first game image to be displayed on said second display portion, and by determining that said selected figure is arranged in the predetermined position determines that said first game image does not become the object to be operated, and
   if said first game image does not become the object to be operated by said operational object determining programmed logic circuitry, then the processing system is configured to cause said first display portion to display a fourth game image changed in such a manner as to arrange said selected figure in the predetermined position of said first game image, and to cause said third game image displayed on said first display portion to be displayed on said second display portion.

11. A game apparatus according to claim 8, wherein said figure includes a game character or icon.

12. A game apparatus according to claim 1, wherein said memory storage stores data to display a first game image including a plurality of game characters and data to display a second game image including a plurality of selected figures to select each of said plurality of game characters, said operational object determining programmed logic circuitry further determines whether or not any of said plurality of selected figures displayed on said second display portion is selected on the basis of the coordinate data, and by determining that any of said plurality of selected figures is selected, determines that said game character corresponding to said selected figure out of said plurality of game characters displayed on said first display portion becomes the object to be operated, and the processing system is configured to cause said game character which is determined to become the object to be operated by said operational object determining programmed logic circuitry in such manner as to move to said second display portion.

13. A game apparatus according to claim 12, wherein said operational object determining programmed logic circuitry further determines whether or not a predetermined condition is satisfied in a state that said game character is being displayed on said second display portion, and by determining that said predetermined condition is satisfied, further determines that said game character displayed on said second display portion does not become the object to be operated, and the processing system is configured to cause said game character in such a manner as to move to said first display portion when said game character displayed on said second display portion does not become the object to be operated by said operational object determining programmed logic circuitry.

14. A game apparatus according to claim 13, wherein:

each of said plurality of game characters has a parameter that is associated with stored parameter data, wherein said parameter is displayed on any one of said first display portion and/or said second display portion on the basis of the parameter data, wherein the displayed parameter is changed on the basis of the coordinate data, and wherein if said game character displayed on said second display portion does not become the object to be operated by said operational object programmed logic circuitry, said game character is changed on the basis of the coordinate data in such a manner as to move to said first display portion.

15. A game apparatus according to claim 1, wherein said input means is a touch panel set on said second display portion.

16. A game apparatus, comprising:

a first display portion, a second display portion, a data storage medium for storing data to display a game image, an input device for instructing an arbitrary position in said second display portion, a processing system configured to carry out instructions for:

detecting coordinates data corresponding to a position instructed by said input device, instructing a movement of said game image between said first display portion and said second display portion, producing movement instruction data of the movement of the game image between the first display portion and the second display portion, determining whether or not a first game image displayed on said first display portion becomes an object to be operated on the basis of the movement instruction data, switching between said first game image which is being displayed on said first display portion and a second game image which is being displayed on said second display portion, and respectively displaying the first game image and the second game image on said second display portion and said first display portion when a determination is made that said first game image becomes an object to be operated, and performing a game process on said game image displayed on said second display portion on the basis of the coordinates data, and wherein the game process changes said first game image displayed on said second display portion on the basis of the coordinates data.

17. A non-transitory storage medium storing game program of a game apparatus having a first display portion, a second display portion, a memory storage for storing data to display a game image, and a user input device for instructing an arbitrary position in said second display portion, said game program causes a processing system of said game apparatus to execute;

detecting coordinate data corresponding to a position instructed by said user input device, determining whether or not a first game image displayed on said first display portion becomes an object to be operated on the basis of the coordinate, if said first game image becomes the object to be operated, switching between said first game image which is being displayed on said first display portion and a second game image which is being displayed on said second display portion, and respectively displaying them on said second display portion and said first display portion, and performing a game process on said game image displayed on said second display portion on the basis of the coordinate data, wherein said first game image displayed on said second display portion by said image display changes on the basis of the coordinate data.

18. A game control method of a game apparatus having a first display portion, a second display portion, a storage device for storing data to display a game image, and an input device for instructing an arbitrary position in said second display portion, the method comprising:

detecting coordinate data corresponding to a position instructed by said input device, determining whether or not a first game image displayed on said first display portion becomes an object to be operated on the basis of the coordinate data, if said first game image becomes the object to be operated, switching between said first game image which is being displayed on said first display portion and a second game image which is being displayed on said second display portion, and respectively displaying them on said second display portion and said first display portion, and performing a game process on said game image displayed on said second display portion on the basis of the coordinate data, wherein said first game image displayed on said second display portion changes on the basis of the coordinate data detected.

19. A non-transitory storage medium storing game program of a game apparatus having a first display portion, a second display portion, a memory storage device for storing data to display a game image, a user input device for instructing an arbitrary position in said second display portion, and a processor configured to instruct a movement of said game image between said first display portion and said second display portion, the game program having instructions to cause the processor of the game apparatus to execute:

detecting movement instructing data, determining whether or not a first game image displayed on said first display portion becomes an object to be operated on the basis of the movement instructing data, if said first game image becomes the object to be operated, switching between said first game image which is being displayed on said first display portion and a second game image which is being displayed on said second display portion, and respectively displaying them on said second display portion and said first display portion, detecting coordinate data corresponding to the arbitrary position, and performing a game process on said game image displayed on said second display portion on the basis of the coordinate data, wherein said first game image displayed on said second display portion changes on the basis of the coordinates data.

20. A game control method of a game apparatus having a first display portion, a second display portion, a storage device for storing data to display a game image, a user input device for instructing an arbitrary position in said second display portion, and movement instructing programmed logic circuitry for instructing a movement of said game image between said first display portion and said second display portion, the method comprising:

detecting movement instructing data, determining whether or not a first game image displayed on said first display portion becomes an object to be operated on the basis of the movement instructing data, if said first game image becomes an object to be operated, switching between said first game image which is being displayed on said first display portion and a second game image which is being displayed on said second display portion, and respectively displaying them on said second display portion and said first display portion, detecting coordinate data corresponding to the arbitrary position instructed by said user input device, and performing a game process on said game image displayed on said second display portion on the basis of the coordinate data, wherein said first game image displayed on said second display portion changes on the basis of the coordinate data.

21. A game apparatus, comprising:

a first display portion;

a second display portion;

a memory storage device for storing data to display a game image;

a first input device for instructing an arbitrary position in said second display;

a coordinate sensor for detecting coordinate data corresponding to a position instructed by said first input device;

a second input device different from said first input device, the second input device operable to detect second input data;

a processing system configured to:

determine whether or not a first game image displayed on said first display portion becomes an object to be operated on the basis of the second input data;

switch between said first game image which is being displayed on said first display portion and a second game image which is being displayed on said second display portion, and respectively displaying them on said second display portion and said first display portion, if said first game image becomes the object to be operated; and perform a game process on said game image displayed on second display portion on the basis of the coordinate data wherein said first game image displayed on said second display portion changes on the basis of the coordinate data.

22. A computer system comprising:

a first display screen;

a second display screen;

a user input device configured to interact with the second display screen, the interaction between the user input device and the second display screen resulting in coordinate data related to an interaction position; and a processing system configured to cause:

a first image displayed on the first display screen and a second image displayed on the second display screen to be respectively displayed on the other display screen when the first image becomes an operational object based at least in part on the coordinate data related to the interaction position on the second display screen.

23. A computer game system comprising:

a first display portion;

a second display portion;

a memory storage device configured to store a virtual game object;

a first user input device configured to accept user input relating to a position of the second display;

a processing system configured to:

animate movement of the virtual game object from the first display portion to the second display portion based on a received movement instruction, such that the virtual game object gradually transitions from the first display portion to the second display portion; and perform an action on the virtual game object based at least in part on the position of user input on the second display.

24. A computer system comprising:

a first display portion;

a second display portion;

a memory storage device configured to store a virtual game object;

a first user input device configured to accept positional user input data relating to a position of the second display;

a second input device configured to accept second input data, the second input device different from the first user input device;

a processing system configured to carry out instructions of:

determining an operational object based at least in part on the second input data;

switching a first game image displayed on the first display portion and a second game image displayed on the second display portion when the first game image becomes an operational object, so that the first game image is displayed on the second display portion and the second game image is displayed on the first display portion; and changing the first game image on the second display portion based at least in part on the positional user input data.

25. A method for use on a computer system, the computer system including a first display portion, a second display portion, a processor, a first user input device, a second user input device, and a memory unit, the method comprising:
- displaying a first game image on the first display portion;
- displaying a second game image on the second display portion;
- detecting coordinate data from the first display portion;
- detecting second input data from the second user input device;
- determining an operational object on the basis of the second input data;
- if a first game image displayed on the first display portion is the operational object, then switching the first game image and displaying the first game image on the second display portion and displaying a second game image on the first display portion; and
- performing a game process on the first game image that is displayed on the second display portion based at least in part on the coordinate data.

26. A non-transitory computer readable medium storing computer-readable instructions for performance a method for use on a computer system including a first display portion, a second display portion, a processor, a first user input device, a second user input device, and a memory unit, the stored instructions comprising instructions configured to:
- detect coordinate data from the first display that relates to the a point indicated by the first user input device on the first display portion;
- detect second input data from the second user input device;
- determine an operational object on the basis of the second input data;
- if a first game image displayed on the first display portion is the operational object, then switch to the first game image and display the first game image on the second display portion and display a second game image on the first display portion; and
- perform a game process on the first game image that is displayed on the second display portion based at least in part on the coordinate data.

* * * * *